(12) United States Patent
Liu et al.

(10) Patent No.: US 12,302,292 B2
(45) Date of Patent: May 13, 2025

(54) RESOURCE SELECTION FOR MULTIPLE COORDINATION MESSAGES

(71) Applicant: BUNKER HILL TECHNOLOGIES LLC, Allen, TX (US)

(72) Inventors: Jin Liu, Shanghai (CN); Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 734 days.

(21) Appl. No.: 17/547,201

(22) Filed: Dec. 9, 2021

(65) Prior Publication Data

US 2022/0191836 A1 Jun. 16, 2022

(30) Foreign Application Priority Data

Dec. 10, 2020 (CN) .......................... 202011433032.2
Dec. 23, 2020 (CN) .......................... 202011532905.5

(51) Int. Cl.
*H04W 72/04* (2023.01)
*H04L 5/00* (2006.01)
*H04W 24/10* (2009.01)

(52) U.S. Cl.
CPC ........... *H04W 72/04* (2013.01); *H04L 5/0048* (2013.01); *H04W 24/10* (2013.01)

(58) Field of Classification Search
CPC ... H04W 72/04; H04W 72/11; H04W 72/115; H04W 72/40; H04W 72/12; H04W 72/54;

(Continued)

(56) References Cited

U.S. PATENT DOCUMENTS

| 2022/0053515 A1* | 2/2022 | Zhang | H04W 72/542 |
| 2023/0300857 A1* | 9/2023 | Deng | H04L 5/0094 370/329 |
| 2023/0305099 A1* | 9/2023 | Thomas | G01S 5/14 |

FOREIGN PATENT DOCUMENTS

| CN | 106550318 A | 3/2017 |
| CN | 107343297 A | 11/2017 |

(Continued)

OTHER PUBLICATIONS

First Office Action of Chinese patent application No. CN202011433032.2 dated Feb. 3, 2024.

(Continued)

*Primary Examiner* — Ian N Moore
*Assistant Examiner* — Brian T Le
(74) *Attorney, Agent, or Firm* — Ascenda Law Group, PC

(57) ABSTRACT

The present disclosure provides a method and device in nodes used for wireless communication. A first node receives M first-type signalings; transmits a first signal on a target time-frequency resource block; the M first-type signalings respectively indicate M candidate resource sets; one of the M candidate resource sets is within a target resource pool; the target resource pool comprises the target time-frequency resource block; a first signaling is one of the M first-type signalings, the first signaling indicates at least a latter of a first zone ID and a first candidate resource set, and the first candidate resource set is one of the M candidate resource sets. The present disclosure effectively solves the problem of conflicts in coordination resources in the case of multiple cooperative users.

9 Claims, 6 Drawing Sheets

(58) Field of Classification Search
CPC ..... H04W 16/00; H04W 36/06; H04W 36/00;
H04W 36/0083; H04W 36/0088; H04W
24/10; H04W 24/02; H04W 8/005; H04W
40/24; H04W 52/365; H04B 7/024; H04L
1/0001; H04L 5/00; H04L 5/0048; H04L
5/005; H04L 5/0051; H04L 43/06
See application file for complete search history.

(56) References Cited

FOREIGN PATENT DOCUMENTS

| CN | 109845376 A | 6/2019 |
|----|-------------|--------|
| CN | 110932832 A | 3/2020 |
| CN | 111182632 A | 5/2020 |
| CN | 111327405 A | 6/2020 |
| CN | 111866795 A | 10/2020 |
| WO | 2020032658 A1 | 2/2020 |
| WO | 2020233405 A1 | 11/2020 |

OTHER PUBLICATIONS

First Search Report of Chinese patent application No. CN202011433032.2 dated Feb. 2, 2024.
First Office Action of Chinese patent application No. CN202011532905.5 dated Feb. 3, 2024.
First Search Report of Chinese patent application No. CN202011532905.5 dated Jan. 31, 2024.
Intel Corporation "Physical layer procedures for NR V2X sidelink communication" 3GPP TSG RAN WG1 Meeting #97 R1-1906799 May 17, 2019.

* cited by examiner

RESOURCE SELECTION FOR MULTIPLE COORDINATION MESSAGES

CROSS REFERENCE TO RELATED APPLICATIONS

This application claims the priority benefit of Chinese Patent Application No. 202011433032.2, filed on Dec. 10, 2020, and claims the priority benefit of Chinese Patent Application No. 202011532905.5, filed on Dec. 23, 2020, the full disclosure of which is incorporated herein by reference.

BACKGROUND

Technical Field

The present disclosure relates to transmission methods and devices in wireless communication systems, and in particular to a sidelink-related transmission scheme and device in wireless communications.

Related Art

Starting from Long Term Evolution (LTE), 3rd Generation Partner Project (3GPP) has been developing sidelink (SL) as a direct communication method between users, and has completed a first New Radio (NR) SL standard of "5G V2X with NR Sidelink" in Release-16 (Rel-16). In Rel-16, the NR SL is designed mainly for Vehicle-To-Everything (V2X), but it can also be used for Public Safety.

While due to time constraints, the NR SL Rel-16 cannot fully support traffic requirements and work scenarios identified for 5G V2X in 3GPP. Therefore, the NR SL is researched to be enhanced in Rel-17 in 3GPP.

SUMMARY

In the Rel-16 system, due to the distributed system of the NR SL, a User Equipment (UE) independently selects resources, the problem of a half-duplex (that is, a UE cannot transmit and receive at the same time) or hidden UE can easily lead to that two transmitting UEs occupy same SL resources to transmit signals to a same receiving UE, thus causing continuous interferences and resource collisions between UEs. Introducing inter-UE coordination is a feasible way to solve inter-UE resource collisions. In groupcast, a UE may receive a plurality of coordination messages from a plurality of different cooperative UEs, since working environment of the plurality of cooperative UEs is different, available resources or interference resources provided by a plurality of transmitted coordination messages conflict with each other.

In response to the above problems, the present disclosure discloses a resource selection method for multiple coordination messages, so as to effectively utilize inter-UE coordination resources, thus solving the problem of half-duplex and hidden UE. It should be noted that the embodiments in a User Equipment (UE) in the present disclosure and characteristics of the embodiments may be applied to a base station if no conflict is incurred, and vice versa. And the embodiments in the present disclosure and the characteristics in the embodiments can be arbitrarily combined if there is no conflict. Though originally targeted at SL, the present disclosure is also applicable to uplink (UL). Though originally targeted at single-carrier communications, the present disclosure is also applicable to multicarrier communications. Though originally targeted at single-antenna communications, the present disclosure is also applicable to multi-antenna communications. Besides, the present disclosure is not only targeted at V2X scenarios, but also at communication scenarios between terminals and base stations, terminals and relays as well as relays and base stations where similar technical effect can be achieved. Additionally, the adoption of a unified solution for various scenarios, including but not limited to V2X scenarios and communication scenarios between terminals and base stations, contributes to the reduction of hardware complexity and costs.

It should be noted that interpretations of the terminology in the present disclosure refer to definitions given in the 3GPP TS36 series, TS37 series, TS38 series, as well as definitions given in Institute of Electrical and Electronics Engineers (IEEE) protocol specifications.

The present disclosure provides a method in a first node for wireless communications, comprising:

receiving M first-type signalings, M being a positive integer greater than 1; and transmitting a first signal on a target time-frequency resource block;

herein, the M first-type signalings respectively carry M source identities (IDs), the M source IDs are respectively used to identify M nodes, and any two of the M source IDs are different; the M first-type signalings respectively indicate M candidate resource sets, and any of the M candidate resource sets comprises at least one time-frequency resource block; one of the M candidate resource sets is within a target resource pool; the target resource pool comprises a plurality of time-frequency resource blocks, and the target time-frequency resource block is a time-frequency resource block in the target resource pool; a first signaling is one of the M first-type signalings, the first signaling indicates at least a latter of a first zone ID and a first candidate resource set, and the first candidate resource set is one of the M candidate resource sets; at least one of the first zone ID or a measurement corresponding to the first candidate resource set is used to determine whether the first candidate resource set is within the target resource pool.

In one embodiment, a problem to be solved in the present disclosure is: coordination resources conflict with each other due to a plurality of coordination messages transmitted by a plurality of cooperative users.

In one embodiment, a method in the present disclosure is establishing an association between a coordination message selection and a resource selection.

In one embodiment, a method in the present disclosure is establishing an association between a coordination message selection and a distance between a transmitting node and a receiving node.

In one embodiment, a method in the present disclosure is establishing an association between a coordination message selection and quality of a receiving signal.

In one embodiment, the above method is advantageous in that the problem of coordination resources conflict with each other in the case of multiple cooperative UEs is solved.

According to one aspect of the present disclosure, the above method is characterized in that the first signaling indicates a first candidate resource set; a measurement corresponding to the first candidate resource set is used to determine whether the first candidate resource set is within the target resource pool.

According to one aspect of the present disclosure, the above method is characterized in that the first signaling indicates the first zone ID and the first candidate resource set; and the first zone ID is used to determine whether the first candidate resource set is within the target resource pool.

According to one aspect of the present disclosure, the above method is characterized in that the first signaling indicates the first zone ID and the first candidate resource set; both the first zone ID and a measurement corresponding to the first candidate resource set are used together to determine whether the first candidate resource set is within the target resource pool.

According to one aspect of the present disclosure, the above method is characterized in comprising:

determining the target time-frequency resource block from the target resource pool;

herein, the target time-frequency resource block is indicated, or, the target time-frequency resource block is randomly selected from the target resource pool.

According to one aspect of the present disclosure, the above method is characterized in comprising:

receiving first configuration information;

herein, the first configuration information indicates a second resource pool, the second resource pool comprises the M candidate resource sets, and the second resource pool is used to determine the first resource pool.

According to one aspect of the present disclosure, the above method is characterized in comprising:

respectively measuring M reference resource sets in a first resource pool;

herein, the M candidate resource sets are respectively associated with the M reference resource sets, and the M reference resource sets are within the first resource pool; the first candidate resource set is associated with a first reference resource set, and the first reference resource set is one of the M reference resource sets; a magnitude order of a measurement performed on the first reference resource set among M measurements performed on the M reference resource sets is used to determine whether the first candidate resource set is within the target resource pool.

According to one aspect of the present disclosure, the above method is characterized in comprising:

respectively measuring the M reference signals;

herein, the M first-type signalings respectively indicate the M reference signals; a first signaling indicates a first reference signal, and the first reference signal is one of the M reference signals; a second signaling is any of the M first-type signalings other than the first signaling, the second signaling indicates a second reference signal, and the second reference signal is any of the M reference signals other than the first reference signal; a magnitude order between a measurement performed on the first reference signal and a measurement performed on the second reference signal is used to determine whether the first candidate resource set is within the target resource pool.

According to one aspect of the present disclosure, the above method is characterized in that the first zone ID is used to determine a first distance, and the first distance is a geographical distance between a node transmitting the first signaling and the first node; M first-type distances are respectively geographical distances between the M nodes and the first node; a magnitude order of the first distance among the M first-type distances is used to determine whether the first candidate resource set is within the target resource pool.

According to one aspect of the present disclosure, the above method is characterized in that the first node is a UE.

According to one aspect of the present disclosure, the above method is characterized in that the first node is a relay node.

According to one aspect of the present disclosure, the above method is characterized in that the first node is a base station.

The present disclosure provides a method in a second node for wireless communications, comprising:

transmitting a first signaling; and receiving a first signal on a target time-frequency resource block;

herein, the first signaling carries a first source ID, and the first source ID is used to identify the second node; the target time-frequency resource block is a time-frequency resource block in a target resource pool, and the target resource pool comprises a plurality of time-frequency resource blocks; the first signaling indicates at least a latter of a first zone ID and a first candidate resource set, and the first candidate resource set comprises at least one time-frequency resource block; at least one of the first zone ID or a measurement performed on the first candidate resource set is used by a receiver of the first signaling to determine whether the first candidate resource set belongs to the target resource pool.

According to one aspect of the present disclosure, the above method is characterized in that the first signaling indicates a first candidate resource set; a measurement corresponding to the first candidate resource set is used to determine whether the first candidate resource set is within the target resource pool.

According to one aspect of the present disclosure, the above method is characterized in that the first signaling indicates the first zone ID and the first candidate resource set; and the first zone ID is used to determine whether the first candidate resource set is within the target resource pool.

According to one aspect of the present disclosure, the above method is characterized in that the first signaling indicates the first zone ID and the first candidate resource set; both the first zone ID and a measurement corresponding to the first candidate resource set are used together to determine whether the first candidate resource set is within the target resource pool.

According to one aspect of the present disclosure, the above method is characterized in comprising:

receiving first configuration information;

herein, the first configuration information indicates a second resource pool, the second resource pool comprises the first candidate resource set, the second resource pool is used by a receiver of the first signaling to determine the first resource pool, and the second resource pool comprises the target resource pool.

According to one aspect of the present disclosure, the above method is characterized in that the second node is a UE.

According to one aspect of the present disclosure, the above method is characterized in that the second node is a relay node.

According to one aspect of the present disclosure, the above method is characterized in that the second node is a base station.

The present disclosure provides a first node for wireless communications, comprising:

a first receiver, receiving M first-type signalings, M being a positive integer greater than 1; and a first transmitter, transmitting a first signal on a target time-frequency resource block;

herein, the M first-type signalings respectively carry M source IDs, the M source IDs are respectively used to identify M nodes, and any two of the M source IDs are different; the M first-type signalings respectively indicate M candidate resource sets, and any of the M candidate resource sets comprises at least one time-frequency resource block; one of the M candidate resource sets is within a target resource pool; the target resource pool comprises a plurality of time-frequency resource blocks, and the target time-frequency resource block is a time-frequency resource block in the target resource pool; a first signaling is one of the M first-type signalings, the first signaling indicates at least a latter of a first zone ID and a first candidate resource set, and the first candidate resource set is one of the M candidate resource sets; at least one of the first zone ID or a measurement corresponding to the first candidate resource set is used to determine whether the first candidate resource set is within the target resource pool.

The present disclosure provides a second node for wireless communications, comprising:
a second transmitter, transmitting a first signaling; and
a second receiver, receiving a first signal on a target time-frequency resource block;
herein, the first signaling carries a first source ID, and the first source ID is used to identify the second node; the target time-frequency resource block is a time-frequency resource block in a target resource pool, and the target resource pool comprises a plurality of time-frequency resource blocks; the first signaling indicates at least a latter of a first zone ID and a first candidate resource set, and the first candidate resource set comprises at least one time-frequency resource block; at least one of the first zone ID or a measurement corresponding to the first candidate resource set is used to determine whether the first candidate resource set is within the target resource pool.

In one embodiment, the present disclosure is advantageous in the following aspects:
a problem to be solved in the present disclosure is: coordination resources conflict with each other due to multiple coordination messages transmitted by multiple cooperative users;
an association between a coordination message selection and a resource selection is established in the present disclosure;
an association between a coordination message selection and a distance between a transmitting node and a receiving node is established in the present disclosure;
an association between a coordination message selection and quality of a receiving signal is established in the present disclosure;
the problem of coordination resources conflict with each other in the case of a plurality of cooperative users is solved in the present disclosure.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1A

Figure 1A:
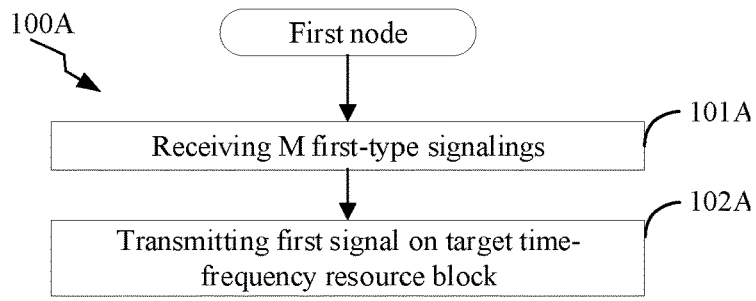
FIG. 1A illustrates a flowchart of the processing of a first node according to one embodiment of the present disclosure.

Embodiment 1A illustrates a flowchart of the processing of a first node according to one embodiment of the present disclosure, as shown in FIG. 1A. In FIG. 1A, each block represents a step.

In embodiment 1A, a first node in the present disclosure first receives M first-type signalings in step 101A; and transmits a first signal on a target time-frequency resource block in step 102A; the M first-type signalings respectively carry M source IDs, the M source IDs are respectively used to identify M nodes, and any two of the M source IDs are different; the M first-type signalings respectively indicate M candidate resource sets, and any of the M candidate resource sets comprises at least one time-frequency resource block; one of the M candidate resource sets is within a target resource pool; the target resource pool comprises a plurality of time-frequency resource blocks, and the target time-frequency resource block is a time-frequency resource block in the target resource pool; a first signaling is one of the M first-type signalings, the first signaling indicates at least a latter of a first zone ID and a first candidate resource set, and the first candidate resource set is one of the M candidate resource sets; at least one of the first zone ID or a measurement corresponding to the first candidate resource set is used to determine whether the first candidate resource set is within the target resource pool.

In one embodiment, a second resource pool is used for SL transmission.

In one embodiment, a second resource pool comprises all or partial resources of an SL Resource Pool.

In one embodiment, a second resource pool comprises all or partial resources of an SL Transmission Resource Pool.

In one embodiment, a second resource pool comprises all or partial resources of an SL Reception Resource Pool.

In one embodiment, a second resource pool comprises a Physical Sidelink Broadcast Channel (PSBCH).

In one embodiment, a second resource pool comprises a Physical Sidelink Control Channel (PSCCH).

In one embodiment, a second resource pool comprises a Physical Sidelink Shared Channel (PSSCH).

In one embodiment, a second resource pool comprises a Physical Sidelink Feedback Channel (PSFCH).

In one embodiment, a second resource pool is used to transmit a Sidelink Reference Signal (SL RS).

In one embodiment, the SL RS comprises a Sidelink Channel State Information Reference Signal (SL CSI-RS).

In one embodiment, the SL RS comprises a PSCCH Demodulation Reference Signal (DMRS).

In one embodiment, the SL RS comprises a PSSCH DMRS.

In one embodiment, a second resource pool comprises a plurality of Resource Elements (REs).

In one embodiment, any of the plurality of REs comprised in a second resource pool occupies one multicarrier symbol in time domain and one subcarrier in frequency domain.

In one embodiment, a second resource pool comprises a plurality of time-domain resource blocks in time domain.

In one embodiment, a second resource pool comprises a plurality of frequency-domain resource blocks in frequency domain.

In one embodiment, a second resource pool comprises a plurality of time-frequency resource blocks.

In one embodiment, the second resource pool comprises a plurality of time-domain resource blocks in time domain, and the second resource pool comprises a plurality of frequency-domain resource blocks in frequency domain.

In one embodiment, any of the plurality of time-domain resource blocks comprised in the second resource pool in time domain comprises at least one multicarrier symbol.

In one embodiment, any of the plurality of time-domain resource blocks comprised in the second resource pool in time domain comprises at least one slot.

In one embodiment, any of the plurality of frequency-domain resource blocks comprised in the second resource pool in frequency domain comprises at least one subcarrier.

In one embodiment, any of the plurality of frequency-domain resource blocks comprised in the second resource pool in frequency domain comprises at least one Physical Resource Block (PRB).

In one embodiment, any of the plurality of frequency-domain resource blocks comprised in the second resource pool in frequency domain comprises at least one subchannel.

In one embodiment, a first time-frequency resource block is any of the plurality of time-frequency resource blocks comprised in the second resource pool, the first time-frequency resource block comprises one of the plurality of time-domain resource blocks comprised in the second resource pool in time domain, and the first time-frequency resource block comprises one of the plurality of frequency-domain resource blocks comprised in the second resource block in frequency domain.

In one embodiment, any of the plurality of time-frequency resource blocks comprised in the second resource pool occupies at least one slot in time domain and at least one consecutive subchannel in frequency domain.

In one embodiment, any of the plurality of time-frequency resource blocks comprised in the second resource pool occupies at least one multicarrier symbol in time domain and at least one consecutive subchannel in frequency domain.

In one embodiment, any of the plurality of time-frequency resource blocks comprised in the second resource pool occupies at least one slot in time domain and at least one consecutive PRB in frequency domain.

In one embodiment, any of the plurality of time-frequency resource blocks comprised in the second resource pool occupies at least one multicarrier symbol in time domain and at least one consecutive PRB in frequency domain.

In one embodiment, any of the plurality of time-frequency resource blocks comprised in the second resource pool comprises at least one RE.

In one embodiment, the first resource pool is configured by a higher-layer signaling.

In one embodiment, the plurality of time-frequency resource blocks comprised in the first resource pool are configured by a higher-layer signaling.

In one embodiment, the plurality of time-domain resource blocks comprised in the first resource pool in time domain are pre-configured.

In one embodiment, the plurality of time-domain resource blocks comprised in the first resource pool in time domain are configured by a higher-layer signaling.

In one embodiment, the plurality of frequency-domain resource blocks comprised in the first resource pool in frequency domain are configured by a higher-layer signaling.

In one embodiment, the first resource pool is configured by a signaling SL-ResourcePool.

In one embodiment, the specific meaning of the SL-ResourcePool can be found in TS8.331, section 6.3.5.

In one embodiment, any of the M candidate resource sets comprises at least one time-frequency resource block.

In one embodiment, any of the M candidate resource sets comprises at least one time-domain resource block.

In one embodiment, any of the M candidate resource sets comprises at least one frequency-domain resource block.

In one embodiment, the second resource pool comprises the M candidate resource sets.

In one embodiment, the second resource pool comprises the at least one time-frequency resource block comprised in any of the M candidate resource sets.

In one embodiment, the at least one time-frequency resource block comprised in any of the M candidate resource sets belongs to the second resource pool.

In one embodiment, any of the at least one time-frequency resource block comprised in any of the M candidate resource sets is a time-frequency resource block in the second resource pool.

In one embodiment, any of the at least one time-frequency resource block comprised in any of the M candidate resource sets is one of the plurality of time-frequency resource blocks comprised in the second resource pool.

In one embodiment, any of the at least one time-domain resource block comprised in any of the M candidate resource sets is one of the plurality of time-domain resource blocks comprised in the second resource pool.

In one embodiment, any of the at least one frequency-domain resource block comprised in any of the M candidate resource sets is one of the plurality of frequency-domain resource blocks comprised in the second resource pool.

In one embodiment, the target resource pool comprises a plurality of REs.

In one embodiment, the target resource pool comprises a plurality of time-frequency resource blocks.

In one embodiment, the target resource pool comprises a plurality of time-domain resource blocks in time domain.

In one embodiment, the target resource pool comprises a plurality of frequency-domain resource blocks in frequency domain.

In one embodiment, the target resource pool comprises a plurality of time-domain resource blocks in time domain, and the target resource pool comprises a plurality of frequency-domain resource blocks in frequency domain.

In one embodiment, the second resource pool comprises the target resource pool.

In one embodiment, the second resource pool comprises the plurality of time-frequency resource blocks comprised in the target resource pool.

In one embodiment, any of the plurality of time-frequency resource blocks comprised in the target resource pool is one of the plurality of time-frequency resource blocks comprised in the second resource pool.

In one embodiment, any of the plurality of time-domain resource blocks comprised in the target resource pool in time domain is one of the plurality of time-domain resource blocks comprised in the second resource pool in time domain.

In one embodiment, any of the plurality of frequency-domain resource blocks comprised in the target resource pool in frequency domain is one of the plurality of frequency-domain resource blocks comprised in the second resource pool in frequency domain.

In one embodiment, the target resource pool is used for a resource selection.

In one embodiment, the target resource pool is used for a PSSCH resource selection in SL resource allocation mode 2.

In one embodiment, the target resource pool is reported to a higher layer of the first node.

In one embodiment, the target resource pool is determined by the first node through channel sensing.

In one embodiment, one of the M candidate resource sets is within the target resource pool.

In one embodiment, the first node selects one candidate resource set out of the M candidate resource sets to belong to the target resource pool.

In one embodiment, the first node only selects one candidate resource set out of the M candidate resource sets to belong to the target resource pool.

In one embodiment, the target resource pool only comprises one of the M candidate resource sets.

In one embodiment, a first target resource set is one of the M candidate resource sets, the first target resource set belongs to the target resource pool, and any of the M candidate resource sets other than the first target resource set does not belong to the target resource pool.

In one embodiment, the first target resource set comprises at least one time-frequency resource block, any of the at least one time-frequency resource block comprised in the first target resource set is one of the plurality of time-frequency resource blocks comprised in the target resource pool.

In one embodiment, one of the M candidate resource set is selected as the first target resource set.

In one embodiment, the target resource pool comprises the target time-frequency resource block.

In one embodiment, the target time-frequency resource block belongs to the target resource pool.

In one embodiment, the target time-frequency resource block is one of the plurality time-frequency resource blocks comprised in the target resource pool.

In one embodiment, time-domain resources occupied by the target time-frequency resource block in time domain comprises one time-domain resource block in the target resource pool.

In one embodiment, frequency-domain resources occupied by the target time-frequency resource block in frequency domain comprise one frequency-domain resource block in the target resource pool.

In one embodiment, the target time-frequency resource block comprises a plurality of REs.

In one embodiment, the target time-frequency resource block comprises at least one multicarrier symbol in time domain and at least one subchannel in frequency domain.

In one embodiment, the target time-frequency resource block is used to transmit the first signal.

In one embodiment, the target time-frequency resource block comprises a PSCCH.

In one embodiment, the target time-frequency resource block comprises a PSSCH.

In one embodiment, the target time-frequency resource block comprises a PSFCH.

In one embodiment, the first node determines the target time-frequency resource block from the target resource pool by itself.

In one embodiment, the first node selects the target time-frequency resource block from the target resource pool by itself.

In one embodiment, the target time-frequency resource block is one of the plurality time-frequency resource blocks selected by the first node itself comprised in the target resource pool.

In one embodiment, the target time-frequency resource block is selected by the first node out of the target time-frequency resource pool with an intermediate probability.

In one embodiment, the first node is indicated of the target time-frequency resource block, and the target time-frequency resource block belongs to the target resource pool.

In one embodiment, the first node is indicated of a position of the target time-frequency resource block in the plurality of time-frequency resource blocks comprised in the target resource pool.

In one embodiment, the first node is indicated of an index of the target time-frequency resource block in the plurality of time-frequency resource blocks comprised in the target resource pool.

In one embodiment, the target time-frequency resource block is indicated by a dynamic signaling.

In one embodiment, the target time-frequency resource block is indicated by Downlink Control Information (DCI).

In one embodiment, the target time-frequency resource block is indicated by a higher-layer signaling.

In one embodiment, a position of the target time-frequency resource block in the target resource pool is indicated by a dynamic signaling.

In one embodiment, a position of the target time-frequency resource block in the plurality of time-frequency resource blocks comprised in the target resource pool is indicated by DCI.

In one embodiment, a time-domain resource block occupied by the target time-frequency resource block in time domain is an earliest one of the plurality of time-domain resource blocks in time domain comprised in the target resource pool.

In one embodiment, any one of the M candidate resource sets comprises the target time-frequency resource block.

In one embodiment, the target time-frequency resource block is a time-frequency resource block indicated by each of the M first-type signalings in the target resource pool.

In one embodiment, the target time-frequency resource block is one of the plurality of time-frequency resource blocks comprised in the target resource pool, and any of the M candidate resource sets comprises the target time-frequency resource block.

In one embodiment, the M first-type signalings respectively indicate M candidate resource sets, and any of the M candidate resource sets comprises the target time-frequency resource block.

In one embodiment, the plurality of time-frequency resource blocks comprised in the target resource pool are respectively associated with a plurality of time-frequency resource blocks in the first resource pool; the target time-frequency resource block is associated with a first time-frequency resource block, and the first time-frequency resource block belongs to the first resource pool; a measurement value for the first time-frequency resource block is a minimum value of a plurality measurement values respectively for the plurality of time-frequency resource blocks in the first resource pool.

In one embodiment, a measurement value for the first time-frequency resource block comprises Reference Signal Received Power (RSRP).

In one embodiment, a measurement value for the first time-frequency resource block comprises a Received Signal Strength Indicator (RSSI).

In one embodiment, any of a plurality of measurement values for the plurality of time-frequency resource blocks in the first resource pool comprises RSRP.

In one embodiment, any of a plurality of measurement values for the plurality of time-frequency resource blocks in the first resource pool comprises an RSSI.

In one embodiment, the first zone ID is used to identify a geographic location of a transmitter of the first signaling.

In one embodiment, the first zone ID is used to identify a geographic zone where a transmitter of the first signaling is located.

In one embodiment, the first zone ID is used to identify a geographic location of the second node.

In one embodiment, the first zone ID is used to identify a geographic zone where the second node is located.

In one embodiment, a length of a geographic zone is used to determine the first zone ID.

In one embodiment, a geodesic distance in longitude between a geographic location where the second node is located and geographic coordinates (0,0) are used to determine the first zone ID.

In one embodiment, a geodesic distance in latitude between a geographic location where the second node is located and geographic coordinates (0,0) are used to determine the first zone ID.

In one embodiment, a length of a geographic zone where the second node is located, a geodesic distance in longitude between a geographic zone where the second node is located and geographic coordinates (0,0) and a geodesic distance in latitude between a geographic zone where the second node is located and geographic coordinates (0,0) are used to determine the first zone ID.

In one embodiment, the first zone ID is equal to a sum of 64 times a first latitude distance and a first longitude distance.

In one subembodiment of the above embodiment, the first latitude distance is a remainder after a quotient of a geodesic distance in latitude between a geographic location where the second node is located and geographic coordinates (0,0) divided by a length of a geographic zone where the second node is located is rounded down to an integer to be divided by 64.

In one subembodiment of the above embodiment, the first longitude distance is a remainder after a quotient of a geodesic distance in longitude between a geographic location where the second node is located and geographic coordinates (0,0) divided by a length of a geographic zone where the second node is located is rounded down to an integer to be divided by 64.

In one embodiment, the first zone ID comprises 12 bits.

In one embodiment, the first zone ID is a positive integer.

In one embodiment, the first zone ID is a Zone Identity (ID).

In one embodiment, the definition of the Zone ID refers to 3GPP TS38.331, section 5.8.11.

In one embodiment, the first candidate resource set is one of the M candidate resource sets.

In one embodiment, the first candidate resource set comprises at least one time-frequency resource block in the second resource pool.

In one embodiment, the first candidate resource set comprises at least one time-domain resource block in the second resource pool.

In one embodiment, the first candidate resource set comprises at least one frequency-domain resource block in the second resource pool.

In one embodiment, the first candidate resource block set comprises at least one time-frequency resource block, and any of the at least one time-frequency resource comprised in the first candidate resource block set is one time-frequency resource block in the second resource pool.

In one embodiment, the first candidate resource set is obtained by a transmitter of the first signaling through channel sensing.

In one embodiment, the first candidate resource block set is time-frequency resources recommended by a transmitter of the first signaling to the first node for transmission.

In one embodiment, the first candidate resource block set is time-frequency resources indicated by a transmitter of the first signaling to transmit the first signal.

In one embodiment, the first resource pool comprises a plurality of time-frequency resource blocks.

In one embodiment, the first resource pool comprises a plurality of time-domain resource blocks in time domain.

In one embodiment, the first resource pool comprises a plurality of resource pools in frequency domain.

In one embodiment, the first resource pool comprises a plurality of time-domain resource blocks in time domain, and the first resource pool comprises a plurality of frequency-domain resource blocks in frequency domain.

In one embodiment, the first resource pool comprises a plurality of REs.

In one embodiment, the second resource pool comprises the first resource pool.

In one embodiment, the first resource pool belongs to the second resource pool.

In one embodiment, any of the plurality of time-frequency resource blocks comprised in the first resource pool is one of the plurality of time-frequency resource blocks comprised in the second resource pool.

In one embodiment, any of the plurality of time-domain resource blocks comprised by the first resource pool in time domain is one of the plurality of time-domain resource blocks comprised in the second resource pool.

In one embodiment, any of the plurality of frequency-domain resource blocks comprised by the first resource pool in frequency domain is one of the plurality of frequency-domain resource blocks comprised in the second resource pool.

In one embodiment, the second resource pool is used to determine the first resource pool.

In one embodiment, both the second resource pool and a first time window are used together to determine the first resource pool.

In one embodiment, the first resource pool comprises a plurality of time-frequency resource blocks within the first sensing window in the second resource pool.

In one embodiment, the first sensing window comprises a plurality of time-domain resource blocks in the second resource pool.

In one embodiment, the first resource pool comprises a plurality of time-frequency resource blocks within the first time window in time domain in the plurality of time-frequency resource blocks comprised in the second resource pool.

In one embodiment, any time-frequency resource block located within the first time window in time domain in the plurality of time-frequency resource blocks comprised in the second resource pool belongs to the first resource pool.

In one embodiment, the first sensing window is measured by ms.

In one embodiment, the first sensing window is 10 ms.

In one embodiment, the first sensing window is 1000 ms.

In one embodiment, the first sensing window is configured by a higher-layer signaling.

In one embodiment, the first resource pool and the target resource pool is Time Division Multiplexing (TDM).

In one embodiment, the first resource pool and the target resource pool both belong to the second resource pool, and the first resource pool and the target resource pool are TDM.

In one embodiment, any of the plurality time-frequency resource blocks comprised in the first resource pool is earlier than any of the plurality of time-frequency resource blocks comprised in the target resource pool.

In one embodiment, the target resource pool and the first resource pool are spaced by a first time difference in time domain.

In one embodiment, the first time difference comprises at least one time-domain resource unit.

In one embodiment, the first time difference comprises at least one slot.

In one embodiment, the first time difference comprises at least one multicarrier symbol.

In one embodiment, the first resource pool is used for the first channel sensing.

In one embodiment, the first resource pool is used for resource sensing in SL resource allocation mode 2.

In one embodiment, the first resource pool is configured by a higher-layer signaling.

In one embodiment, the first reference resource set comprises at least one time-frequency resource block.

In one embodiment, the first reference resource set comprises at least one time-domain resource block in time domain.

In one embodiment, the first reference resource set comprises at least one frequency-domain resource block in frequency domain.

In one embodiment, any of the at least one time-frequency resource block comprised in the first reference resource set belongs to the first resource pool.

In one embodiment, any of the at least one time-domain resource block comprised by the first reference resource set in time domain belongs to the first resource pool.

In one embodiment, any of the at least one time-domain resource block comprised by the first reference resource set in frequency domain belongs to the first resource pool.

In one embodiment, any of the at least one time-domain resource block comprised by the first reference resource set is one of the plurality of time-frequency resource blocks comprised in the first resource pool.

In one embodiment, any of the at least one time-domain resource block comprised in the first reference resource set in time domain is one of the plurality of time-domain resource blocks comprised in the first resource pool.

In one embodiment, any of the at least one frequency-domain resource block comprised by the first reference resource in frequency domain is one of the plurality of frequency-domain resource blocks comprised in the first resource pool.

In one embodiment, the first candidate resource set and the first reference resource set are associated.

In one embodiment, the first candidate resource set is associated with the first reference resource set.

In one embodiment, each of the at least one time-frequency resource block comprised in the first candidate resource set is associated with each of the at least one time-frequency resource block comprised in the first reference resource set.

In one embodiment, each of the at least one time-frequency resource block comprised in the first candidate resource set is associated with each of the at least one time-frequency resource block comprised in the first reference resource set.

In one embodiment, any of the at least one time-frequency resource block comprised in the first candidate resource set is associated with the at least one time-frequency resource block comprised in the first reference resource set.

In one embodiment, any of the at least one time-frequency resource block comprised in the first candidate resource set is associated with the at least one time-frequency resource block comprised in the first reference resource set.

In one embodiment, any of the at least one time-frequency resource block comprised in the first candidate resource set is associated with one of the at least one time-frequency resource block comprised in the first reference resource set.

In one embodiment, any of the at least one time-frequency resource block comprised in the first candidate resource set is associated with one of the at least one time-frequency resource block comprised in the first reference resource set.

In one embodiment, a first candidate time-frequency resource block is one of the at least one time-frequency resource block comprised in the first candidate resource set; and the first candidate time-frequency resource block and at least one time-frequency resource block in the first reference resource set are associated.

In one embodiment, the first candidate time-frequency resource block and the at least one time-frequency resource block in the first reference resource set are orthogonal in time domain.

In one embodiment, the first candidate time-frequency resource block and the at least one time-frequency resource block in the first reference resource set are orthogonal in time domain, and the first candidate time-frequency resource block and any of the at least one time-frequency resource block in the first reference resource set are overlapped in frequency domain.

In one embodiment, the first candidate time-frequency resource block and the at least one time-frequency resource block in the first reference resource set are orthogonal in time domain, and the first candidate time-frequency resource block and any of the at least one time-frequency resource block in the first reference resource set occupy same frequency-domain resources in frequency domain.

In one embodiment, the first candidate time-frequency resource block and the at least one time-frequency resource block in the first reference resource set are equally spaced in time domain.

In one embodiment, any two of the at least one time-frequency resource block in the first reference resource set are spaced by a first time interval in time domain, the first candidate time-frequency resource and one of the at least one time-frequency resource block latest in time domain in the first reference resource set are spaced by a second time interval, and the second time interval is a multiple of the first time interval.

In one embodiment, the second time interval is equal to a positive integral multiple of the first time interval.

In one embodiment, the second time interval is equal to the first time interval.

In one embodiment, the first time interval comprises at least one time-domain resource block.

In one embodiment, the first time interval comprises at least one slot.

In one embodiment, the first time interval comprises at least one multicarrier symbol.

In one embodiment, the first time interval is measured by ms.

In one embodiment, the second time interval comprises at least one time-domain resource block.

In one embodiment, the second time interval comprises at least one slot.

In one embodiment, the second time interval comprises at least one multicarrier symbol.

In one embodiment, the second time interval is measured by ms.

In one embodiment, a first candidate time-frequency resource block is one of the at least one time-frequency resource block comprised in the first candidate resource set; and the first candidate time-frequency resource block and a first reference time-frequency resource block are associated, and the first reference time-frequency resource block is one of the at least one time-frequency resource block comprised in the first reference resource set.

In one embodiment, a first candidate time-frequency resource block is one of the at least one time-frequency resource block comprised in the first candidate resource set; and the first candidate time-frequency resource block is associated with a first reference time-frequency resource block, and the first reference time-frequency resource block is one of the at least one time-frequency resource block comprised in the first reference resource set.

In one embodiment, the first candidate time-frequency resource block and the first reference time-frequency resource block are orthogonal in time domain.

In one embodiment, the first candidate time-frequency resource block and the first reference time-frequency resource block are TDM.

In one embodiment, the first candidate time-frequency resource block and the first reference time-frequency resource block are orthogonal in time domain, and the first candidate time-frequency resource block overlaps with the first reference time-frequency resource block in frequency domain.

In one embodiment, the first candidate time-frequency resource block is orthogonal to the first reference time-frequency resource block in time domain, and the given candidate time-frequency resource block and the first reference time-frequency resource block occupy same frequency-domain resources in frequency domain.

In one embodiment, the first candidate time-frequency resource block and the first reference time-frequency resource block are spaced by the first time interval in time domain.

In one embodiment, the first signaling indicates the first reference signal.

In one embodiment, the first signaling indicates a first reference signal, and the first reference signal is one of the M reference signals.

In one embodiment, the first signaling comprises a plurality of fields, and the first reference signal is one of the plurality of fields comprised in the first signaling.

In one embodiment, an index of the first reference signal in M reference signals is used to scramble the first signaling.

In one embodiment, the first reference signal is used to demodulate the first signaling.

In one embodiment, the first reference signal is used to demodulate the first candidate resource set.

In one embodiment, the first signaling comprises a first bit block, the first bit block indicates the first candidate resource set, and the first reference signal is used to demodulate the first bit block.

In one embodiment, the first signaling is used to schedule a first bit block, the first bit block indicates the first candidate resource set, and the first reference signal is used to demodulate the first bit block.

In one embodiment, the first reference signal comprises a first sequence.

In one embodiment, a first sequence is used to generate the first reference signal.

In one embodiment, the first sequence is a Pseudo-Random Sequence.

In one embodiment, the first sequence is a Low-Peak to Average Power Ratio (Low-PAPR) sequence.

In one embodiment, the first sequence is a Gold sequence.

In one embodiment, the first sequence is an M sequence.

In one embodiment, the first sequence is a Zadeoff-Chu (ZC) sequence.

In one embodiment, the first sequence is sequentially through Sequence Generation, DFT, Modulation and Resource Element Mapping, and wideband symbol generation to acquire the first reference signal.

In one embodiment, the first sequence is sequentially through sequence generation, resource elements mapping and wideband symbol generation to acquire the first reference signal.

In one embodiment, the first sequence is mapped onto at least one RE.

In one embodiment, the first reference signal is used for data demodulation.

In one embodiment, the first reference signal is used to detect channel status information.

In one embodiment, the first reference signal comprises a PSCCH DMRS.

In one embodiment, the first reference signal comprises a PSSCH DMRS.

In one embodiment, the first reference signal comprises an Uplink (UL) DMRS.

In one embodiment, the first reference signal comprises an SL Channel State Information-Reference Signal (SL CSI-RS).

In one embodiment, the first reference signal comprises a UL Sounding Reference Signal (UL SRS).

In one embodiment, the first reference signal comprises a Sidelink Synchronization Signal/Physical Sidelink Broadcast Channel Block (S-SS/PSBCH Block).

In one embodiment, the first signaling indicates a first candidate resource set; a measurement corresponding to the first candidate resource set is used to determine whether the first candidate resource set is within the target resource pool.

In one embodiment, a measurement performed on the first candidate resource set comprises a measurement performed on the first reference resource set.

In one embodiment, a measurement performed on the first candidate resource set comprises a measurement performed on a first reference signal.

In one embodiment, a measurement performed on the first candidate resource set comprises a measurement performed on the first reference resource set, and the first candidate resource set is associated with the first reference resource set.

In one embodiment, a measurement performed on the first candidate resource set comprises a measurement performed on a first reference signal, and the first signaling indicates the first reference signal.

In one embodiment, a measurement performed on the first candidate resource set comprises a measurement performed on a first reference signal, and the first reference signal is used to demodulate the first candidate resource set.

In one embodiment, the first signaling indicates a first candidate resource set; a measurement performed on the first reference resource set is used to determine whether the first candidate resource set belongs to the target resource pool, and the first candidate resource set is associated with the first reference resource set.

In one embodiment, the first signaling indicates a first candidate resource set; a measurement performed on the first reference signal is used to determine whether the first candidate resource set belongs to the target resource pool, and the first signaling indicates the first reference signal.

In one embodiment, the first signaling indicates a first candidate resource set; a measurement performed on the first reference signal is used to determine whether the first candidate resource set belongs to the target resource pool, and the first reference signal is used to demodulate the first candidate resource set.

In one embodiment, the first signaling indicates a first zone ID and a first candidate resource set; and the first zone ID is used to determine whether the first candidate resource set is within the target resource pool.

In one embodiment, the first signaling indicates a first zone ID and a first candidate resource set; both the first zone ID and a measurement corresponding to the first candidate resource set are used together to determine whether the first candidate resource set is within the target resource pool.

In one embodiment, the first signaling indicates a first zone ID and a first candidate resource set; both the first zone ID and a measurement corresponding to the first reference resource set are used together to determine whether the first candidate resource set is within the target resource pool, and the first candidate resource set is associated with the first reference resource set.

In one embodiment, the first signaling indicates a first zone ID and a first candidate resource set; both the first zone ID and a measurement corresponding to the first reference signal are used together determine whether the first candidate resource set is within the target resource pool, and the first signaling indicates the first reference signal.

In one embodiment, the first signaling indicates a first zone ID and a first candidate resource set; both the first zone ID and a measurement corresponding to the first reference signal are used together determine whether the first candidate resource set is within the target resource pool, and the first reference signal is used demodulate the first candidate resource set.

In one embodiment, the multicarrier symbol in the present disclosure is a Single-Carrier Frequency-Division Multiple Access (SC-FDMA) symbol.

In one embodiment, the multicarrier symbol in the present disclosure is a Discrete Fourier Transform Spread Orthogonal Frequency Division Multiplexing (DFT-S-OFDM) symbol.

In one embodiment, the multicarrier symbol in the present disclosure is a Frequency Division Multiple Access (FDMA) symbol.

In one embodiment, the multi-carrier symbol in the present disclosure is a Filter Bank Multi-Carrier (FBMC) symbol.

In one embodiment, the multicarrier symbol in the present disclosure is an Interleaved Frequency Division Multiple Access (IFDMA) symbol.

Embodiment 1B

Figure 1B:
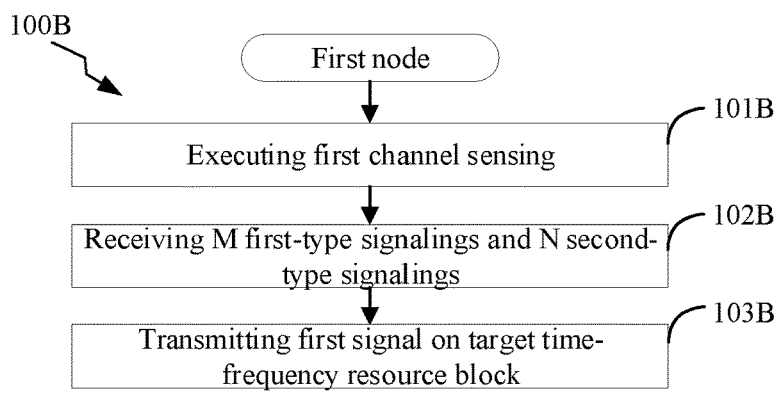
FIG. 1B illustrates a flowchart of the processing of a first node according to one embodiment of the present disclosure.

Embodiment 1B illustrates a flowchart of the processing of a first node according to one embodiment of the present disclosure, as shown in FIG. 1B. In FIG. 1B, each block represents a step.

In Embodiment 1B, a first node in the present disclosure first executes a first channel sensing in step 101B; then receives M first-type signalings and N second-type signalings in step 102B; and transmits a first signal on a target time-frequency resource block in step 103B, the first channel sensing is used to determine a target resource pool, and the target resource pool comprises a plurality of time-frequency resource blocks; a first candidate time-frequency resource block is one of a plurality of time-frequency resource blocks comprised in the target resource pool; the target time-frequency resource block belongs to a target resource subset, the target resource subset comprises at least one time-frequency resource block, and any time-frequency resource block comprised in the target resource subset belongs to the target resource pool; any of the M first-type signalings indicates the first candidate time-frequency resource block; any of the N second-type signalings indicates the first candidate time-frequency resource block, and any of the M first-type signalings and any of the N second-type signalings are different; both M and N are used together to determine whether the first candidate time-frequency resource block is within the target resource subset.

In one embodiment, a second resource pool is used for SL transmission.

In one embodiment, the second resource pool comprises all or partial resources of an SL Resource Pool.

In one embodiment, a second resource pool comprises all or partial resources of an SL Transmission Resource Pool.

In one embodiment, a second resource pool comprises all or partial resources of an SL Reception Resource Pool.

In one embodiment, a second resource pool comprises a PSCCH.

In one embodiment, a second resource pool comprises a PSSCH.

In one embodiment, a second resource pool comprises a PSFCH.

In one embodiment, a second resource pool is used to transmit an SL RS.

In one embodiment, the SL RS comprises an SL CSI-RS.

In one embodiment, the SL RS comprises a PSCCH DMRS.

In one embodiment, the SL RS comprises a PSSCH DMRS.

In one embodiment, a second resource pool comprises a plurality of REs.

In one embodiment, any of the plurality of REs comprised in a second resource pool occupies one multicarrier symbol in time domain and one subcarrier in frequency domain.

In one embodiment, a second resource pool comprises a plurality of time-domain resource blocks in time domain.

In one embodiment, a second resource pool comprises a plurality of frequency-domain resource blocks in frequency domain.

In one embodiment, a second resource pool comprises a plurality of time-frequency resource blocks.

In one embodiment, the second resource pool comprises a plurality of time-domain resource blocks in time domain, and the second resource pool comprises a plurality of frequency-domain resource blocks in frequency domain.

In one embodiment, any of the plurality of time-domain resource blocks comprised in the second resource pool in time domain comprises at least one multicarrier symbol.

In one embodiment, any of the plurality of time-domain resource blocks comprised in the second resource pool in time domain comprises at least one slot.

In one embodiment, any of the plurality of frequency-domain resource blocks comprised in the second resource pool in frequency domain comprises at least one subcarrier.

In one embodiment, any of the plurality of frequency-domain resource blocks comprised in the second resource pool in frequency domain comprises at least one PRB.

In one embodiment, any of the plurality of frequency-domain resource blocks comprised in the second resource pool in frequency domain comprises at least one subchannel.

In one embodiment, any of the plurality of time-frequency resource blocks comprised in the second resource pool occupies at least one slot in time domain and at least one consecutive subchannel in frequency domain.

In one embodiment, any of the plurality of time-frequency resource blocks comprised in the second resource pool occupies at least one multicarrier symbol in time domain and at least one consecutive subchannel in frequency domain.

In one embodiment, any of the plurality of time-frequency resource blocks comprised in the second resource pool occupies at least one slot in time domain and at least one consecutive PRB in frequency domain.

In one embodiment, any of the plurality of time-frequency resource blocks comprised in the second resource pool occupies at least one multicarrier symbol in time domain and at least one consecutive PRB in frequency domain.

In one embodiment, any of the plurality of time-frequency resource blocks comprised in the second resource pool comprises at least one RE.

In one embodiment, the second resource pool is configured by a higher-layer signaling.

In one embodiment, the plurality of time-frequency resource blocks comprised in the second resource pool are configured by a higher-layer signaling.

In one embodiment, the plurality of time-domain resource blocks comprised in the second resource pool in time domain are pre-configured.

In one embodiment, the plurality of time-domain resource blocks comprised in the second resource pool in time domain are configured by higher-layer signaling.

In one embodiment, the plurality of frequency-domain resource blocks comprised in the second resource pool in frequency domain are configured by a higher-layer signaling.

In one embodiment, the second resource pool is configured by a signaling SL-ResourcePool.

In one embodiment, the specific meaning of the SL-ResourcePool can be found in TS8.331, section 6.3.5.

In one embodiment, the target resource pool comprises a plurality of REs.

In one embodiment, the target resource pool comprises a plurality of time-domain resource blocks in time domain.

In one embodiment, the target resource pool comprises a plurality of resource pools in frequency domain.

In one embodiment, the target resource pool comprises a plurality of time-domain resource blocks in time domain, and the target resource pool comprises a plurality of frequency-domain resource blocks in frequency domain.

In one embodiment, the target resource pool comprises a plurality of time-frequency resource blocks.

In one embodiment, the second resource pool comprises the target resource pool.

In one embodiment, any of the plurality of time-domain resource blocks comprised by the target resource pool in time domain is one of the plurality of time-domain resource blocks comprised by the second resource pool in time domain.

In one embodiment, any of the plurality of frequency-domain resource blocks comprised by the target resource pool in frequency domain is one of the plurality of frequency-domain resource blocks comprised by the second resource pool in frequency domain.

In one embodiment, any of the plurality of time-frequency resource blocks comprised in the target resource pool is one of the plurality of time-frequency resource blocks comprised in the second resource pool.

In one embodiment, the target resource pool is used for a resource selection.

In one embodiment, the target resource pool is used for a PSSCH resource selection in SL resource allocation mode 2.

In one embodiment, the target resource pool is reported to a higher layer of the first node.

In one embodiment, the target resource pool comprises a PSCCH.

In one embodiment, the target resource pool comprises a PSSCH.

In one embodiment, the target resource pool comprises a PSFCH.

In one embodiment, the target resource pool is used to transmit an SL RS.

In one embodiment, the first channel sensing is used to determine the target resource pool.

In one embodiment, both the first channel sensing and the M first-type signalings are used together to determine the target resource pool.

In one embodiment, the first channel sensing is used to determine the first target resource pool, and the first target resource pool comprises at least one time-frequency resource block; the M first-type signalings indicate a second target resource pool, and the second target resource pool comprises at least one time-frequency resource block; the target resource pool is a set of the at least one time-frequency resource block comprised in the first target resource pool and the at least one time-frequency resource block comprised in the second target resource pool.

In one embodiment, any of the at least one time-frequency resource block comprised in the first target resource pool belongs to the target resource pool.

In one embodiment, any of the at least one time-frequency resource block comprised in the second target resource pool belongs to the target resource pool.

In one embodiment, a first target time-frequency resource block is one of the plurality of time-frequency resource blocks comprised in the target resource pool, and the first target time-frequency resource block does not belong to the second target resource pool.

In one embodiment, a second target time-frequency resource block is one of the plurality of time-frequency resource blocks comprised in the target resource pool, and the second target time-frequency resource block does not belong to the first target resource pool.

In one embodiment, a first target time-frequency resource block is one of the at least one time-frequency resource block comprised in the first target resource pool, the first target time-frequency resource block belongs to the target resource pool, and the first target resource block does not belong to the second target resource pool.

In one embodiment, a second target time-frequency resource block is one of the at least one time-frequency resource block comprised in the second target resource pool, the second target time-frequency resource block belongs to the target resource pool, and the second target resource block does not belong to the first target resource pool.

In one embodiment, the target resource subset comprises a plurality of REs.

In one embodiment, the target resource subset comprises at least one time-domain resource block in time domain.

In one embodiment, the target resource subset comprises at least one time-domain resource block in frequency domain.

In one embodiment, the target resource subset comprises at least one time-domain resource block in time domain, and the target resource subset comprises at least one time-domain resource block in frequency domain.

In one embodiment, the target resource subset comprises at least one time-frequency resource block.

In one embodiment, the target resource pool comprises the target resource subset.

In one embodiment, any of the at least one time-domain resource block comprised in the target resource subset in time domain is one of the plurality of time-domain resource blocks comprised in the target resource pool.

In one embodiment, any of the at least one frequency-domain resource block comprised by the target resource subset in frequency domain is one of the plurality of frequency-domain resource blocks comprised in the target resource subset.

In one embodiment, any of the at least one time-frequency resource block comprised in the target resource subset is one of the plurality of time-frequency resource blocks comprised in the target resource pool.

In one embodiment, any of the at least one time-frequency resource block comprised in the target resource subset belongs to the target resource pool.

In one embodiment, the target resource subset is used for a resource selection.

In one embodiment, the target resource subset is used for a PSSCH resource selection in SL resource allocation mode 2.

In one embodiment, the target resource subset is reported to a higher layer of the first node.

In one embodiment, any time-frequency resource block in the target resource subset comprises a PSCCH.

In one embodiment, any time-frequency resource block in the target resource subset comprises a PSSCH.

In one embodiment, at least one time-frequency in the target resource subset comprises a PSFCH.

In one embodiment, at least one time-frequency resource block in the target resource subset is used to transmit an SL RS.

In one embodiment, the target resource subset comprises the target time-frequency resource block.

In one embodiment, the target time-frequency resource block belongs to the target resource subset.

In one embodiment, the target time-frequency resource block is one of the at least one time-frequency resource block comprised in the target resource subset.

In one embodiment, time-domain resources occupied by the target time-frequency resource block in time domain comprise one time-domain resource block in the target resource subset.

In one embodiment, frequency-domain resources occupied by the target time-frequency resource block in frequency domain comprise one frequency-domain resource block in the target resource subset.

In one embodiment, the target time-frequency resource block comprises a plurality of REs.

In one embodiment, the target time-frequency resource block comprises at least one multicarrier symbol in time domain and at least one subchannel in frequency domain.

In one embodiment, the target time-frequency resource block is used to transmit the first signal.

In one embodiment, the target time-frequency resource block is used to transmit the first target signaling and the first signal.

In one embodiment, the target time-frequency resource block comprises a PSCCH.

In one embodiment, the target time-frequency resource block comprises a PSSCH.

In one embodiment, the target time-frequency resource block comprises a PSFCH.

In one embodiment, the first node determines the target time-frequency resource block from the target resource subset by itself.

In one embodiment, the first node selects the target time-frequency resource block from the target resource subset by itself.

In one embodiment, the target time-frequency resource block is one of the at least one time-frequency resource block selected by the first node itself comprised in the target resource subset.

In one embodiment, the target time-frequency resource block is selected by the first node itself out of the target resource subset.

In one embodiment, the first node is indicated of the target time-frequency resource block, and the target time-frequency resource block belongs to the target resource subset.

In one embodiment, the first node is indicated of a position of the target time-frequency resource block in the at least one time-frequency resource block comprised in the target resource subset.

In one embodiment, the first node is indicated of an index of the target time-frequency resource block in the at least one time-frequency resource block comprised in the target resource subset.

In one embodiment, a time-domain resource block occupied by the target time-frequency resource block in time domain is an earliest one of the at least one time-domain resource block in time domain comprised in the target resource subset.

In one embodiment, the target time-frequency resource block is a time-frequency resource block in the target resource subset indicated by each of the M first-type signalings.

In one embodiment, the target time-frequency resource block is one of the at least one time-frequency resource block comprised in the target resource subset, and the target time-frequency resource block is a time-frequency resource block indicated by any of the M first-type signalings.

In one embodiment, the M first-type signalings respectively indicate M first-type time-frequency resource block sets, any of the M first-type time-frequency resource block sets comprises at least one time-frequency resource block in the second resource pool, and any of the M first-type time-frequency resource block set comprises the target time-frequency resource block.

In one embodiment, the M first-type signalings respectively indicate M first-type time-frequency resource block sets, any of the M first-type time-frequency resource block sets comprises at least one of the at least one time-frequency resource block in the target resource subset, and any of the M first-type time-frequency resource block set comprises the target time-frequency resource block.

In one embodiment, a first signaling is any of the M first-type signalings, a first time-frequency resource block set is one of the M first-type time-frequency resource block sets indicated by the first signaling; the first time-frequency resource block set comprises at least one time-frequency resource block, any of the at least one time-frequency resource block comprised in the first time-frequency resource block set is a time-frequency resource block in the second resource pool, and the target time-frequency resource block is one of the at least one time-frequency resource block comprised in the first time-frequency resource block set.

In one embodiment, the target resource subset comprises a target time-frequency resource block and a second target time-frequency resource block, the target time-frequency resource block belongs to the first time-frequency resource block set, and the second target time-frequency resource block does not belong to the first time-frequency resource block set.

In one embodiment, the target resource subset comprises a target time-frequency resource block and a second target time-frequency resource block, the target time-frequency resource block belongs to the first time-frequency resource block set, the second target time-frequency resource also belongs to the first time-frequency resource block set, the target time-frequency resource block is not indicated by any of the N second-type signalings, and the second candidate time-frequency resource block is indicated by one of the N second-type signalings.

In one embodiment, the target resource subset comprises a target time-frequency resource block and a second target time-frequency resource block, and time-domain resources occupied by the target time-frequency resource block are earlier than time-domain resources occupied by the second target time-frequency resource block.

In one embodiment, the target resource subset comprises a target time-frequency resource block and a second target time-frequency resource block, the target time-frequency resource block is associated with a first time-frequency resource block in the second resource pool, the second target time-frequency resource block is associated with a second time-frequency resource block in the second resource pool, and a measurement value for the first time-frequency resource block is less than a measurement value for the second time-frequency resource block.

In one embodiment, a measurement value for the first time-frequency resource block comprises RSRP.

In one embodiment, a measurement value for the first time-frequency resource block comprises an RSSI.

In one embodiment, the measurement value for the second time-frequency resource block comprises PSRP.

In one embodiment, the measurement value for the second time-frequency block comprises an RSSI.

In one embodiment, the target time-frequency resource block is the first candidate time-frequency resource block.

In one embodiment, the target time-frequency resource block is not the first candidate time-frequency resource block.

In one embodiment, the target resource pool comprises the first candidate time-frequency resource block.

In one embodiment, the first candidate time-frequency resource block belongs to the target resource pool.

In one embodiment, the first candidate time-frequency resource block is one of the plurality time-frequency resource blocks comprised in the target resource pool.

In one embodiment, the first candidate time-frequency resource block comprises a plurality of REs.

In one embodiment, the first candidate time-frequency resource block comprises at least one multicarrier symbol in time domain and at least one subchannel in frequency domain.

In one embodiment, the target resource subset comprises the first candidate time-frequency resource block.

In one embodiment, the first candidate time-frequency resource block belongs to the target resource subset.

In one embodiment, the target time-frequency resource block is one of the at least one time-frequency resource block comprised in the target resource subset.

In one embodiment, the target resource subset does not comprise the first candidate time-frequency resource block.

In one embodiment, the first candidate time-frequency resource block does not belong to the target resource subset.

In one embodiment, the first candidate time-frequency resource block and any of the at least one time-frequency resource block comprised in the target resource subset are different.

In one embodiment, any of the M first-type signalings comprises one or a plurality of fields in a PHY layer signaling.

In one embodiment, any of the M first-type signalings comprises one or a plurality of fields in a piece of Sidelink Control Information (SCI).

In one embodiment, any of the M first-type signalings comprises a piece of SCI.

In one embodiment, any of the M first-type signalings comprises at least one of a plurality of fields of a first-level SCI format and at least one of a plurality fields of a second-level SCI format.

In one embodiment, the definition of the first-level SCI format refers to 3GPP TS38.212, section 8.3.

In one embodiment, the definition of the second-level SCI format refers to 3GPP TS38.212, section 8.4.

In one embodiment, any of the M first-type signalings comprises all or part of a higher-layer signaling.

In one embodiment, any of the M first-type signaling comprises all or part of an RRC-layer signaling.

In one embodiment, any of the M first-type signalings comprises one or a plurality of fields in an RRC Information Element (IE).

In one embodiment, any of the M first-type signalings comprises all or part of a PC5-RRC signaling.

In one embodiment, any of the M first-type signalings comprises all or part of a MAC-layer signaling.

In one embodiment, any of the M first-type signalings comprises one or a plurality of fields in a MAC CE.

In one embodiment, any of the M first-type signalings comprises a Sidelink IE.

In one embodiment, a channel occupied by any of the M first-type signaling comprises a PSCCH.

In one embodiment, a channel occupied by any of the M first-type signaling comprises a PSSCH.

In one embodiment, any of the M first-type signalings indicates time-domain resources occupied by the first candidate time-frequency resource block.

In one embodiment, any of the M first-type signalings indicates an index of a time-domain resource block occupied by the first candidate time-frequency resource block in time domain in the plurality of time-domain resource blocks comprised in the second resource pool.

In one embodiment, any of the M first-type signalings indicates frequency-domain resources occupied by the first candidate time-frequency resource block.

In one embodiment, any of the M first-type signalings indicates an index of a frequency-domain resource block occupied by the first candidate time-frequency resource block in frequency domain in the plurality of frequency-domain resource blocks comprised in the second resource pool.

In one embodiment, any of the M first-type signalings indicates time-frequency resources occupied by the first candidate time-frequency resource block.

In one embodiment, any of the M first-type signalings indicates an index of the first candidate time-frequency resource block in the plurality of time-frequency resource blocks comprised in the second resource pool.

In one embodiment, the first candidate time-frequency resource block is indicated by any of the M first-type signalings.

In one embodiment, any of the M first-type signalings indicates at least one time-frequency resource block in the second resource pool, and the first candidate time-frequency resource block is one of the at least one time-frequency resource block in the second resource pool indicated by any of the M first-type signalings.

In one embodiment, the M first-type signalings respectively indicate M first-type time-frequency resource block sets, any of the M first-type time-frequency resource block sets comprises at least one time-frequency resource block in the second resource pool, and any of the M first-type time-frequency resource block set comprises the first candidate time-frequency resource block.

In one embodiment, a first signaling is any of the M first-type signalings, and a first time-frequency resource block set is one of the M first-type time-frequency resource block sets indicated by the first signaling.

In one embodiment, the first time-frequency resource block set comprises at least one time-frequency resource block, any of the at least one time-frequency resource block comprised in the first time-frequency resource block set is a time-frequency resource block in the second resource pool, and the first candidate time-frequency resource block is one of the at least one time-frequency resource block comprised in the first time-frequency resource block set.

In one embodiment, the first time-frequency resource block set is acquired by a transmitter of the first signaling through channel sensing.

In one embodiment, the first time-frequency resource block set is time-frequency resources recommended by a transmitter of the first signaling to the first node for transmission.

In one embodiment, the first time-frequency resource block set is time-frequency resources used to transmit the first signal indicated by a transmitter of the first signaling.

In one embodiment, any of the N second-type signalings comprises one or a plurality of fields in a PHY layer signaling.

In one embodiment, any of the N second-type signalings comprises one or a plurality of fields in a piece of SCI.

In one embodiment, any of the N second-type signalings comprises a piece of SCI.

In one embodiment, any of the N second-type signalings comprises at least one of a plurality of fields of a first-level SCI format and at least one of a plurality of fields of a second-level SCI format.

In one embodiment, any of the N second-type signalings comprises all or part of a higher-layer signaling.

In one embodiment, any of the N second-type signalings comprises all or part of an RRC-layer signaling.

In one embodiment, any of the N second-type signalings comprises one or a plurality fields in an RRC IE.

In one embodiment, any of the N second-type signalings comprises all or part of a PC5-RRC signaling.

In one embodiment, any of the N second-type signalings comprises all or part of a MAC-layer signaling.

In one embodiment, any two of the N second-type signalings comprises one or a plurality fields in a MAC CE.

In one embodiment, any of the M first-type signalings comprises an SL IE.

In one embodiment, a channel occupied by any of the N second-type signalings comprises a PSCCH.

In one embodiment, a channel occupied by any of the N second-type signalings comprises a PSSCH.

In one embodiment, any of the N second-type signalings indicates time-domain resources occupied by the first candidate time-frequency resource block.

In one embodiment, any of the N second-type signalings indicates an index of a time-domain resource block occupied by the first candidate time-frequency resource block in time domain in the plurality of time-domain resource blocks comprised in the second resource pool.

In one embodiment, any of the N second-type signalings indicates frequency-domain resources occupied by the first candidate time-frequency resource block.

In one embodiment, any of the N second-type signalings indicates an index of a frequency-domain resource block occupied by the first candidate time-frequency resource block in frequency domain in the plurality of frequency-domain resource blocks comprised in the second resource pool.

In one embodiment, any of the N second-type signalings indicates time-frequency resources occupied by the first candidate time-frequency resource block.

In one embodiment, any of the N second-type signalings indicates an index of the first candidate time-frequency resource block in the plurality of time-frequency resource blocks comprised in the second resource pool.

In one embodiment, the first candidate time-frequency resource block is indicated by any of the N second-type signalings.

In one embodiment, any of the N second-type signalings indicates at least one time-frequency resource block in the second resource pool, and the first candidate time-frequency resource block is one of the at least one time-frequency resource block in the second resource pool indicated by any of the N second-type signalings.

In one embodiment, the N second-type signalings respectively indicate N second-type time-frequency resource block sets, any of the N second-type time-frequency resource block set comprises at least one time-frequency resource block in the second resource pool, and any of the N second-type time-frequency resource block sets comprises the first candidate time-frequency resource block.

In one embodiment, a second signaling is any of the N second-type signalings, and a second time-frequency resource block set is one of the N second-type time-frequency resource block sets indicated by the second signaling.

In one embodiment, the second time-frequency resource block set comprises at least one time-frequency resource block, any of the at least one time-frequency resource block comprised in the second time-frequency resource block set is a time-frequency resource block in the second resource pool, and the first candidate time-frequency resource block is one of the at least one time-frequency resource block comprised in the second time-frequency resource block set.

In one embodiment, the second time-frequency resource block set is acquired by a transmitter of the second signaling through channel sensing.

In one embodiment, the second time-frequency resource block set is time-frequency resources avoided being used for transmission that a transmitter of the second signaling indicated to the first node.

In one embodiment, the second time-frequency resource block set is time-frequency resources avoided being used to transmit the first signal indicated by a transmitter of the second signaling.

In one embodiment, the multicarrier symbol in the present disclosure is a Single-Carrier Frequency-Division Multiple Access (SC-FDMA) symbol.

In one embodiment, the multicarrier symbol in the present disclosure is a Discrete Fourier Transform Spread Orthogonal Frequency Division Multiplexing (DFT-S-OFDM) symbol.

In one embodiment, the multicarrier symbol in the present disclosure is a Frequency Division Multiple Access (FDMA) symbol.

In one embodiment, the multi-carrier symbol in the present disclosure is a Filter Bank Multi-Carrier (FBMC) symbol.

In one embodiment, the multicarrier symbol in the present disclosure is an Interleaved Frequency Division Multiple Access (IFDMA) symbol.

Embodiment 2

Figure 2:
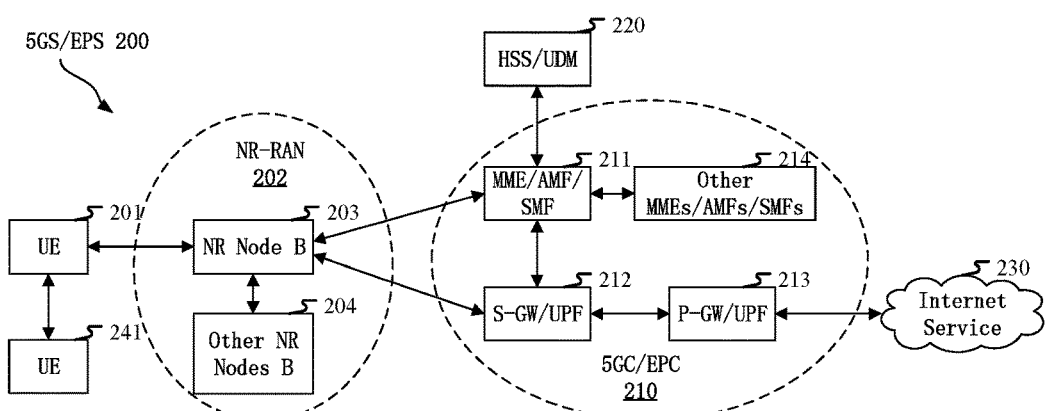
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, a UE 241 that is in SL communications with a UE 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In NTN networks, examples of the gNB203 include satellites, aircrafts, or ground base stations relayed through satellites. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present disclosure comprises the UE 201.

In one embodiment, any of the M nodes comprises the UE 241.

In one embodiment, the second node in the present disclosure comprises the UE 241.

In one embodiment, the third node in the present disclosure comprises the UE 241.

In one embodiment, the UE in the present disclosure comprises the UE 201.

In one embodiment, the UE in the present disclosure comprises the UE 241.

In one embodiment, the base station in the present disclosure comprises the gNB 203.

In one embodiment, a transmitter of first configuration information in the present disclosure comprises the UE 241.

In one embodiment, a receiver of first configuration information in the present disclosure comprises the UE 201.

In one embodiment, a transmitter of a first signaling in the present disclosure comprises the UE 241.

In one embodiment, a receiver of a first signaling in the present disclosure comprises the UE 201.

In one embodiment, a receiver of any of M first-type signalings in the present disclosure comprises the UE 201.

In one embodiment, a transmitter of any of M first-type signalings in the present disclosure comprises the UE 241.

In one embodiment, a receiver of any of N second-type signalings in the present disclosure comprises the UE 201.

In one embodiment, a transmitter of any of N second-type signalings in the present disclosure comprises the UE 241.

In one embodiment, a transmitter of a first signal in the present disclosure comprises the UE 201.

In one embodiment, a receiver of a first signal in the present disclosure comprises the UE 241.

In one embodiment, a transmitter of a first target signaling in the present disclosure comprises the UE 201.

In one embodiment, a receiver of a first target signaling in the present disclosure comprises the UE 241.

Embodiment 3

Figure 3:
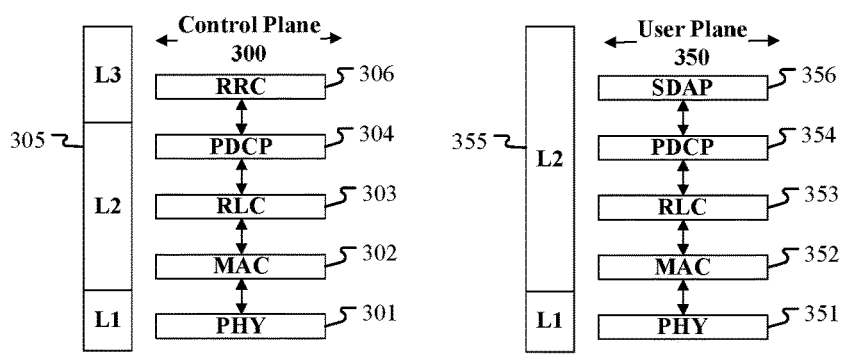
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE or RSU in V2X, vehicle equipment or On-Board Communication Unit) and a second node (gNB, UE or RSU in V2X, vehicle equipment or On-Board Communication Unit), or between two UEs is represented by three layers, which are respectively layer 1, layer 2 and layer 3. The layer 1 (L1) is the lowest layer and performs signal processing functions of various PHY layers. The L1 is called PHY 301 in the present disclosure. The layer 2 (L2) 305 is above the PHY 301, and is in charge of the link between the first node and the second node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes. The PDCP sublayer 304 provides data encryption and integrity protection and provides support for handover of a first node between second nodes. The RLC sublayer 303 provides segmentation and reassembling of a packet, retransmission of a lost data packet through ARQ, as well as repeat data packet detection and protocol error detection. The MAC sublayer 302 provides mapping between a logic channel and a transport channel and multiplexing of the logical channel. The MAC sublayer 302 is also responsible for allocating between first nodes various radio resources (i.e., resource block) in a cell. The MAC sublayer 302 is also responsible for HARQ operations. In the control plane 300, the RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first node may comprise several higher layers above the L2 305, such as a network layer (i.e., IP layer) terminated at a P-GW of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the first configuration information in the present disclosure is generated by the RRC sublayer 306.

In one embodiment, the first configuration information in the present disclosure is transmitted to the PHY 301 via the MAC sublayer 302.

In one embodiment, any of the M first-type signalings in the present disclosure is generated by the PHY 301.

In one embodiment, any of the M first-type signalings in the present disclosure is generated by the RRC sublayer 306.

In one embodiment, any of the M first-type signalings in the present disclosure is transmitted to the PHY 301 via the MAC sublayer 302.

In one embodiment, the first signaling in the present disclosure is generated by the PHY 301.

In one embodiment, the first signaling in the present disclosure is generated by the RRC sublayer 306.

In one embodiment, the first signaling in the present disclosure is transmitted to the PHY 301 via the MAC sublayer 302.

In one embodiment, the first signal in the present disclosure is generated by the RRC sublayer 306.

In one embodiment, the first signal in the present disclosure is transmitted to the PHY 301 via the MAC sublayer 302.

In one embodiment, any of the N second-type signalings in the present disclosure is generated by the PHY 301.

In one embodiment, any of the N second-type signalings in the present disclosure is generated by the RRC sublayer 306.

In one embodiment, any of the N second-type signalings in the present disclosure is transmitted to the PHY 301 via the MAC sublayer 302.

In one embodiment, the first target signaling in the present disclosure is generated by the PHY 301.

Embodiment 4

Figure 4:
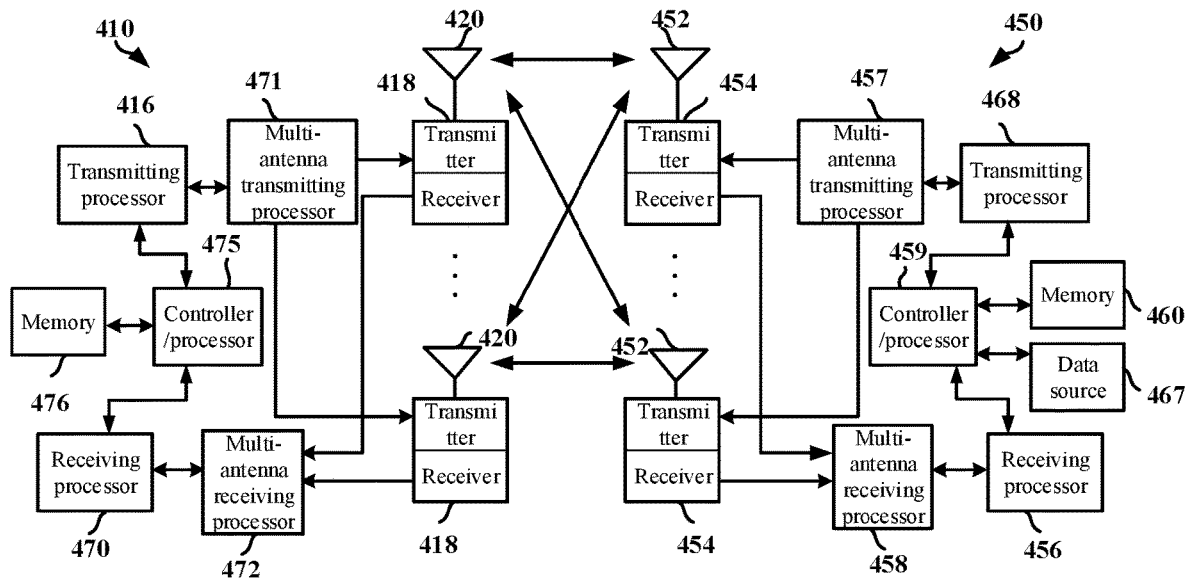
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present disclosure comprises the second communication device 450, and the second node in the present disclosure comprises the first communication device 410.

In one embodiment, the first node in the present disclosure comprises the second communication device 450, and the third node in the present disclosure comprises the first communication device 410.

In one embodiment, the first node in the present disclosure comprises the second communication device 450, the second node in the present disclosure comprises the first communication device 410, and the third node in the present disclosure comprises the first communication node 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the first node is a UE, and the second node is a base station.

In one subembodiment of the above embodiment, the first node is a UE, and the third node is a UE.

In one subembodiment of the above embodiment, the first node is a UE, the second node is a UE, and the third node is a UE.

In one subembodiment of the above embodiment, the first node is a UE, the second node is a UE, and the third node is a relay node.

In one subembodiment of the above embodiment, the first node is a UE, the second node is a relay node, and the third node is a base station.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives M first-type signalings, M being a positive integer greater than 1; and transmits a first signal on a target time-frequency resource block; the M first-type signalings respectively carry M source IDs, the M source IDs are respectively used to identify M nodes, and any two of the M source IDs are different; the M first-type signalings respectively indicate M candidate resource sets, and any of the M candidate resource sets comprises at least one time-frequency resource block; one of the M candidate resource sets is within a target resource pool; the target resource pool comprises a plurality of time-frequency resource blocks, and the target time-frequency resource block is a time-frequency resource block in the target resource pool; a first signaling is one of the M first-type signalings, the first signaling indicates at least a latter of a first zone ID and a first candidate resource set, and the first candidate resource set is one of the M candidate resource sets; at least one of the first zone ID or a measurement corresponding to the first candidate resource set is used to determine whether the first candidate resource set is within the target resource pool.

In one embodiment, the second communication device 450 comprises a memory that stores a computer readable instruction program. The computer readable instruction program generates an action when executed by at least one processor. The action includes: receiving M first-type signalings, M being a positive integer greater than 1; and transmitting a first signal on a target time-frequency resource block; the M first-type signalings respectively carry M source IDs, the M source IDs are respectively used to identify M nodes, and any two of the M source IDs are different; the M first-type signalings respectively indicate M candidate resource sets, and any of the M candidate resource sets comprises at least one time-frequency resource block; one of the M candidate resource sets is within a target resource pool; the target resource pool comprises a plurality of time-frequency resource blocks, and the target time-frequency resource block is a time-frequency resource block in the target resource pool; a first signaling is one of the M first-type signalings, the first signaling indicates at least a latter of a first zone ID and a first candidate resource set, and the first candidate resource set is one of the M candidate resource sets; at least one of the first zone ID or a measurement corresponding to the first candidate resource set is used to determine whether the first candidate resource set is within the target resource pool.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first signaling; and receives a first signal on a target time-frequency resource block; the first signaling carries a first source ID, and the first source ID is used to identify the second node; the target time-frequency resource block is a time-frequency resource block in a target resource pool, and the target resource pool comprises a plurality of time-frequency resource blocks; the first signaling indicates at least a latter of a first zone ID and a first candidate resource set, and the first candidate resource set comprises at least one time-frequency resource block; at least one of the first zone ID or a measurement performed on a first candidate resource set is used by a receiver of the first signaling to determine whether the first candidate resource set belongs to the target resource pool.

In one embodiment, the first communication device 410 comprises a memory that stores a computer readable instruction program. The computer readable instruction program generates an action when executed by at least one processor. The action includes: transmitting a first signaling; and receiving a first signal on a target time-frequency resource block; the first signaling carries a first source ID, and the first source ID is used to identify the second node; the target time-frequency resource block is a time-frequency resource block in a target resource pool, and the target resource pool comprises a plurality of time-frequency resource blocks; the first signaling indicates at least a latter of a first zone ID and a first candidate resource set, and the first candidate resource set comprises at least one time-frequency resource block; at least one of the first zone ID or a measurement performed on a first candidate resource set is used by a receiver of the first signaling to determine whether the first candidate resource set belongs to the target resource pool.

In one embodiment, at least one of the antenna 452, the receiver 454, the multi-antenna receiving processor 458, the receiving processor 456, the controller/processor 459, the memory 460, or the data source 467 is used to receive first configuration information in the present disclosure.

In one embodiment, at least one of the antenna 452, the receiver 454, the multi-antenna receiving processor 458, the receiving processor 456, the controller/processor 459, the memory 460, or the data source 467 is used to receive M first-type signalings in the present disclosure.

In one embodiment, at least one of the antenna 452, the receiver 454, the multi-antenna receiving processor 458, the receiving processor 456, the controller/processor 459, the memory 460, or the data source 467 is used to respectively measure M reference resource sets in a first resource pool in the present disclosure.

In one embodiment, at least one of the antenna 452, the receiver 454, the multi-antenna receiving processor 458, the receiving processor 456, the controller/processor 459, the memory 460, or the data source 467 is used to respectively measure M reference signals in the present disclosure.

In one embodiment, at least one of the antenna 452, the transmitter 454, the multi-antenna transmitting processor 458, the transmitting processor 468, the controller/processor 459, the memory 460, or the data sources 467 is used to determine a target time-frequency resource block from a target resource pool in the present disclosure.

In one embodiment, at least one of the antenna 452, the transmitter 454, the multi-antenna transmission processor 458, the transmitting processor 468, the controller/processor 459, the memory 460, or the data source 467 is used to transmit a first signal on a target time-frequency resource block in the present disclosure.

In one embodiment, at least one of the antenna 420, the transmitter 418, the multi-antenna transmitting processor 471, the transmitting processor 416, the controller/processor 475, or the memory 476 is used to transmit a first signaling in the present disclosure.

In one embodiment, at least one of the antenna 420, the receiver 418, the multi-antenna receiving processor 472, the receiving processor 470, the controller/processor 475, or the memory 476 is used to receive a first signal on a target time-frequency resource block in the present disclosure.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: executes a first channel sensing; receives M first-type signalings and N second-type signalings, M and N both being positive integers; and transmits a first signal on a target time-frequency resource block; the first channel sensing is used to determine a target resource pool, and the target resource pool comprises a plurality of time-frequency resource blocks; a first candidate time-frequency resource block is one of a plurality of time-frequency resource blocks comprised in the target resource pool; the target time-frequency resource block belongs to a target resource subset, the target resource subset comprises at least one time-frequency resource block, and any time-frequency resource block comprised in the target resource subset belongs to the target resource pool; any of the M first-type signalings indicates the first candidate time-frequency resource block; any of the N second-type signalings indicates the first candidate time-frequency resource block, and any of the M first-type signalings and any of the N second-type signalings are different; both M and N are used together to determine whether the first candidate time-frequency resource block is within the target resource subset.

In one embodiment, the second communication device 450 comprises a memory that stores a computer readable instruction program. The computer readable instruction program generates an action when executed by at least one processor. The action includes: executing a first channel sensing; receiving M first-type signalings and N second-type signalings, M and N both being positive integers; and transmitting a first signal on a target time-frequency resource block; the first channel sensing is used to determine a target resource pool, and the target resource pool comprises a plurality of time-frequency resource blocks; a first candidate time-frequency resource block is one of a plurality of time-frequency resource blocks comprised in the target resource pool; the target time-frequency resource block belongs to a target resource subset, the target resource subset comprises at least one time-frequency resource block, and any time-frequency resource block comprised in the target resource subset belongs to the target resource pool; any of the M first-type signalings indicates the first candidate time-frequency resource block; any of the N second-type signalings indicates the first candidate time-frequency resource block, and any of the M first-type signalings and any of the N second-type signalings are different; both M and N are used together to determine whether the first candidate time-frequency resource block is within the target resource subset.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first-type signaling; receives a first target signaling and a first signal on a target time-frequency resource block; the first-type signaling is used to indicate a first candidate time-frequency resource block; a target resource pool comprises a plurality of time-frequency resource blocks; the first candidate time-frequency resource block is one of a plurality of time-frequency resource blocks comprised in the target resource pool; the target time-frequency resource block belongs to a target resource subset, the target resource subset comprises at least one time-frequency resource block, and any time-frequency resource block comprised in the target resource subset belongs to the target resource pool; a receiver of the first-type signaling is used to determine whether the first candidate time-frequency resource block belongs to a target resource subset; and the first target signaling indicates the target time-frequency resource block.

In one embodiment, the first communication device 410 comprises a memory that stores a computer readable instruction program. The computer readable instruction program generates an action when executed by at least one processor. The action includes: transmitting a first-type signaling; receiving a first target signaling and a first signal on a target time-frequency resource block; the first-type signaling is used to indicate a first candidate time-frequency resource block; a target resource pool comprises a plurality of time-frequency resource blocks; the first candidate time-frequency resource block is one of a plurality of time-frequency resource blocks comprised in the target resource pool; the target time-frequency resource block belongs to a target resource subset, the target resource subset comprises at least one time-frequency resource block, and any time-frequency resource block comprised in the target resource subset belongs to the target resource pool; a receiver of the first-type signaling is used to determine whether the first candidate time-frequency resource block belongs to a target resource subset; and the first target signaling indicates the target time-frequency resource block.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a second-type signaling; receives a first target signaling and a first signal on a target time-frequency resource block; the second-type signaling is used to indicate a first candidate time-frequency resource block; a target resource pool comprises a plurality of time-frequency resource blocks; the first candidate time-frequency resource block is one of a plurality of time-frequency resource blocks comprised in the target resource pool; the target time-frequency resource block belongs to a target resource subset, the target resource subset comprises at least one time-frequency resource block, and any time-frequency resource block comprised in the target resource subset belongs to the target resource pool; a receiver of the second-type signaling is used to determine whether the first candidate time-frequency resource block belongs to a target resource subset; and the first target signaling indicates the target time-frequency resource block.

In one embodiment, the first communication device 410 comprises a memory that stores a computer readable instruction program. The computer readable instruction program generates an action when executed by at least one processor. The action includes: transmitting a second-type signaling; receiving a first target signaling and a first signal on a target time-frequency resource block; the second-type signaling is used to indicate a first candidate time-frequency resource block; a target resource pool comprises a plurality of time-frequency resource blocks; the first candidate time-frequency resource block is one of a plurality of time-frequency resource blocks comprised in the target resource pool; the target time-frequency resource block belongs to a target resource subset, the target resource subset comprises at least one time-frequency resource block, and any time-frequency resource block comprised in the target resource subset belongs to the target resource pool; a receiver of the second-type signaling is used to determine whether the first candidate time-frequency resource block belongs to a target resource subset; and the first target signaling indicates the target time-frequency resource block.

In one embodiment, at least one of the antenna 452, the receiver 454, the multi-antenna receiving processor 458, the receiving processor 456, the controller/processor 459, the memory 460, or the data source 467 is used to execute a first channel sensing in the present disclosure.

In one embodiment, at least one of the antenna 452, the receiver 454, the multi-antenna receiving processor 458, the receiving processor 456, the controller/processor 459, the memory 460, or the data source 467 is used to receive M first-type signalings and N second-type signalings in the present disclosure.

In one embodiment, at least one of the antenna 452, the transmitter 454, the multi-antenna transmission processor 458, the transmitting processor 468, the controller/processor 459, the memory 460, or the data source 467 is used to transmit a first target signaling on a target time-frequency resource block in the present disclosure.

In one embodiment, at least one of the antenna 452, the transmitter 454, the multi-antenna transmission processor 458, the transmitting processor 468, the controller/processor 459, the memory 460, or the data source 467 is used to transmit a first signal on a target time-frequency resource block in the present disclosure.

In one embodiment, at least one of the antenna 420, the transmitter 418, the multi-antenna transmitting processor 471, the transmitting processor 416, the controller/processor 475, or the memory 476 is used to transmit a first-type signaling in the present disclosure.

In one embodiment, at least one of the antenna 420, the transmitter 418, the multi-antenna transmitting processor 471, the transmitting processor 416, the controller/processor 475, or the memory 476 is used to transmit a second-type signaling in the present disclosure.

In one embodiment, at least one of the antenna 420, the receiver 418, the multi-antenna receiving processor 472, the receiving processor 470, the controller/processor 475, or the memory 476 is used to receive a first target signaling on a target time-frequency resource block in the present disclosure.

In one embodiment, at least one of the antenna 420, the receiver 418, the multi-antenna receiving processor 472, the receiving processor 470, the controller/processor 475, or the memory 476 is used to receive a first signal on a target time-frequency resource block in the present disclosure.

Embodiment 5A

Figure 5A:
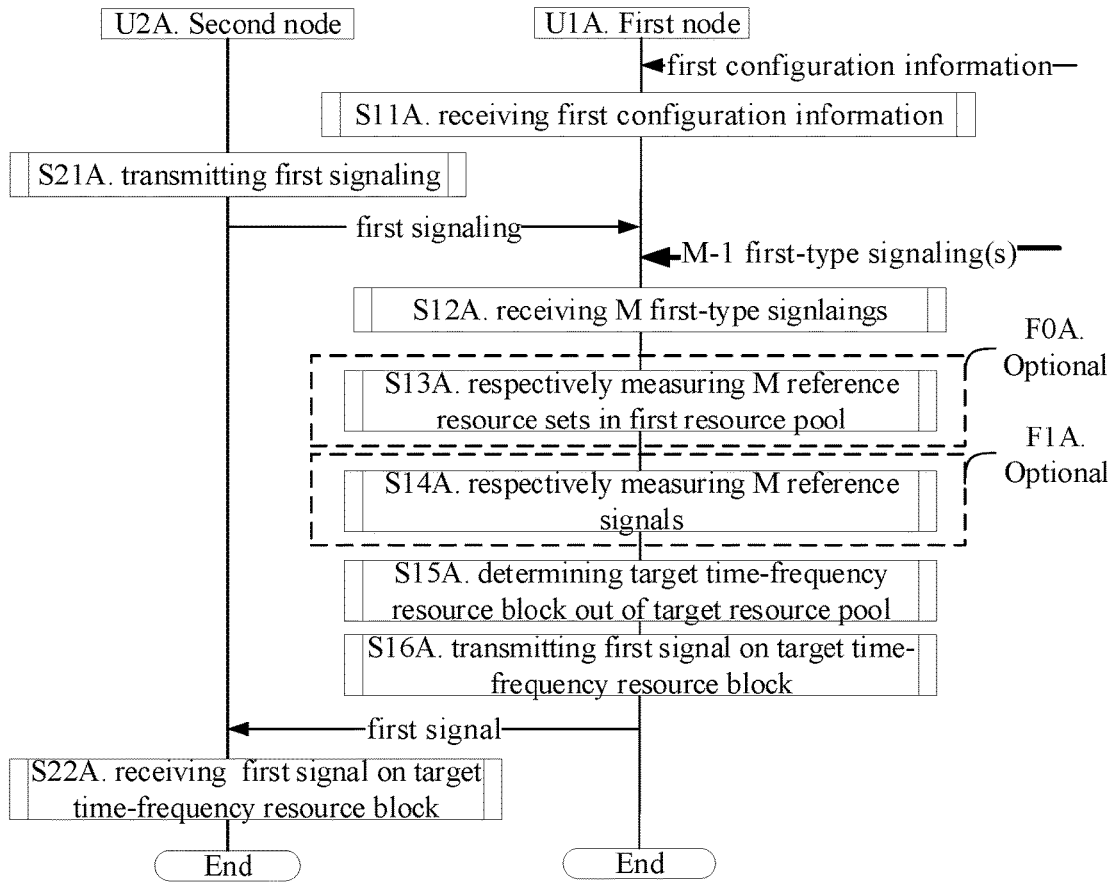
FIG. 5A illustrates a flowchart of radio signal transmission according to one embodiment of the present disclosure.

Embodiment 5A illustrates a flowchart of radio signal transmission according to one embodiment in the present disclosure, as shown in FIG. 5. In FIG. 5A, a first node U1A and a second node U2A are in communications via an air interface, and steps in box F0A and F1A in FIG. 5A are respectively optional.

The first node U1A receives first configuration information in step S11A; receives M first-type signalings in step S12A; respectively measures M reference resource sets in a first resource pool in step S13A; respectively measures M reference signals in step S14A; determines a target time-frequency resource block from a target resource pool in step S15A; and transmits a first signal on a target time-frequency resource block in step S16A.

The second node U2A transmits a first signaling in step S21A; and receives a first signal on a target time-frequency resource block in step S22A.

In embodiment 5A, the first configuration information indicates a second resource pool, the second resource pool comprises the M candidate resource sets, and the second resource pool is used to determine the first resource pool; the M first-type signalings respectively carry M source IDs, the M source IDs are respectively used to identify M nodes, and any two of the M source IDs are different; the M first-type signalings respectively indicate M candidate resource sets, and any of the M candidate resource sets comprises at least one time-frequency resource block; one of the M candidate resource sets is within a target resource pool; the target resource pool comprises a plurality of time-frequency resource blocks, and the target time-frequency resource block is a time-frequency resource block in the target resource pool; a first signaling is one of the M first-type signalings, the first signaling indicates at least a latter of a first zone ID and a first candidate resource set, and the first candidate resource set is one of the M candidate resource sets; at least one of the first zone ID or a measurement corresponding to the first candidate resource set is used to determine whether the first candidate resource set is within the target resource pool; the target time-frequency resource block is indicated, or, the target time-frequency resource block is randomly selected from the target resource pool.

In one embodiment, the M candidate resource sets are respectively associated with the M reference resource sets, and the M reference resource sets are within the first resource pool; the first candidate resource set is associated with a first reference resource set, and the first reference resource set is one of the M reference resource sets; a magnitude order between a measurement performed on the first reference resource set among M measurements performed on the M reference resource sets is used to determine whether the first candidate resource set is within the target resource pool.

In one embodiment, the M first-type signalings respectively indicate the M reference signals; a first signaling indicates a first reference signal, and the first reference signal is one of the M reference signals; a magnitude order of a measurement performed on the first reference signal among M measurements performed on the M reference signals is used to determine whether the first candidate resource set is within the target resource pool.

In one embodiment, the first zone ID is used to determine a first distance, and the first distance is a geographical distance between a node transmitting the first signaling and the first node U1A; M first-type distances are respectively geographical distances between the M nodes and the first node U1A; a magnitude order of the first distance among the M first-type distances is used to determine whether the first candidate resource set is within the target resource pool.

In one embodiment, the target time-frequency resource block is indicated out of the target resource pool.

In one embodiment, the target time-frequency resource block is randomly selected from the target resource pool.

In one embodiment, the first node U1A and the second node U2A are in communications via a PC5 interface.

In one embodiment, steps in box F0A in FIG. 5A exist.

In one embodiment, steps in box F0A in FIG. 5A do not exist.

In one embodiment, steps in box F1A in FIG. 5A exist.

In one embodiment, steps in box F1A in FIG. 5A do not exist.

In one embodiment, steps in box F0A and box F1A in FIG. 5A exist.

In one embodiment, a measurement performed on the first reference resource set is used to determine whether the first candidate resource set belongs to the target resource pool, and steps in box F0A in FIG. 5A exist.

In one embodiment, a measurement performed on the first reference signal is used to determine whether the first candidate resource set belongs to the target resource pool, and steps in box F1A in FIG. 5A exist.

In one embodiment, the first configuration information comprises all or part of a higher-layer signaling.

In one embodiment, the first configuration information comprises all or part of an RRC signaling.

In one embodiment, the first configuration information comprises one or more fields of an RRC IE.

In one embodiment, the first configuration information comprises all or part of a PC5-RRC signaling.

In one embodiment, the first configuration information comprises all or part of a MAC layer signaling.

In one embodiment, the first configuration information comprises one or more fields of a MAC CE.

In one embodiment, the first configuration information comprises an SL IE.

In one embodiment, the first configuration information comprises one or more fields of a PHY layer signaling.

In one embodiment, the first configuration information comprises one or more fields of SCI.

In one embodiment, the first configuration information comprises a first-level SCI format and a second-level SCI format.

In one embodiment, the first configuration information comprises an SLSS.

In one embodiment, the first configuration information comprises an S-SS/PSBCH block.

In one embodiment, a channel occupied by the first configuration information comprises a PSBCH.

In one embodiment, a channel occupied by the first configuration information comprises a PSCCH.

In one embodiment, a channel occupied by the first configuration information comprises a PSSCH.

In one embodiment, the first configuration information indicates the second resource pool, the second resource pool comprises the M candidate resource sets, and the second resource pool is used to determine the first resource pool.

In one embodiment, the first configuration information indicates the second resource pool, and the second resource pool comprises the plurality of time-frequency resource blocks.

In one embodiment, the first configuration information indicates time-frequency resources occupied by the second resource pool.

In one embodiment, the first configuration information indicates time-frequency resources occupied by any time-frequency resource block in the second resource pool.

In one embodiment, the first configuration information indicates time-domain resources occupied by the second resource pool.

In one embodiment, the first configuration information indicates frequency-domain resources occupied by the second resource pool.

In one embodiment, the first configuration information indicates the plurality of time-frequency resource blocks comprised in the second resource pool.

In one embodiment, the first configuration information indicates the plurality of time-domain resource blocks comprised in the second resource pool.

In one embodiment, the first configuration information indicates the plurality of frequency-domain resource blocks comprised in the second resource pool.

In one embodiment, the first configuration information indicates a start position of the second resource pool in frequency domain, and the first configuration information indicates a number of the plurality of frequency-domain resource blocks comprised in the second resource pool.

In one embodiment, the first configuration information indicates a start position of the second resource pool in time domain, and the first configuration information indicates a number of the plurality of time-domain resource blocks comprised in the second resource pool.

In one embodiment, the first configuration information indicates an SCS of a subcarrier in the second resource pool.

In one embodiment, the first configuration information indicates a number of multicarrier symbols occupied by any time-frequency resource block comprised in the second resource pool in a slot.

In one embodiment, the first configuration information indicates that any time-frequency resource block comprised in the second resource pool occupies a start multicarrier symbol in at least one multicarrier symbol comprised in a slot.

In one embodiment, the first configuration information comprises SL-BWP-PoolConfig.

In one embodiment, the first configuration information comprises SL-BWP-PoolConfigCommon.

In one embodiment, the definition of the SL-BWP-PoolConfig refers to 3GPP TS38.331, section 6.3.5.

In one embodiment, the definition of the SL-BWP-PoolConfigCommon refers to 3GPP TS38.331, section 6.3.5.

In one embodiment, the M nodes respectively transmit the M first-type signalings, the M first-type signalings respectively carry M source IDs, and the M source IDs are respectively used to identify the M nodes; the second node transmits the first signaling, the second node is one of the M nodes, and the first signaling is one of the M first-type signalings.

In one embodiment, the M first-type nodes are respectively transmitted by M nodes.

In one embodiment, the M nodes are respectively transmitters of the M first-type signalings.

In one embodiment, a transmitter of any of the M first-type signalings is one of the M nodes.

In one embodiment, M nodes respectively transmit M first-type signalings.

In one embodiment, any of the M nodes is a UE.

In one embodiment, at least one of the M nodes is a relay node.

In one embodiment, at least one of the M nodes is a base station.

In one embodiment, the M nodes comprises a UE and a relay node.

In one embodiment, any two of the M nodes are different.

In one embodiment, the first node U1A is different from any of the M nodes.

In one embodiment, the first node U1A is not one of the M nodes.

In one embodiment, the M nodes and the first node are all UEs.

In one embodiment, a target receiver of any of the M first-type signalings is the first node U1A.

In one embodiment, any two of the M nodes are non-co-located.

In one embodiment, a first signaling and a second signaling are respectively any two of M first-type signalings.

In one embodiment, a node transmitting the first signaling and a node transmitting the second node are non-co-located.

In one embodiment, a node transmitting the first signaling and a node transmitting the second signaling are respectively two different nodes in the M nodes.

In one embodiment, a node transmitting the first signaling and a node transmitting the second signaling are two different UEs.

In one embodiment, a Backhaul Link between a node transmitting the first signaling and a node transmitting the second signaling is non-ideal (that is, delay cannot be ignored).

In one embodiment, a node transmitting the first signaling and a node transmitting the second signaling do not share a same baseband device.

In one embodiment, the M source IDs are respectively used to identify the M nodes.

In one embodiment, any of the M source IDs is used to identify one of M nodes.

In one embodiment, any two of the M source IDs are different.

In one embodiment, a first source ID is used to identify a node transmitting the first signaling, a second source ID is used to identify a node transmitting the second signaling, and the first source ID and the second source ID are respectively two of the M source IDs.

In one embodiment, any of the M source IDs comprises X bit(s), X being a positive integer.

In one embodiment, the X is configurable.

In one embodiment, X is equal to 16.

In one embodiment, the X is equal to 8.

In one embodiment, any of the M source IDs is X power of 2.

In one embodiment, any of the M source IDs is a positive integer less than 16777217.

In one embodiment, the first source ID and the second source ID are respectively two different positive integers.

In one embodiment, any of the M source IDs comprises a source ID.

In one embodiment, any of the M source IDs comprises a Layer-1 Source ID.

In one embodiment, the first source ID and the second source ID are respectively two different Layer-1 Source IDs.

In one embodiment, any of the M source IDs comprises an SL source ID.

In one embodiment, any of the M source IDs comprises a Radio Network Temporary Identifier (RNTI).

In one embodiment, any of the M source IDs comprises a Cell-Radio Network Temporary Identifier (C-RNTI).

In one embodiment, any of the M source IDs comprises a Temporary Cell-Radio Network Temporary Identifier (TC-RNTI).

In one embodiment, any of the M source IDs comprises an International Mobile Subscriber Identifier (IMSI).

In one embodiment, any of the M first-type signalings comprises one or a plurality of fields in a PHY layer signaling.

In one embodiment, any of the M first-type signalings comprises one or a plurality of fields in SCI.

In one embodiment, any of the M first-type signalings comprises SCI.

In one embodiment, any of the M first-type signalings comprises a first-level SCI format and a second-level SCI format.

In one embodiment, the definition of the first-level SCI format refers to 3GPP TS38.212, section 8.3.

In one embodiment, the definition of the second-level SCI format refers to 3GPP TS38.212, section 8.4.

In one embodiment, any of the M first-type signalings comprises a Sidelink Synchronization Signal (SLSS).

In one embodiment, any of the M first-type signalings comprises an S-SS/PSBCH block.

In one embodiment, any of the M first-type signalings comprises all or part of a higher-layer signaling.

In one embodiment, any of the M first-type signaling comprises all or part of an RRC-layer signaling.

In one embodiment, any of the M first-type signalings comprises one or a plurality of fields in an RRC IE.

In one embodiment, any of the M first-type signalings comprises all or part of a PC5-RRC signaling.

In one embodiment, any of the M first-type signalings comprises all or part of a MAC-layer signaling.

In one embodiment, any of the M first-type signalings comprises one or a plurality of fields in a MAC CE.

In one embodiment, any of the M first-type signalings comprises an SL IE.

In one embodiment, a channel occupied by any of the M first-type signalings comprises a Physical Sidelink Broadcast Channel (PSBCH).

In one embodiment, a channel occupied by any of the M first-type signalings comprises a PSCCH.

In one embodiment, a channel occupied by any of the M first-type signalings comprises a PSSCH.

In one embodiment, the M is a positive integer greater than 1.

In one embodiment, M is a positive integer greater than 1 and less than 1000.

In one embodiment, the M first-type signalings respectively carry M source IDs.

In one embodiment, the first signaling carries the first source ID.

In one embodiment, the first signaling directly indicates the first source ID.

In one embodiment, the first signaling indirectly indicates the first source ID.

In one embodiment, the first signaling comprises the first source ID.

In one embodiment, the first signaling comprises at least one field, and the first source ID is one of the at least one field comprised in the first signaling.

In one embodiment, the first source ID is used to scramble the first signaling.

In one embodiment, the first source ID is used to generate an initial value of a scrambling sequence generating the first signaling.

In one embodiment, the M first-type signalings respectively indicate the M candidate resource sets.

In one embodiment, the M first-type signalings respectively indicate M candidate resource sets, and any of the M candidate resource sets comprises at least one time-frequency resource block.

In one embodiment, any of the M first-type signalings indicates one of the M candidate resource sets.

In one embodiment, the M first-type signalings respectively indicate time-frequency resources occupied by the M candidate resource sets.

In one embodiment, any of the M first-type signalings indicates time-frequency resources occupied by one of the M candidate resource sets.

In one embodiment, any of the M first-type signalings indicates time-domain resources occupied by one of the M candidate resource sets.

In one embodiment, any of the M first-type signalings indicates frequency-domain resources occupied by one of the M candidate resource sets.

In one embodiment, any of the M first-type signaling indicates the at least one time-frequency resource block comprised in one of the M candidate resource sets.

In one embodiment, any of the M first-type signaling indicates the at least one time-domain resource block comprised in one of the M candidate resource sets.

In one embodiment, any of the M first-type signaling indicates the at least one frequency-domain resource block comprised in one of the M candidate resource sets.

In one embodiment, any of the M first-type signalings indicates a position of the at least one time-frequency resource block comprised in one of the M candidate resource sets in the second resource pool.

In one embodiment, any of the M first-type signalings indicates an index of the at least one time-frequency resource block comprised in one of the M candidate resource sets in the plurality of time-frequency resource blocks comprised in the second resource pool.

In one embodiment, a first signaling is any of the M first-type signalings.

In one embodiment, a first signaling carries a first source ID, and the first source ID is any of the M source IDs.

In one embodiment, a first signaling carries a first source ID, and the first source ID is used to identify a second node U2A in the present disclosure.

In one embodiment, a transmitter of the first signaling is a second node U2A in the present disclosure.

In one embodiment, a second U2A in the present disclosure is one of the M nodes.

In one embodiment, the first signaling indicates at least a latter one of a first zone ID and a first candidate resource set.

In one embodiment, the first signaling indicates the first candidate resource set.

In one embodiment, the first signaling indicates the first zone ID and the first candidate resource set.

In one embodiment, the first signaling comprises a plurality of fields, and the first zone ID and the first candidate resource set are respectively two fields in the plurality of fields comprised in the first signaling.

In one embodiment, the first zone ID is used to scramble the first signaling, and the first candidate resource set is one of a plurality of fields comprised in the first signaling.

In one embodiment, the first signaling indicates at least one time-frequency resource block comprised in the first candidate resource set.

In one embodiment, the first signaling indicates time-domain resources occupied by the first candidate resource set.

In one embodiment, the first signaling indicates frequency-domain resources occupied by the first candidate resource set.

In one embodiment, the first signaling indicates that the first candidate resource set occupies a time-frequency resource block in the second resource pool.

In one embodiment, the first signaling indicates a position of any of the at least one time-frequency resource block comprised in the first candidate resource set in the plurality of time-frequency resource blocks comprised in the second resource pool.

In one embodiment, the first signaling indicates an index of any of the at least one time-frequency resource block comprised in the first candidate resource set in the plurality of time-frequency resource blocks comprised in the second resource pool.

Embodiment 5B

Figure 5B:
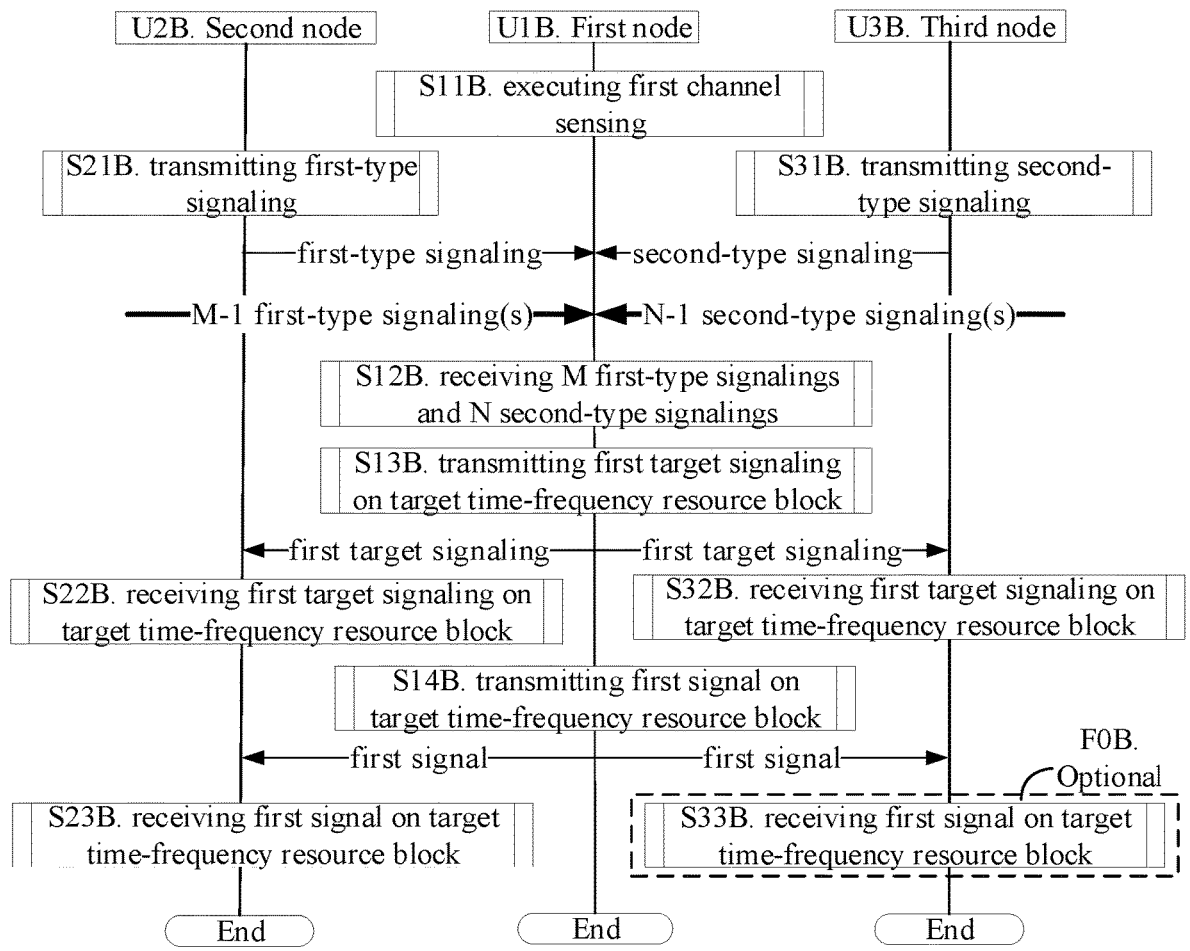
FIG. 5B illustrates a flowchart of radio signal transmission according to one embodiment of the present disclosure.

Embodiment 5B illustrates a flowchart of radio signal transmission according to one embodiment in the present disclosure, as shown in FIG. 5. In FIG. 5B, a first node U1B, a second node U2B and a third node U3B are in communications via an air interface, and steps in box FOB in FIG. 5B are optional.

The first node U1B executes a first channel sensing in step S11B; receives M first-type signalings and N second-type signalings in step S12B; transmits a first target signaling on a target time-frequency resource block in step S13B; and transmits a first signal on a target time-frequency resource block in step S14B.

The second node U2B transmits a first-type signaling in step S21B; receives a first target signaling on a target time-frequency resource block in step S22B; and receives a first signal on a target time-frequency resource block in step S23B.

The third node U3B transmits a second-type signaling in step S31B; receives a first target signaling on a target time-frequency resource block in step S32B; and receives a first signal on a target time-frequency resource block in step S33B.

In embodiment 5B, the first channel sensing is used to determine a target resource pool, and the target resource pool comprises a plurality of time-frequency resource blocks; a first candidate time-frequency resource block is one of a plurality of time-frequency resource blocks comprised in the target resource pool; the target time-frequency resource block belongs to a target resource subset, the target resource subset comprises at least one time-frequency resource block, and any time-frequency resource block comprised in the target resource subset belongs to the target resource pool; any of the M first-type signalings indicates the first candidate time-frequency resource block; any of the N second-type signalings indicates the first candidate time-frequency resource block, and any of the M first-type signalings and any of the N second-type signalings are different; transmitters of any two of the M first-type signaligs are non-co-located; transmitters of any two of the N second-type signaligs are non-co-located; both M and N are used together to determine whether the first candidate time-frequency resource block is within the target resource subset; the first channel sensing is executed in a first resource pool, and the first resource pool comprises a plurality of time-frequency resource blocks; any of the plurality of time-frequency resource blocks comprised in the target resource pool is associated with a time-frequency resource block in the first resource pool; the first candidate time-frequency resource block is associated with a first time-frequency resource block, and the first time-frequency resource is one of the plurality of time-frequency resource blocks comprised in the first resource pool; a measurement value for the first time-frequency resource block is not higher than a first threshold; the first target signaling is used to indicate the target time-frequency resource block; the first target signaling comprises a first priority, and the first priority is used to determine the first threshold.

In one embodiment, a first signaling is any of the M first-type signalings; a second signaling is any of the N second-type signalings; and the first signaling is different from the second signaling.

In one embodiment, both a magnitude order between M and a first value and a magnitude order between N and a second value are used together to determine whether the first candidate time-frequency resource block belongs to the target resource subset; the first value is predefined, or the first value is configurable; the second value is predefined, or the second value is configurable.

In one embodiment, a magnitude order between M and N is used to determine whether the first candidate time-frequency resource block is within the target resource subset.

In one embodiment, the first node U1B and the second node U2B are in communications via a PC5 interface.

In one embodiment, the first node U1B and the third node U3B are in communications via a PC5 interface.

In one embodiment, steps in box FOB in FIG. 5B exist.

In one embodiment, steps in box FOB in FIG. 5B do not exist.

In one embodiment, the second-type signaling transmitted by the third node U3B does not indicate the target time-frequency resource block, and steps in box FOB in FIG. 5B exist.

In one embodiment, the second-type signaling transmitted by the third node U3B indicates the target time-frequency resource block, and steps in box FOB in FIG. 5B do not exist.

In one embodiment, the second-type signaling transmitted by the third node U3B indicates the target time-frequency resource block, the target time-frequency resource block is associated with a time-frequency resource block in the first resource pool, a measurement value of the third node U3B for a time-frequency resource block associated with the target time-frequency resource block in the first resource pool is higher than a first target threshold, and steps in box FOB in FIG. 5B do not exist.

In one embodiment, the second-type signaling transmitted by the third node U3B indicates the target time-frequency resource block, the target time-frequency resource block is associated with a time-frequency resource block in the first resource pool, the third node U3B does not monitor a time-frequency resource block associated with the target time-frequency resource block in the first resource pool, and steps in box FOB in FIG. 5B do not exist.

In one embodiment, a first signaling is any of the M first-type signalings.

In one embodiment, a second signaling is any of the N second-type signalings.

In one embodiment, a transmitter of one of the M first-type signalings is non-co-located with a transmitter of one of the N second-type signalings.

In one embodiment, a transmitter of one of the M first-type signalings and a transmitter of one of the N second-type signalings are respectively two different communication nodes.

In one embodiment, a transmitter of one of the M first-type signalings is the second node U2B, and a transmitter of one of the N second-type signaling is the third node U3B.

In one embodiment, a transmitter of one of the M first-type signalings and a transmitter of one of the N second-type signalings are respectively two different UEs.

In one embodiment, a Backhaul Link between a transmitter of one of the M first-type signalings and a transmitter of one of the N second-type signalings is non-ideal (that is, a delay cannot be ignored).

In one embodiment, a transmitter of one of the M first-type signalings and a transmitter of one of the N second-type signalings do not share a same baseband device.

In one embodiment, a transmitter of at least one of the M first-type signalings and a transmitter of at least one of the N second-type signalings are co-located.

In one embodiment, a transmitter of at least one of the M first-type signalings and a transmitter of at least one of the N second-type signalings are respectively two different communication nodes.

In one embodiment, a transmitter of at least one of the M first-type signalings is the second node U2B, and a transmitter of at least one of the N second-type signaling is the third node U3B.

In one embodiment, a transmitter of at least one of the M first-type signalings and a transmitter of at least one of the N second-type signalings are respectively two different UEs.

In one embodiment, a Backhaul Link between a transmitter of at least one of the M first-type signalings and a transmitter of at least one of the N second-type signalings is non-ideal (that is, a delay cannot be ignored).

In one embodiment, a transmitter of at least one of the M first-type signalings and a transmitter of at least one of the N second-type signalings do not share a same baseband device.

In one embodiment, a first signaling is one of the M first-type signalings, and a second signaling is one of N second-type signalings; and a transmitter of the first signaling and a transmitter of the third signaling are non-co-located.

In one embodiment, a transmitter of the first signaling and a transmitter of the second signaling are respectively two different communication nodes.

In one embodiment, a transmitter of the first signaling is the second node U2B, and a transmitter of the second signaling is the third node U3B.

In one embodiment, a transmitter of the first signaling and a transmitter of the second signaling are respectively two different UEs.

In one embodiment, a Backhaul Link between a transmitter of the first signaling and a transmitter of the second signaling is non-ideal (that is, a delay cannot be ignored).

In one embodiment, a transmitter of the first signaling and a transmitter of the second signaling do not share a same baseband device.

In one embodiment, the first signaling carries a first ID, a second signaling carries a second ID, the first ID is used to identify a transmitter of the first signaling, and the second ID is used to identify a transmitter of the second signaling.

In one embodiment, the first signaling comprises a plurality of fields, and the first identity is one of the plurality of fields comprised in the first signaling.

In one embodiment, the second signaling comprises a plurality of fields, and the second ID is one of a plurality of fields comprised in the second signaling.

In one embodiment, the first ID is used to scramble the first signaling.

In one embodiment, the second ID is used to scramble the second signaling.

In one embodiment, the first signaling comprises a plurality of fields, and the first identity is one of the plurality of fields comprised in the first signaling; the second ID is used to scramble the second signaling.

In one embodiment, the first ID is used to scramble the first signaling; the second signaling comprises a plurality of fields, and the second ID is one of the plurality of fields comprised in the second signaling.

In one embodiment, the first ID and the second ID are respectively two of X1 first-type IDs, X1 being a positive integer greater than 1.

In one embodiment, the M first-type signalings respectively carry M first-type IDs out of X1 first-type IDs, M being a positive integer not greater than X1.

In one embodiment, any of the M first-type IDs is used to identify a transmitter of one of the M first-type signalings.

In one embodiment, the N second-type signalings respectively carry N of X1 first-type IDs, N being a positive integer not greater than X1.

In one embodiment, any of the N first-type IDs is used to identify a transmitter of one of the N second-type signalings.

In one embodiment, a number of bits comprised in any of the X1 first-type IDs is configurable.

In one embodiment, any of the X1 first-type IDs comprises 16 bits.

In one embodiment, any of the X1 first-type IDs comprises 8 bits.

In one embodiment, X1 is equal to a power of 16th power of 2.

In one embodiment, X1 is equal to a power of 8th power of 8.

In one embodiment, the first ID comprises 16 bits, and the second ID comprises 16 bits.

In one embodiment, the first ID comprises 8 bits, and the second ID comprises 8 bits.

In one embodiment, any of the X1 first-type IDs comprises a source ID.

In one embodiment, any of the X1 first-type IDs comprises a layer-1 source ID.

In one embodiment, any of the X1 first-type IDs comprises an SL source ID.

In one embodiment, any of X1 first-type IDs comprises a Radio Network Temporary Identifier (RNTI).

In one embodiment, any of the X1 first-type IDs comprises a Cell-Radio Network Temporary Identifier (C-RNTI).

In one embodiment, any of the X1 first-type IDs comprises a Temporary Cell-Radio Network Temporary Identifier (TC-RNTI).

In one embodiment, any of the X1 first-type IDs comprises an International Mobile Subscriber Identifier (IMSI).

In one embodiment, a first signaling is one of the M first-type signalings, and a second signaling is one of the N second-type signalings; a transmitter of the first signaling and a transmitter of the third signaling are co-located.

In one embodiment, a transmitter of the first signaling and a transmitter of the second signaling are a same communication node.

In one embodiment, a transmitter of the first signaling and a transmitter of the second signaling are both the second node U2B.

In one embodiment, a transmitter of the first signaling and a transmitter of the second signaling are a same UE.

In one embodiment, a Backhaul Link between a transmitter of the first signaling and a transmitter of the second signaling is ideal (that is, a delay can be ignored).

In one embodiment, a transmitter of the first signaling and a transmitter of the second signaling share a same baseband device.

In one embodiment, the first signaling carries a first ID, a second signaling also carries a first ID, the first ID is used to identify a transmitter of the first signaling, and the first ID is used to identify a transmitter of the second signaling.

In one embodiment, the first signaling comprises a plurality of fields, and the first identity is one of the plurality of fields comprised in the first signaling; the second signaling comprises a plurality of fields, and the first ID is one of a plurality of fields comprised in the second signaling.

In one embodiment, the first ID is used to scramble the first signaling; and the first ID is used to scramble the second signaling.

In one embodiment, the first ID is one of X1 first-type IDs, X1 being a positive integer greater than 1.

In one embodiment, transmitters of any two of the M first-type signaligs are non-co-located.

In one embodiment, transmitters of any two of the M first-type signalings are respectively two different communication nodes.

In one embodiment, transmitters of any two of the M first-type signalings are respectively the second node U2B and another communication node different from the second node U2B.

In one embodiment, transmitters of any two of the M first-type signalings are respectively two different UEs.

In one embodiment, a backhaul link between transmitters of any two of the M first-type signalings is non-ideal (that is, a delay cannot be ignored).

In one embodiment, transmitters of any two of the M first-type signalings do not share a same baseband device.

In one embodiment, transmitters of any two of the N second-type signalings are non-co-located.

In one embodiment, transmitters of any two of the N second-type signalings are respectively two different communication nodes.

In one embodiment, transmitters of any two of the N second-type signalings are respectively the third node U3B and another communication node different from the third node U3B.

In one embodiment, transmitters of any two of the N second-type signalings are respectively two different UEs.

In one embodiment, a backhaul link between transmitters of any two of the N second-type signalings is non-ideal (that is, a delay cannot be ignored).

In one embodiment, transmitters of any two of the N second-type signalings do not share a same baseband device.

In one embodiment, a third signaling is one of the M first-type signalings different from the first signaling, and a transmitter of the first signaling and a transmitter of the third signaling are non-co-located.

In one embodiment, a first signaling and a third signaling are any two different first-type signalings in the M first-type signalings, and a transmitter of the first signaling and a transmitter of the third signaling are non-co-located.

In one embodiment, a transmitter of the first signaling and a transmitter of the third signaling are respectively two different communication nodes.

In one embodiment, a transmitter of the first signaling is the second node U2B, and a transmitter of the third signaling is a communication node different from the second node U2B.

In one embodiment, a transmitter of the first signaling and a transmitter of the third signaling are respectively two different UEs.

In one embodiment, a Backhaul Link between a transmitter of the first signaling and a transmitter of the third signaling is non-ideal (that is, a delay cannot be ignored).

In one embodiment, a transmitter of the first signaling and a transmitter of the third signaling do not share a same baseband device.

In one embodiment, the first signaling carries a first ID, a third signaling carries a third ID, the first ID is used to identify a transmitter of the first signaling, and the third ID is used to identify a transmitter of the third signaling.

In one embodiment, the first signaling comprises a plurality of fields, and the first identity is one of the plurality of fields comprised in the first signaling; the third signaling comprises a plurality of fields, and the third ID is one of a plurality of fields comprised in the third signaling.

In one embodiment, the first ID is used to scramble the first signaling; and the third ID is used to scramble the third signaling.

In one embodiment, the first signaling comprises a plurality of fields, and the first identity is one of the plurality of fields comprised in the first signaling; and the third ID is used to scramble the third signaling.

In one embodiment, the first ID is used to scramble the first signaling; the third signaling comprises a plurality of fields, and the third ID is one of a plurality of fields comprised in the third signaling.

In one embodiment, the first ID and the third ID are respectively two of X1 first-type IDs, X1 being a positive integer greater than 1.

In one embodiment, the first ID comprises 16 bits, and the third ID comprises 16 bits.

In one embodiment, the first ID comprises 8 bits, and the third ID comprises 8 bits.

In one embodiment, a fourth signaling is one of the N second-type signalings different from the second signaling, and a transmitter of the second signaling and a transmitter of the fourth signaling are non-co-located.

In one embodiment, a second signaling and a fourth signaling are any two different second-type signalings in the N second-type signalings, and a transmitter of the second signaling and a transmitter of the fourth signaling are non-co-located.

In one embodiment, a transmitter of the second signaling and a transmitter of the fourth signaling are respectively two different communication nodes.

In one embodiment, a transmitter of the second signaling is the third node U3B, and a transmitter of the fourth signaling is a communication node different from the third node U3B.

In one embodiment, a transmitter of the second signaling and a transmitter of the fourth signaling are respectively two different UEs.

In one embodiment, a Backhaul Link between a transmitter of the second signaling and a transmitter of the fourth signaling is non-ideal (that is, a delay cannot be ignored).

In one embodiment, a transmitter of the second signaling and a transmitter of the fourth signaling do not share a same baseband device.

In one embodiment, the second signaling carries a second ID, the fourth signaling carries a fourth ID, the second ID is used to identify a transmitter of the second signaling, and the fourth ID is used to identify a transmitter of the fourth signaling.

In one embodiment, the second signaling comprises a plurality of fields, and the second ID is one of a plurality of fields comprised in the second signaling; the fourth signaling comprises a plurality of fields, and the fourth ID is one of a plurality of fields comprised in the fourth signaling.

In one embodiment, the second ID is used to scramble the second signaling; the fourth ID is used to scramble the fourth signaling.

In one embodiment, the second signaling comprises a plurality of fields, and the second ID is one of a plurality of fields comprised in the second signaling; the fourth ID is used to scramble the fourth signaling.

In one embodiment, the second ID is used to scramble the second signaling; the fourth signaling comprises a plurality of fields, and the fourth ID is one of a plurality of fields comprised in the fourth signaling.

In one embodiment, the second ID and the fourth ID are respectively two of X1 first-type IDs, X1 being a positive integer greater than 1.

In one embodiment, the second ID comprises 16 bits, and the fourth ID comprises 16 bits.

In one embodiment, the second ID comprises 8 bits, and the fourth ID comprises 8 bits.

Embodiment 6A

Figure 6A:
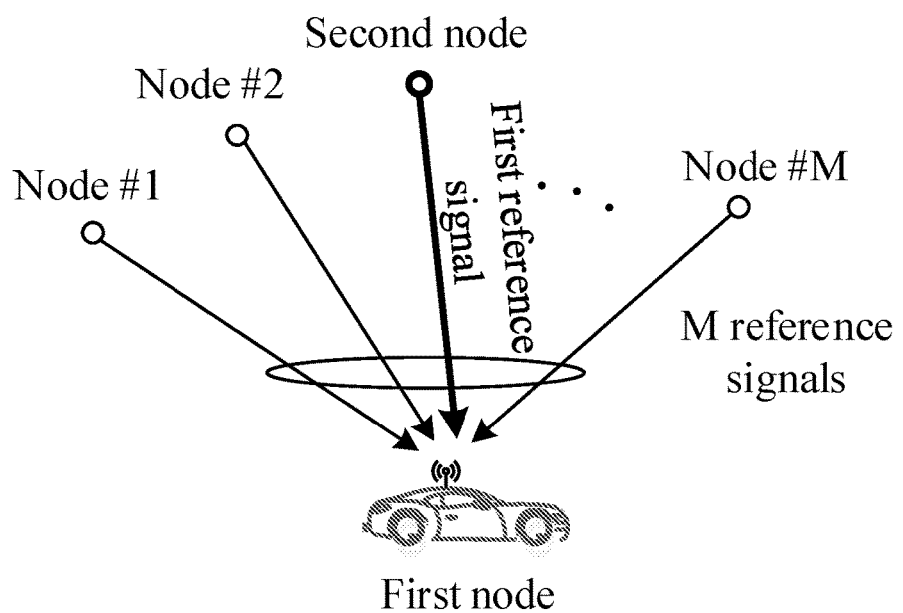
FIG. 6A illustrates a schematic diagram of relations among M nodes and M first-type signalings according to one embodiment of the present disclosure.

Embodiment 6A illustrates a schematic diagram of relations among M nodes and M first-type signalings according to one embodiment of the present disclosure, as shown in FIG. 6A. In FIG. 6A, the circle represents one of M nodes in the present disclosure; the thick solid circle represents a second node in the present disclosure; the solid arrow represents one of M first-type signalings in the present disclosure; and the thick solid arrow represents a first signaling in the present disclosure.

In embodiment 6A, the M first-type signalings respectively indicate M reference signals; a first signaling indicates a first reference signal, and the first reference signal is one of the M reference signals; whether a measurement for the first reference signal is a maximum value in measurements performed on the M reference signals is used to determine whether the first candidate resource set belongs to the target resource pool.

In one embodiment, the M reference signals respectively comprise M first-type sequences.

In one embodiment, M first-type sequences are respectively used to generate the M reference signals.

In one embodiment, any of the M first-type sequences is a pseudo-random sequence.

In one embodiment, any of the M first-type sequences is a low peak-to-average ratio sequence.

In one embodiment, any of the M first-type sequences is a gold sequence.

In one embodiment, any of the M first-type sequences is an M sequence.

In one embodiment, any of the M first-type sequences is a ZC sequence.

In one embodiment, any of the M first-type sequences is sequentially through sequence generation, Discrete Fourier Transform (DFT), modulation and resource element mapping, and wideband symbol generation to acquire one of the M reference signals.

In one embodiment, any of the M first-type sequences is sequentially through sequence generation, resource element mapping, and wideband symbol generation to acquire one of the M reference signals.

In one embodiment, one of the M reference signals comprises a PSCCH DMRS.

In one embodiment, one of the M reference signals comprises a PSSCH DMRS.

In one embodiment, one of the M reference signals comprises an Uplink (UL) DMRS.

In one embodiment, the M reference signals are respectively used to demodulate the M first-type signalings.

In one embodiment, the M first-type signalings respectively indicate time-frequency resources occupied by M first-type bit blocks, and the M reference signals are respectively used to demodulate the M first-type bit blocks.

In one embodiment, any of the M first-type bit blocks comprises at least one bit.

In one embodiment, the M first-type bit blocks are respectively used to indicate the M candidate resource sets.

In one embodiment, the M first-type signalings respectively indicate the M reference signals.

In one embodiment, any of the M first-type signalings indicates one of the M reference signals.

In one embodiment, a first target signaling is any of the M first-type signalings, the first target signaling indicates a first target reference signal, and the first target reference signal is one of the M reference signals.

In one embodiment, the first target reference signal comprises the first reference signal in the present disclosure.

In one embodiment, the first target signaling comprises a plurality of fields, and the first target reference signal is one of the plurality of fields comprised in the first target signaling.

In one embodiment, an index of the first target reference signal in the M reference signals is used to scramble the first target signaling.

In one embodiment, the first target reference signal is used to demodulate the first target signaling.

In one embodiment, the first target reference signal is used to demodulate the first target candidate resource set, the first target signaling indicates the first target candidate resource set, and the first target candidate resource set is one of the M candidate resource sets.

In one embodiment, the first target signaling comprises a first target bit block, the first target bit block indicates the first target candidate resource set, and the first target reference signal is used to demodulate the first target bit block.

In one embodiment, the first target signaling is used to schedule a first target bit block, the first target bit block indicates the first target candidate resource set, and the first target reference signal is used to demodulate the first target bit block.

In one embodiment, the first node measures the M reference signals respectively.

In one embodiment, the first node measures any of the M reference signals.

In one embodiment, the M reference signals are respectively measured to acquire M first-type measurement values.

In one embodiment, any of the M reference signals is measured to acquire one of the M first-type measurement values.

In one embodiment, the M reference signals respectively correspond to the M first-type measurement values.

In one embodiment, a first measurement value is acquired by a measurement performed on the first reference signal, and the first measurement value is one of the M first-type measurement values.

In one embodiment, the M first-type measurement values are respectively RSRP of the M reference signals.

In one embodiment, the M first-type measurement values are respectively Received Signal Strength Indications (RSSIs) of the M reference signals.

In one embodiment, the M first-type measurement values are respectively Reference Signal Receiving Quality (RSRQ) of the M reference signals.

In one embodiment, any of the M first-type measurement values comprises RSRP of one of the M reference signals.

In one embodiment, any of the M first-type measurement values comprises an RSSI of one of the M reference signals.

In one embodiment, any of the M first-type measurement values comprises RSRQ of one of the M reference signals.

In one embodiment, any of the M first-type measurement values is L1-RSRP.

In one embodiment, any of the M first-type measurement values is L3-RSRP.

In one embodiment, any of the M first-type measurement values is SL RSRP.

In one embodiment, any of the M first-type measurement values is SL RSSI.

In one embodiment, any of the M first-type measurement values is SL RSRQ.

In one subembodiment, any of the M first-type measurement values is a Channel Quality Indicator (CQI).

In one embodiment, any of the M first-type measurement values is measured by dBm.

In one embodiment, any of the M first-type measurement values is measured by dB.

In one embodiment, any of the M first-type measurement values is measured by mW.

In one embodiment, any of the M first-type measurement values is measured by W.

In one embodiment, a magnitude order of a measurement performed on the first reference signal among measurements respectively performed on the M reference signals is used to determine whether the first candidate resource set is within the target resource pool.

In one embodiment, a magnitude order of the first measurement value among the M first-type measurement values is used to determine whether the first candidate resource set is within the target resource pool.

In one embodiment, a measurement performed on the first reference signal is a maximum value in measurements respectively performed on the M reference signals, and the first candidate resource set belongs to the target resource pool.

In one embodiment, the first measurement value is a maximum value in the M first-type measurement values, and the first candidate resource set belongs to the target resource pool.

In one embodiment, a measurement performed on the first reference signal is not a maximum value in measurements respectively performed on the M reference signals, and the first candidate resource set does not belong to the target resource pool.

In one embodiment, the first measurement value is not a maximum value in the M first-type measurement values, and the first candidate resource set does not belong to the target resource pool.

In one embodiment, a second measurement value is one of the M first-type measurement values, the second measurement value is different from the first measurement value, the second measurement value is greater than the first measurement value, and a time-frequency resource block in the first candidate resource set is different from any of the plurality of time-frequency resource blocks comprised in the target resource pool.

In one embodiment, when a measurement performed on the first reference signal is a maximum value in measurements respectively performed on the M reference signals, the first candidate resource set belongs to the target resource pool; when a measurement performed on the first reference signal is not a maximum value in measurements respectively performed on the M reference signals, the first candidate resource set does not belong to the target resource pool.

In one embodiment, when the first measurement value is a maximum value in the M first-type measurement values, the first candidate resource set belongs to the target resource pool; when the first measurement value is not a maximum value in the M first-type measurement values, the first candidate resource set does not belong to the target resource pool.

In one embodiment, when the first measurement value is a maximum value in the M first-type measurement values, the first candidate resource set belongs to the target resource pool; when a second measurement value is greater than the first measurement value, the second measurement value is one of the M first-type measurement values, at least one time-frequency resource block in the first candidate resource set is different from any of the plurality of time-frequency resource block comprised in the target resource pool.

Embodiment 6B

Figure 6B:
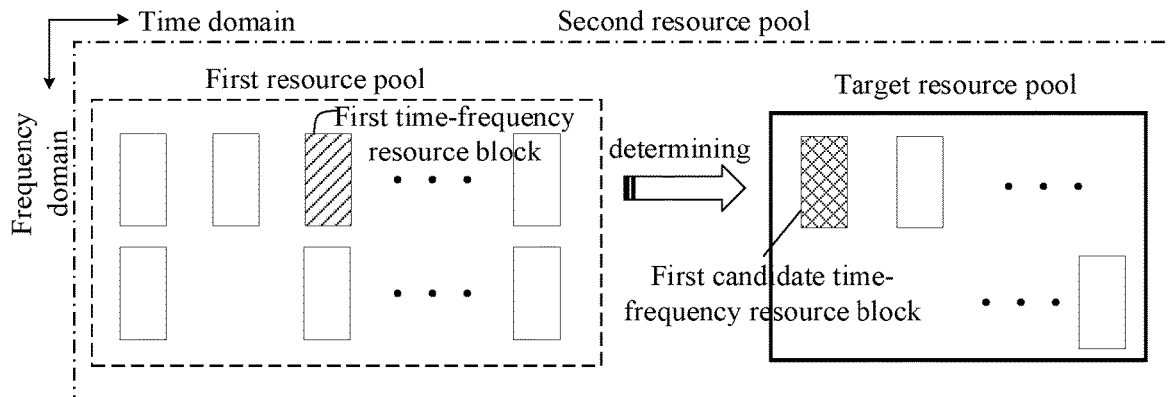
FIG. 6B illustrates a schematic diagram of a relation of a first resource pool and a first time-domain resource block with a target resource pool and a first candidate time-frequency resource block according to one embodiment of the present disclosure.

Embodiment 6B illustrates a schematic diagram of a relation of a first resource pool and a first time-domain resource block with a target resource pool and a first candidate time-frequency resource block according to one embodiment of the present disclosure, as shown in FIG. 6B. In FIG. 6B, the dotted dashed big rectangle represents a second resource pool in the present disclosure; the dashed rectangle represents a first resource pool in the present disclosure; the rectangle in the dashed rectangle represents a time-frequency resource block in a first resource pool; the slash-filled rectangle represents a first time-frequency resource block in the present disclosure; the thick solid rectangle represents a target resource pool in the present disclosure; and the cross-line filled rectangle represents a first candidate time-frequency resource block in the present disclosure.

In embodiment 6B, a second resource pool is used to determine a first resource pool, and the first channel sensing is executed in the first resource pool; the first resource pool comprises a plurality of time-frequency resource blocks; any of the plurality of time-frequency resource blocks comprised in the target resource pool is associated with a time-frequency resource block in the first resource pool; the first time-frequency resource block is one of the plurality of time-frequency resource blocks comprised in the first resource pool, and the first candidate time-frequency resource block is associated with the first time-frequency resource block; a measurement value for the first time-frequency resource block is not higher than a first threshold; the first signal is used to determine a first priority, and the first priority is used to determine the first threshold; the first target signaling carries the first priority.

In one embodiment, the first target signaling comprises one or more fields of a PHY layer signaling.

In one embodiment, the first target signaling comprises one or more fields in a piece of SCI.

In one embodiment, the first target signaling is a piece of SCI.

In one embodiment, the first target signaling comprises at least one a plurality of fields of a first-level SCI format and at least one of a plurality fields of a second-level SCI format.

In one embodiment, the first target signaling comprises all or part of a higher-layer signaling.

In one embodiment, the first target signaling comprises all or part of an RRC layer signaling.

In one embodiment, the first target signaling comprises all or part of a PC5-RRC signaling.

In one embodiment, the first target signaling comprises all or part of a MAC layer signaling.

In one embodiment, the first target signaling is transmitted on a PSCCH.

In one embodiment, the first target signaling is transmitted on a PSCCH and a PSSCH.

In one embodiment, the first target signaling indicates the target time-frequency resource block.

In one embodiment, the first target signaling indicates time-domain resources occupied by the target time-frequency resource block.

In one embodiment, the first target signaling indicates frequency-domain resources occupied by the target time-frequency resource block.

In one embodiment, the first target signaling indicates time-frequency resources occupied by the target time-frequency resource block.

In one embodiment, the first target signaling indicates the plurality of REs comprised in the target time-frequency resource block.

In one embodiment, the first target signaling indicates that the target time-frequency resource block occupies at least one time-domain resource block in the first resource pool.

In one embodiment, the first target signaling indicates that the target time-frequency resource block occupies at least one frequency-domain resource block in the first resource pool.

In one embodiment, the first target signaling indicates that the target time-frequency resource block occupies at least one time-frequency resource block in the first resource pool.

In one embodiment, the second resource pool is used to determine the first resource pool.

In one embodiment, the first resource pool comprises a plurality of time-frequency resource blocks within the first sensing window in the second resource pool.

In one embodiment, the first sensing window comprises a plurality of time-domain resource blocks in the second resource pool.

In one embodiment, the first sensing window is measured by ms.

In one embodiment, the first sensing window is 10 ms.

In one embodiment, the first sensing window is 1000 ms.

In one embodiment, the first resource pool comprises a plurality of REs.

In one embodiment, the first resource pool comprises a plurality of time-domain resource blocks in time domain.

In one embodiment, the first resource pool comprises a plurality of resource pools in frequency domain.

In one embodiment, the first resource pool comprises a plurality of time-domain resource blocks in time domain, and the first resource pool comprises a plurality of frequency-domain resource blocks in frequency domain.

In one embodiment, the first resource pool comprises a plurality of time-frequency resource blocks.

In one embodiment, the second resource pool comprises the first resource pool.

In one embodiment, any of the plurality of time-domain resource blocks comprised by the first resource pool in time domain is one of the plurality of time-domain resource blocks comprised by the second resource pool in time domain.

In one embodiment, any of the plurality of frequency-domain resource blocks comprised by the first resource pool in frequency domain is one of the plurality of frequency-domain resource blocks comprised by the second resource pool in frequency domain.

In one embodiment, any of the plurality of time-frequency resource blocks comprised in the first resource pool is one of the plurality of time-frequency resource blocks comprised in the second resource pool.

In one embodiment, the first resource pool is used for the first channel sensing.

In one embodiment, the first resource pool is used for a resource sensing in SL resource allocation mode 2.

In one embodiment, the first resource pool is indicated by a higher-layer signaling.

In one embodiment, any of the plurality of time-frequency resource blocks comprised in the target resource pool is associated with one of the plurality of time-frequency resource blocks comprised in the first resource pool.

In one embodiment, a given candidate time-frequency resource block is any of the plurality of time-frequency resource blocks comprised in the target resource pool, a given time-frequency resource block is one of the plurality of time-frequency resource blocks comprised in the first resource pool, and the given candidate time-frequency resource block is associated with the given time-frequency resource block.

In one embodiment, the given candidate time-frequency resource block in the target resource pool is associated with the given time-frequency block in the first resource pool.

In one embodiment, the given time-frequency resource block in the first resource pool is associated with the given candidate time-frequency resource block in the target resource pool.

In one embodiment, the given time-frequency resource block and the given candidate time-frequency resource block are orthogonal.

In one embodiment, the given time-frequency resource and the given candidate time-frequency resource block are orthogonal in time domain, and the given time-frequency resource block and the given candidate time-frequency resource block occupy same frequency-domain resources.

In one embodiment, the given time-frequency resource block comprises L consecutive frequency-domain resource block(s), the given candidate time-frequency resource block comprises L consecutive frequency-domain resource block(s), and the L consecutive frequency-domain resource block(s) in the given time-frequency resource block is (are) the same as the L consecutive frequency-domain resource block(s) in the given candidate time-frequency resource block, L being a positive integer.

In one embodiment, the given time-frequency resource block and the given candidate time-frequency resource block are orthogonal in time domain, and the at least one SCS occupied by the given time-frequency resource block in frequency domain is the same as the at least one SCS occupied by the given candidate time-frequency resource block in frequency domain.

In one embodiment, the given time-frequency resource block is orthogonal to the given candidate time-frequency resource block in time domain, and the given time-frequency resource block and the given candidate time-frequency resource block are orthogonal in frequency domain.

In one embodiment, the given time-frequency resource block and the given candidate time-frequency resource block are two TDM time-frequency resource blocks in a sidelink resource pool.

In one embodiment, the given time-frequency resource block and the given candidate time-frequency resource block are two TDM time-frequency resource blocks in the second resource pool.

In one embodiment, the given time-frequency resource block is earlier than the given candidate time-frequency resource block in time domain.

In one embodiment, the given time-frequency resource block and the given candidate time-frequency resource block are two TDM time-frequency resource blocks in the second resource pool, and the given time-frequency resource block is earlier than the given candidate time-frequency resource block in time domain.

In one embodiment, the given candidate time-frequency resource and the given time-frequency resource block are spaced by a first time offset in time domain, and the given candidate time-frequency resource block and the given time-frequency resource block occupy same frequency-domain resources.

In one embodiment, the given candidate time-frequency resource block and the given time-frequency resource block are spaced by a first time difference in time domain, and the L consecutive frequency-domain resource block(s) comprised in the given candidate time-frequency resource block in frequency domain is (are) the same as the L consecutive frequency-domain resource block(s) comprised in the given time-frequency resource block in frequency domain.

In one embodiment, the first time difference comprises at least one time-domain resource unit.

In one embodiment, the first time difference comprises at least one slot.

In one embodiment, the first time difference comprises at least one multicarrier symbol.

In one embodiment, the first resource pool comprises a given time-frequency resource group, the given time-frequency resource group comprises a plurality of time-frequency resource blocks, any two adjacent time-frequency resource blocks in the plurality of time-frequency resource blocks comprised in the given time-frequency resource group are of an equal interval in time domain, and the given time-frequency resource block is a time-frequency resource block in the given time-frequency resource group.

In one embodiment, frequency-domain resources occupied by the plurality of time-frequency resource blocks comprised in the given time-frequency resource group are the same.

In one embodiment, L consecutive frequency-domain resource block(s) comprised in any time-frequency resource block in the given time-frequency resource group in frequency domain is (are) the same as L consecutive frequency-domain resource block(s) comprised in the given time-frequency resource block in frequency domain.

In one embodiment, the given time-frequency resource block is one of the plurality of time-frequency resource blocks comprised in the given time-frequency resource group, the given candidate time-frequency resource block is a time-frequency resource block other than the plurality of time-frequency resource blocks comprised in the given time-frequency resource group, and an interval between the given candidate time-frequency resource block and a latest time-frequency resource block in the given time-frequency resource group in time domain is the same as an interval between any two adjacent time-frequency resource blocks of the plurality of time-frequency resource blocks comprised in the given time-frequency resource group in time domain.

In one embodiment, the given candidate time-frequency resource block is later than any time-frequency resource block in the given time-frequency resource group in time domain.

In one embodiment, the L consecutive frequency-domain resource block(s) comprised in the given candidate time-frequency resource block in frequency domain is(are) the same as the L consecutive frequency-domain resource block(s) comprised in any time-frequency resource block in the given time-frequency resource group.

In one embodiment, the given time-frequency resource block comprises a first time-frequency resource block in the present disclosure, and the given candidate time-frequency resource block comprises a first candidate time-frequency resource block in the present disclosure.

In one embodiment, the first channel sensing is used to determine the target resource pool.

In one embodiment, the first channel sensing is executed in the first resource pool.

In one embodiment, executing the first channel sensing includes receiving a given signaling on a given time-frequency resource block in the first resource pool, the given signaling indicating a given reference signal, measuring the given reference signal on the given time-frequency resource block, acquiring a measurement value for the given time-frequency resource block, and the measurement value for the given time-frequency resource block being used to determine whether the given candidate time-frequency resource block belongs to the target resource pool.

In one embodiment, executing the first channel sensing includes respectively receiving a plurality of first-type given signalings on the plurality of time-frequency resource blocks comprised in the given time-frequency resource group in the first resource pool, the given signaling being one of the plurality of first-type given signalings; the plurality of first-type signalings respectively indicating a plurality of first-type reference signals, and the given reference signals being one of the plurality of first-type reference signals; the plurality of first-type reference signals being respectively measured on the plurality of time-frequency resource blocks comprised in the given time-frequency resource group, and being linearly averaged to acquire a measurement value for the given time-frequency resource block, and the measurement value for the given time-frequency resource block being used to determine whether the given candidate time-frequency resource block belongs to the target resource pool.

In one embodiment, the measurement value for the given time-frequency resource block is higher than a first threshold, and the given candidate time-frequency resource block does not belong to the target resource pool.

In one embodiment, the measurement value for the given time-frequency resource block is not higher than a first threshold, and the given candidate time-frequency resource block belongs to the target resource pool.

In one subembodiment of the above embodiment, the measurement value for the given time-frequency resource block being not higher than a first threshold includes the measurement value for the given time-frequency resource block being lower than the first threshold.

In one subembodiment of the above embodiment, the measurement value for the given time-frequency resource block being not higher than a first threshold includes the measurement value for the given time-frequency resource block being equal to the first threshold.

In one embodiment, when the measurement value for the given time-frequency resource block is higher than a first threshold, the given candidate time-frequency resource block does not belong to the target resource pool; when the measurement value for the given time-frequency resource block is not higher than a first threshold, the given candidate time-frequency resource block belongs to the target resource pool.

In one embodiment, executing the first channel sensing includes receiving a second target signaling on the first time-frequency resource block in the first resource pool, the second target signaling indicating a first reference signal, measuring the first reference signal on the first time-frequency resource block, acquiring a measurement value for the first time-frequency resource block, the measurement value for the first time-frequency resource block being not higher than the first threshold, and the first candidate time-frequency resource block belonging to the target resource pool.

In one embodiment, the given signaling indicates a second priority, the first target signaling indicates a first priority, and both the first priority and the second priority are used together to determine the first threshold.

In one embodiment, the given signaling comprises one or more fields of a PHY layer signaling.

In one embodiment, the given signaling comprises one or more fields in a piece of SCI.

In one embodiment, the given signaling is a piece of SCI.

In one embodiment, the given signaling comprises all or part of a higher-layer signaling.

In one embodiment, the given signaling is transmitted on a PSCCH.

In one embodiment, the given signaling is transmitted on a PSCCH and a PSSCH.

In one embodiment, the given signaling indicates the given time-frequency resource block.

In one embodiment, the given signaling indicates time-frequency resources occupied by the given time-frequency resource block.

In one embodiment, the given signaling comprises the second target signaling in the present disclosure.

In one embodiment, the given signaling indicates the given reference signal.

In one embodiment, the given reference signal is transmitted on the given time-frequency resource block.

In one embodiment, the given reference signal comprises a first sequence.

In one embodiment, a first sequence is used to generate the given reference signal.

In one embodiment, the first sequence is a Pseudo-Random Sequence.

In one embodiment, the first sequence is a Low-PAPR sequence.

In one embodiment, the first sequence is a Gold sequence.

In one embodiment, the first sequence is an M sequence.

In one embodiment, the first sequence is a Zadeoff-Chu (ZC) sequence.

In one embodiment, the first sequence is sequentially through Sequence Generation, DFT, Modulation and Resource Element Mapping, and wideband symbol generation to acquire the given reference signal.

In one embodiment, the first sequence is sequentially through sequence generation, resource elements mapping and wideband symbol generation to acquire the given reference signal.

In one embodiment, the first sequence is mapped to at least one RE.

In one embodiment, the given reference signal is used for data demodulation.

In one embodiment, the given reference signal is used to detect channel status information.

In one embodiment, the given reference signal comprises a PSCCH DMRS.

In one embodiment, the given reference signal comprises a PSSCH DMRS.

In one embodiment, the given reference signal comprises a UL DMRS.

In one embodiment, the given reference signal comprises an SL CSI-RS.

In one embodiment, the given reference signal comprises a UL SRS.

In one embodiment, the given reference signal comprises an S-SS/PSBCH Block.

In one embodiment, the given reference signal comprises the first reference signal in the present disclosure.

In one embodiment, the given reference signal is measured on the given time-domain resource block.

In one embodiment, a measurement performed on a given time-frequency resource block comprises measuring a given reference signal on a given time-frequency resource block.

In one embodiment, the given time-domain resource block comprises time-frequency resources occupied by the given reference signal.

In one embodiment, the phrase of "a measurement value for the given time-frequency resource block" includes executing a coherent detection based reception on time-frequency resources occupied by the given reference signal on the given time-frequency resource block, that is, the first node coherently receives a signal on time-frequency resources occupied by the given reference signal by using the first sequence comprised in the given reference signal, and measures signal energy acquired after the coherent reception.

In one embodiment, the phrase of "a measurement value for the given time-frequency resource block" includes executing a coherent detection based reception on time-frequency resources occupied by the given reference signal on the given time-frequency resource block, that is, the first node coherently receives a signal on time-frequency resources occupied by the given reference signal by using the first sequence comprised in the given reference signal, and linearly averages signal power received on the plurality of REs comprised in time-frequency resources occupied by the given reference signal to acquire received power.

In one embodiment, the phrase of "a measurement value for the given time-frequency resource block" includes executing a coherent detection based reception on time-frequency resources occupied by the given reference signal on the given time-frequency resource block, that is, the first node coherently receives a signal on time-frequency resources occupied by the given reference signal by using the first sequence comprised in the given reference signal, and averages received signal energy in time domain and frequency domain to acquire received power.

In one embodiment, the phrase of "a measurement value for the given time-frequency resource block" includes executing an energy detection based reception on time-frequency resources occupied by the given reference signal on the given time-frequency resource block, that is, the first node respectively senses energy of a radio signal on the plurality of REs comprised in time-frequency resources occupied by the given reference signal, and averages it on the plurality of REs comprised in time-frequency resources occupied by the given reference signal to acquire received power.

In one embodiment, the phrase of "a measurement value for the given time-frequency resource block" includes executing an energy detection based reception on the given time-frequency resource block, that is, the first node receives power of the given reference signal on the given time-frequency resource block and linearly averages the power of the received given reference signal to acquire a signal strength indication.

In one embodiment, the phrase of "a measurement value for the given time-frequency resource block" includes executing an energy detection based reception on the given time-frequency resource block, that is, the first node senses energy of a radio signal on the given time-frequency resource block and averages it in time to acquire a signal strength indication.

In one embodiment, the phrase of "a measurement value for the given time-frequency resource block" includes executing a blind detection based reception on the given time-frequency resource block, that is, the first node receives a signal on the given time-frequency resource block and executes decoding operation, and determines whether the decoding is correct according to a CRC bit, so as to acquire channel quality of the given reference signal on time-frequency resources occupied by the given reference signal.

In one embodiment, a measurement value for the given time-frequency resource block comprises a measurement value for the first time-frequency resource block in the present disclosure.

In one embodiment, a measurement value for the first time-frequency resource block comprises RSRP of the first reference signal measured on the first time-frequency resource block.

In one embodiment, a measurement value for the first time-frequency resource block comprises an RSSI of the first reference signal measured on the first time-frequency resource block.

In one embodiment, a measurement value for the first time-frequency resource block comprises RSRQ of the first reference signal measured on the first time-frequency resource block.

In one embodiment, a measurement value for the first time-frequency resource block comprises a Signal to Noise Ratio (SNR).

In one embodiment, a measurement value for the first time-frequency resource block comprises a Signal to Interference plus Noise Ratio (SINR).

In one embodiment, a measurement value for the first time-frequency resource block comprises an SL SINR.

In one embodiment, a measurement value for the first time-frequency resource block comprises SL RSRP.

In one embodiment, a measurement value for the first time-frequency resource block comprises L1-RSRP.

In one embodiment, a measurement value for the first time-frequency resource block comprises L3-RSRP.

In one embodiment, a measurement value for the first time-frequency resource block comprises an SL RSSI.

In one embodiment, a measurement value for the first time-frequency resource block comprises SL RSRQ.

In one embodiment, a measurement value for the first time-frequency resource block comprises a Channel Quality Indicator (CQI).

In one embodiment, a measurement value for the first time-frequency resource block comprises an SL CQI.

In one embodiment, a measurement value for the first time-frequency resource block is measured by dBm.

In one embodiment, a measurement value for the first time-frequency resource block is measured by dB.

In one embodiment, a measurement value for the first time-frequency resource block is measured by mW.

In one embodiment, a measurement value for the first time-frequency resource block is measured by W.

In one embodiment, the first threshold is a positive integer.

In one embodiment, the first threshold is a non-positive integer.

In one embodiment, a unit of the first threshold is measured by dBm.

In one embodiment, a unit of the first threshold is measured by dB.

In one embodiment, the first threshold is measured by mW.

In one embodiment, the first threshold is measured by W.

In one embodiment, the first threshold is one of a plurality of first-type thresholds.

In one embodiment, any of the plurality of first-type thresholds is equal to $(-128+(n-1)\times 2)$ dBm, n is a positive integer not greater than 65.

In one embodiment, the plurality of first-type thresholds are respectively $-\infty$ dBm, $-128$ dBm, $-126$ dBm, ..., 0 dBm, and infinity dBm.

In one embodiment, the first threshold is equal to $(-128+(n-1)\times 2)$ dBm, n is a positive integer not greater than 65.

In one embodiment, the first threshold is one of $-\infty$ dBm, $-128$ dBm, $-126$ dBm, 0 dBm and infinity dBm.

In one embodiment, both the first priority and the second priority are used together to determine an index of the first threshold in the plurality of first-type thresholds.

In one embodiment, the plurality of first-type thresholds comprise a plurality of threshold lists, and any of the plurality of threshold lists comprises at least one first-type threshold.

In one embodiment, the at least one first-type threshold comprised in any of the plurality of threshold lists is one of the plurality of first-type thresholds.

In one embodiment, a first threshold list is one of the plurality of threshold lists, the first threshold list comprises at least one first-type threshold, and the first threshold is one of the at least one first-type threshold comprised in the first threshold list.

In one embodiment, the second priority is used to indicate an index of the first threshold list in the plurality of threshold lists, and the first priority is used to indicate an index of the first threshold in the at least one first-type threshold comprised in the first threshold list.

In one embodiment, an index of the first threshold in the plurality of first-type thresholds is equal to a sum of C1 times the first priority and B1 then plus 1, B is a positive integer not greater than 12, and C is a positive integer.

In one embodiment, an index of the first threshold in the plurality of first-type thresholds is equal to a sum of C2 times the second priority and B2 then plus 1, B2 is a positive integer not greater than 12, and C2 is a positive integer.

In one embodiment, an index of the first threshold in the plurality of first-type thresholds is equal to a sum of C1 times B1 and the first priority then plus 1, and C1 is a positive integer.

In one embodiment, an index of the first threshold in the plurality of first-type thresholds is equal to a sum of C2 times B2 and the second priority then plus 1, and C2 is a positive integer.

In one embodiment, C1 is equal to 8.
In one embodiment, C1 is equal to 10.
In one embodiment, C2 is equal to 8.
In one embodiment, C2 is equal to 10.

In one embodiment, the first priority and the second priority are respectively two positive integers.

In one embodiment, the first priority is a non-negative integer not greater than 12.

In one embodiment, the second priority is a non-negative integer not greater than 12.

In one embodiment, the first priority is one of P positive integer(s), P is a positive integer.

In one embodiment, the second priority is one of P positive integer(s), P is a positive integer.

In one embodiment, the first priority is a positive integer from 1 to P.

In one embodiment, the second priority is a positive integer from 1 to P.

Embodiment 7A

Figure 7A:
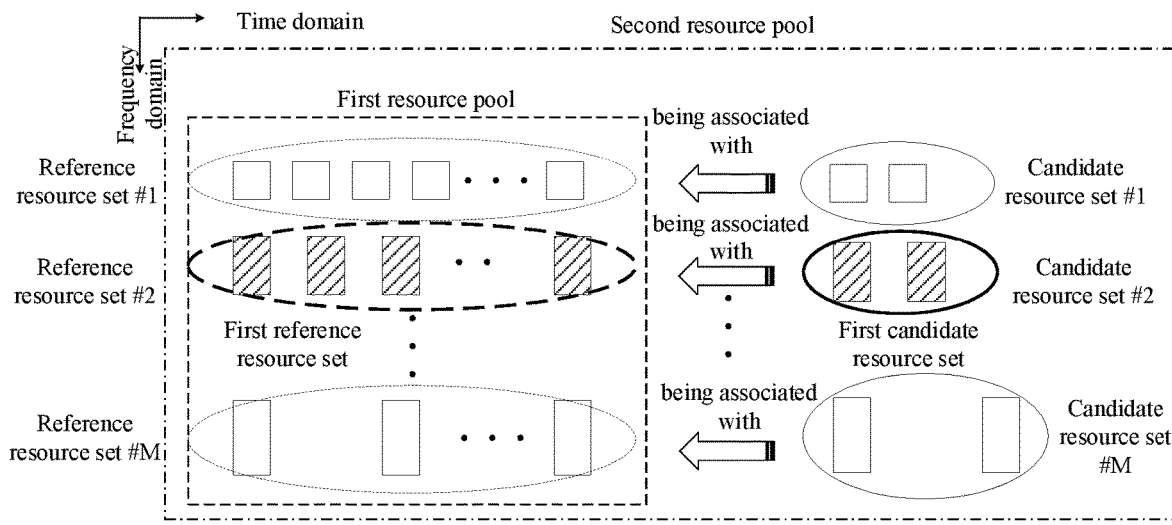
FIG. 7A illustrates a schematic diagram of relations among a first resource pool, a second resource pool, M reference resource sets and M candidate resource sets according to one embodiment of the present disclosure.

Embodiment 7A illustrates a schematic diagram of relations among a first resource pool, a second resource pool, M reference resource sets and M candidate resource sets according to one embodiment of the present disclosure, as shown in FIG. 7A. In FIG. 7A, the dotted dashed big rectangle represents a second resource pool in the present disclosure; the dashed rectangle represents a first resource pool in the present disclosure; the dashed elliptical rectangle represents a time-frequency resource block in one of M reference resource sets in the present disclosure; the slash-filled rectangle in the thick dashed elliptical rectangle represents a time-frequency resource block in a first reference resource set in the present disclosure; the solid elliptical rectangle represents a time-frequency resource block in one of M candidate resource sets in the present disclosure; the slash-filled rectangle in the thick solid elliptical rectangle represents a time-frequency resource block in a first reference resource set in the present disclosure; and the left arrow represents a relation of being associated in the present disclosure.

In embodiment 7A, the M candidate resource sets are respectively associated with the M reference resource sets, and the M reference resource sets are within the first resource pool; the first candidate resource set is associated with a first reference resource set, and the first reference resource set is one of the M reference resource sets; whether a measurement performed on the first reference resource set is a minimum value of a measurement performed on the M reference resource sets is used to determine whether the first candidate resource set belongs to the target resource pool.

In one embodiment, any of the M reference resource sets comprises at least one time-frequency resource block.

In one embodiment, any of the M reference resource sets comprises at least one time-domain resource block in time domain.

In one embodiment, any of the M reference resource sets comprises at least one frequency-domain resource block in frequency domain.

In one embodiment, the first resource pool comprises any of the M reference resource sets.

In one embodiment, any of the M reference resource sets belongs to the first resource pool.

In one embodiment, any of the at least one time-frequency resource block comprised in any of the M reference resource sets belongs to the first resource pool.

In one embodiment, any of the at least one time-domain resource block comprised in any of the M reference resource sets in time domain belongs to the first resource pool.

In one embodiment, any of the at least one frequency-domain resource block comprised in any of the M reference resource sets in frequency domain belongs to the first resource pool.

In one embodiment, any of the at least one time-frequency resource block comprised in any of the M reference resource sets is one of the plurality of time-frequency resource blocks comprised in the first resource pool.

In one embodiment, the M candidate resource sets and the M reference resource sets are respectively associated.

In one embodiment, the M candidate resource sets are respectively associated with the M reference resource sets.

In one embodiment, each of the at least one time-frequency resource block comprised in any of the M candidate resource sets and each of the at least one time-frequency resource block comprised in one of the M reference resource sets are associated.

In one embodiment, each of the at least one time-frequency resource block comprised in any of the M candidate resource sets is respectively associated with each of the at least one time-frequency resource block comprised in one of the M reference resource sets.

In one embodiment, any of the at least one time-frequency resource block comprised in any of the M candidate resource sets is associated with the at least one time-frequency resource block comprised in one of the M reference resource sets.

In one embodiment, any of the at least one time-frequency resource block comprised in any of the M candidate resource sets is associated with one of the at least one time-frequency resource block comprised in one of the M reference resource sets.

In one embodiment, a first given candidate time-frequency resource block is one of the at least one time-frequency resource block comprised in one of the M candidate resource sets; the first given candidate time-frequency resource block is associated with at least one time-frequency resource block comprised in a first given reference resource set, and the first given reference resource set is one of the M reference resource sets.

In one embodiment, the first given candidate time-frequency resource block and the at least one time-frequency resource block in the first given reference resource set are orthogonal in time domain.

In one embodiment, the first given candidate time-frequency resource block and the at least one time-frequency resource block in the first given reference resource set are orthogonal in time domain, and the first given candidate time-frequency resource block and any of the at least one time-frequency resource block in the first given reference resource set are overlapped in frequency domain.

In one embodiment, the first given candidate time-frequency resource block and the at least one time-frequency resource block in the first given reference resource set are orthogonal in time domain, and the first given candidate time-frequency resource block and any of the at least one time-frequency resource block in the first given reference resource set occupy same frequency-domain resources in frequency domain.

In one embodiment, the first given candidate time-frequency resource block and the at least one time-frequency resource block in the first given reference resource set are equally spaced in time domain.

In one embodiment, any two of the at least one time-frequency resource block in the first given reference resource set are spaced by the first time interval in time domain, the first given candidate time-frequency resource block and a latest time-frequency resource block in time domain in at least one time-frequency resource block in the first given reference resource set are spaced by the second time interval, and the second time interval is a multiple of the first time interval.

In one embodiment, the first given candidate time-frequency resource block is associated with a first given reference time-frequency resource block, and the first given reference time-frequency resource block is one of the at least one time-frequency resource block comprised in one of the M reference resource sets.

In one embodiment, the first given candidate time-frequency resource block and the first given reference time-frequency resource block are orthogonal in time domain.

In one embodiment, the first given candidate time-frequency resource block and the first given reference time-frequency resource block are TDM.

In one embodiment, the first given candidate time-frequency resource block and the first given reference time-frequency resource block are orthogonal in time domain, and the first given candidate time-frequency resource block and the first given reference time-frequency resource block are overlapped in frequency domain.

In one embodiment, the first given candidate time-frequency resource block and the first given reference time-frequency resource block are orthogonal in time domain, and the first given candidate time-frequency resource block and the first given reference time-frequency resource block occupy same frequency-domain resources in frequency domain.

In one embodiment, the first given candidate time-frequency resource block and the first given reference time-frequency resource block are spaced by the first time interval in time domain.

In one embodiment, M reference signal groups are respectively measured on the M reference resource sets, and any of the M reference signal groups comprises at least one first-type reference signal.

In one embodiment, M reference signal groups are respectively measured on the M reference resource sets in the first resource pool.

In one embodiment, one of the M reference signal groups is measured on any of the M reference resource sets comprised in the first resource pool.

In one embodiment, the M reference signal groups are respectively transmitted on the M reference resource sets.

In one embodiment, the at least one first-type reference signal comprised in any of the M reference signal groups is transmitted on the at least one time-frequency resource block comprised in one of the M reference resource sets.

In one embodiment, a first target reference signal group is one of the M reference signal groups, and the first target reference signal group comprises at least one first-type reference signal.

In one embodiment, a first target reference signal group is one of the M reference signal groups, and the first target reference signal group is transmitted on the first reference resource set.

In one embodiment, a first target reference signal group is one of the M reference signal groups, and the at least one first-type reference signal comprised in the first target reference signal group is transmitted on the at least one time-frequency resource block comprised in the first reference resource set.

In one embodiment, M second-type measurement values are respectively acquired by measuring the M reference resource sets in the first resource pool respectively.

In one embodiment, a third measurement value is acquired by measuring the first reference resource set in the first resource pool.

In one embodiment, the third measurement value is one of the M second-type measurement values.

In one embodiment, M second-type measurement values are respectively acquired by measuring M reference signal groups respectively on the M reference resource sets.

In one embodiment, the third measurement value is acquired by measuring the first target reference signal group on the first reference resource set.

In one embodiment, each of the at least one first-type reference signal comprised in the first target reference signal group is measured on each of the at least one time-frequency resource block comprised in the first reference resource set, and then is averaged to acquire the third measurement value.

In one embodiment, the M reference signals are respectively measured to acquire M second-type measurement values.

In one embodiment, any of the M reference signal groups is measured to acquire one of the M second-type measurement values.

In one embodiment, the third measurement value is acquired by measuring the first target reference signal group.

In one embodiment, one of the M second-type measurement values is acquired by measuring any of the M reference resource sets in the first resource pool.

In one embodiment, the third measurement value is acquired by measuring the first reference resource set in the first resource pool.

In one embodiment, one of the M second-type measurement values is acquired by measuring one of M reference signal groups on any of the M reference resource sets.

In one embodiment, the third measurement value is acquired by measuring the first target reference signal group on the first reference resource set in the first resource pool.

In one embodiment, measurements performed on the M reference resource sets are respectively the M second-type measurement values.

In one embodiment, a measurement performed on the first reference resource set is the third measurement value.

In one embodiment, measurements performed on the M reference signal groups on the M reference resource sets are respectively the M second-type measurement values.

In one embodiment, a measurement performed on the first target reference signal group on the first reference resource set is the third measurement value.

In one embodiment, a measurement performed on any reference resource set in the M reference resource sets is one of the M second-type measurement values.

In one embodiment, a measurement performed on any of the M reference signal groups is one of the M second-type measurement values.

In one embodiment, the phrase of "a measurement performed on the M reference resource sets" includes respectively executing a coherent detection based reception on the at least one first-type reference signal comprised in one of the M reference signals on the at least one time-frequency resource block comprised in any of the M reference resource sets, that is, the first node coherently receives a signal on time-frequency resources occupied by the at least one first-type reference signal by using the at least one second-type sequence comprised in the at least one first-type reference signal, and measures signal energy acquired after the coherent reception.

In one embodiment, the phrase of "a measurement performed on the M reference resource sets" includes respectively executing a coherent detection based reception on the at least one first-type reference signal comprised in one of the M reference signals on the at least one time-frequency resource block comprised in any of the M reference resource sets, that is, the first node coherently receives a signal on time-frequency resources occupied by the at least one first-type reference signal by using the at least one second-type sequence comprised in the at least one first-type reference signal, and linearly averages signal power received on the plurality of REs comprised in time-frequency resources occupied by the at least one first-type reference signal to acquire received power.

In one embodiment, the phrase of "a measurement performed on the M reference resource sets" includes executing coherent detection based reception on the at least one first-type reference signal comprised in one of the M reference signal groups on the at least one time-frequency resource block comprised in any of the M reference resource sets, that is, the first node coherently receives a signal on time-frequency resources occupied by the at least one first-type reference signal comprised in one of the M reference signal groups by using the at least one second-type sequence comprised in the at least one first-type reference signal comprised in one of the M reference signal groups, and averages received signal energy in time domain and frequency domain to acquire received power.

In one embodiment, the phrase of "a measurement performed on the M reference resource sets" includes executing an energy detection based reception on time-frequency resources occupied by the at least one first-type reference signal comprised in one of the M reference signal groups on the at least one time-frequency resource block comprised in any of the M reference resource sets, that is, the first node respectively senses energy of a radio signal on a plurality of REs comprised in time-frequency resources occupied by the at least one first-type reference signal comprised in one of the M reference signal groups, and averages it in the plurality of REs comprised in time-frequency resources occupied by the at least one first-type reference signal comprised in one of the M reference signal group to acquire received power.

In one embodiment, the phrase of "a measurement performed on the M reference resource sets" includes executing an energy detection based reception on the at least one time-frequency resource block comprised in any of the M reference resource sets, that is, the first node receives power of the at least one first-type reference signal on time-frequency resource block occupied by the at least one first-type reference signal comprised in one of the M reference signal groups, and linearly averages the power of the received at least one first-type reference signal to acquire a signal strength indication.

In one embodiment, the phrase of "a measurement performed on the M reference resource sets" includes executing a blind detection reception on the at least one time-frequency resource block comprised in any of the M reference resource sets, that is, the first node receives a signal on the at least one time-frequency resource block comprised in any of the M reference resource sets and executes a decoding operation, determines whether the decoding is correct according to a CRC bit, so as to acquire channel quality of the at least one first-type reference signal comprised in one of the M reference signal groups on the at least one time-frequency resource block comprised in any of the M reference resource sets.

In one embodiment, any of the at least one first-type reference signal comprised in any of the M reference signal groups is a PSCCH DMRS.

In one embodiment, any of the at least one first-type reference signal comprised in any of the M reference signal groups is a PSSCH DMRS.

In one embodiment, each of the at least one first-type reference signal comprised in any of the M reference signal groups comprises the at least one second-type sequence.

In one embodiment, at least one second-type sequence is used to generate the at least one first-type reference signal comprised in any of the M reference signal groups.

In one embodiment, any of the at least one second-type sequences is a pseudo-random sequence.

In one embodiment, any of the at least one second-type sequences is a Low-PAPR sequence.

In one embodiment, any of the at least one second-type sequences is a Gold sequence.

In one embodiment, any of the at least one second-type sequences is an M sequence.

In one embodiment, any of the at least one second-type sequences is a ZC sequence.

In one embodiment, any of the at least one second-type sequence is sequentially through sequence generation, Discrete Fourier Transform (DFT), modulation and resource element mapping, and wideband symbol generation to acquire one of the at least one first-type reference signal comprised in one of the M reference signal groups.

In one embodiment, any of the at least one second-type sequence is sequentially through sequence generation, resource element mapping, and wideband symbol generation to acquire one of the at least one first-type reference signal comprised in one of the M reference signal groups.

In one embodiment, any of the M second-type measurement values comprises RSRP of one of the M reference signal groups measured on any of the M reference resource sets.

In one embodiment, any of the M second-type measurement values comprises an RSSI of one of the M reference signal groups measured on any of the M reference resource sets.

In one embodiment, any of the M second-type measurement values comprises RSRQ of one of the M reference signal groups measured on any of the M reference resource sets.

In one embodiment, any of the M second-type measurement values comprises an SNR.

In one embodiment, any of the M second-type measurement values comprises an SINR.

In one embodiment, the third measurement value comprises an SL SINR.

In one embodiment, the third measurement value comprises SL RSRP.

In one embodiment, the third measurement value comprises L1 RSRP.

In one embodiment, the third measurement value comprises L3-RSRP.

In one embodiment, the third measurement value comprises an SL RSSI.

In one embodiment, the third measurement value comprises SL RSRQ.

In one embodiment, the third measurement value comprises a CQI.

In one embodiment, the third measurement value comprises an SL CQI.

In one embodiment, any of the M second-type measurement values is measured by dBm.

In one embodiment, any of the M second-type measurement values is measured by dB.

In one embodiment, any of the M second-type measurement values is measured by mW.

In one embodiment, any of the M second-type measurement values is measured by W.

In one embodiment, a magnitude between a measurement performed on the first reference resource set and measurements respectively performed on the M reference resource sets is used to determine whether the first candidate resource set belongs to the target resource pool.

In one embodiment, a magnitude order of the third measurement value among the M second-type measurement values is used to determine whether the first candidate resource set is within the target resource pool.

In one embodiment, a measurement performed on the first reference resource set is a minimum value in M measurements respectively performed on the M reference resource sets, and the first candidate resource set belongs to the target resource pool.

In one embodiment, the third measurement value is a minimum value in the M second-type measurement values, and the first candidate resource set belongs to the target resource pool.

In one embodiment, a measurement performed on the first reference resource set is not a minimum value in M measurements respectively performed on the M reference resource sets, and the first candidate resource set does not belong to the target resource pool.

In one embodiment, the third measurement value is not a minimum value in the M second-type measurement values, and the first candidate resource set does not belong to the target resource pool.

In one embodiment, a fourth measurement value is one of the M second-type measurement values, the fourth measurement value is less than the third measurement value, and the first candidate resource set does not belong to the target resource pool.

In one embodiment, a fourth measurement value is a measurement value in the M second-type measurement values, the fourth measurement value is less than the third measurement value, and at least one time-frequency resource block in the first candidate resource set is different from any of the plurality of time-frequency resource blocks comprised in the target resource pool.

In one embodiment, when a measurement performed on the first reference resource set is a minimum value in measurements respectively performed on the M reference resource sets, the first candidate resource set belongs to the target resource pool; when a measurement performed on the first reference resource set is not a minimum value in measurements respectively performed on the M reference resource sets, and the first candidate resource set does not belong to the target resource pool.

In one embodiment, when the third measurement value is a minimum value in the M second-type measurement values, and the first candidate resource set belongs to the target resource pool; when the third measurement value is not a minimum value in the M second-type measurement values, the first candidate resource set does not belong to the target resource pool.

In one embodiment, a fourth measurement value is one of the M second-type measurement values; when the third measurement value is a minimum value in the M second-type measurement values, the first candidate resource set belongs to the target resource pool; when a fourth measurement value is less than the third measurement value, at least one time-frequency resource block in the first candidate resource set is different from any of the plurality of time-frequency resource block comprised in the target resource pool.

Embodiment 7B

Figure 7B:
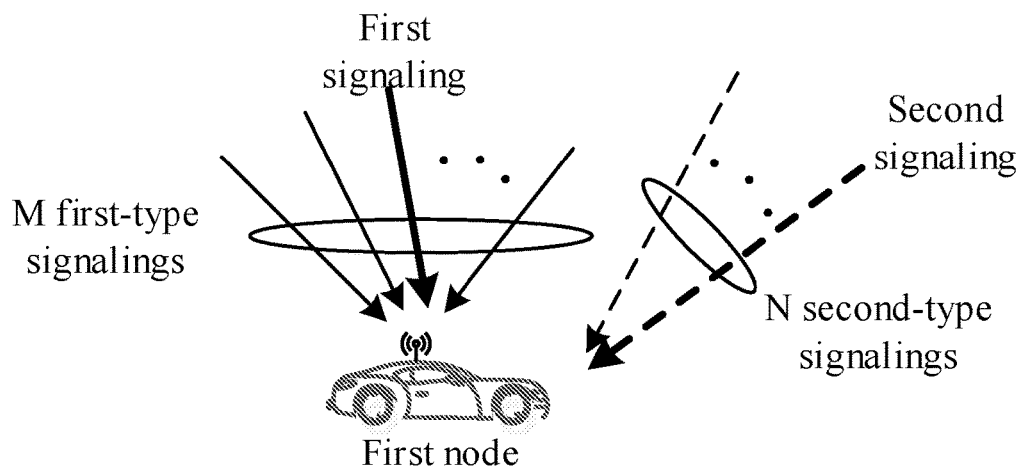
FIG. 7B illustrates a schematic diagram of a relation of a first signaling and M first-type signalings with a second signaling and N second-type signalings according to one embodiment of the present disclosure.

Embodiment 7B illustrates a schematic diagram of a relation of a first signaling and M first-type signalings with a second signaling and N second-type signalings according to one embodiment of the present disclosure, as shown in FIG. 7B. In FIG. 7B, the solid arrow represents one of M first-type signalings in the present disclosure; the thick solid arrow represents a first signaling in the present disclosure; the dashed arrow represents one of N second-type signaligs in the present disclosure; and the thick dashed arrow represents a second signaling in the present disclosure.

In embodiment 7B, a first signaling is any of the M first-type signalings; a second signaling is any of the N second-type signalings; and the first signaling is different from the second signaling.

In one embodiment, a format of the first signaling is different from a format of the second signaling.

In one embodiment, the first signaling comprises a first field, the second signaling comprises the first field in the first signaling, and the first field is used to indicate one of a first characteristic value or a second characteristic value; the first field in the first signaling indicates the first characteristic value in the first characteristic value and the second characteristic value; the first field in the second signaling indicates the second characteristic value in the first characteristic value and the second characteristic value.

In one embodiment, a first scrambling sequence is used to scramble the first signaling; a second scrambling sequence is used to scramble the second signaling; and the first scrambling and the second scrambling are different.

In one embodiment, the first scrambling sequence is a pseudo-random sequence.

In one embodiment, the first scrambling sequence is an M sequence.

In one embodiment, the first scrambling sequence is a Gold sequence.

In one embodiment, the second scrambling sequence is a pseudo-random sequence.

In one embodiment, the second scrambling sequence is an M sequence.

In one embodiment, the second scrambling sequence is a Gold sequence.

In one embodiment, a first information bit block is used to generate the first signaling, a second information bit block is used to generate the second signaling, and a length of the first information bit block is different from a length of the second information bit block.

In one embodiment, the first information block comprises Q1 bit(s), and the second information block comprises Q2 bit(s), Q1 not being equal to Q2.

In one embodiment, the first signaling indicates the first candidate time-frequency resource block, the first candidate time-frequency resource block is associated with a first time-frequency resource block, and a measurement performed by a transmitter of the first signaling on the first time-frequency resource block is less than a first threshold.

In one embodiment, the second signaling indicates the first candidate time-frequency resource block, the first candidate time-frequency resource block is associated with a second time-frequency resource block, a measurement performed by a transmitter of the second signaling on the second time-frequency resource block is higher than a second threshold, and the second threshold is not less than the first threshold.

In one embodiment, the first signaling indicates the first candidate time-frequency resource block, the first candidate time-frequency resource block is associated with a first time-frequency resource block, and a measurement performed by a transmitter of the first signaling on the first time-frequency resource block is less than a first threshold; the second signaling indicates the first candidate time-frequency resource block, the first candidate time-frequency resource block is associated with a second time-frequency resource block, a measurement performed by a transmitter of the second signaling on the second time-frequency resource block is higher than a second threshold, and the second threshold is not less than the first threshold.

In one embodiment, the first signaling indicates the first candidate time-frequency resource block, the first candidate time-frequency resource block is associated with a first time-frequency resource block, and a measurement performed by a transmitter of the first signaling on the first time-frequency resource block is less than a first threshold; the second signaling indicates the first candidate time-frequency resource block, the first candidate time-frequency resource block is associated with a second time-frequency resource block, and a transmitter of the second signaling does not monitor the second time-frequency resource block.

Embodiment 8A

Figure 8A:
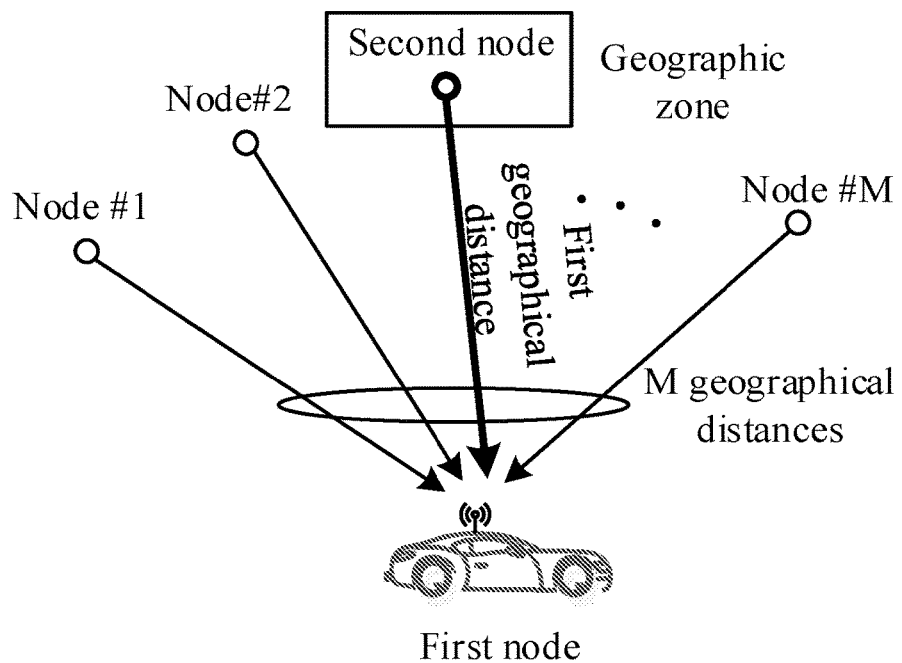
FIG. 8A illustrates a schematic diagram of relations among M nodes and M first-type distances according to one embodiment of the present disclosure.

Embodiment 8A illustrates a schematic diagram of relations among M nodes and M first-type distances according to one embodiment of the present disclosure, as shown in FIG. 8A. In FIG. 8A, the circle represents one of the M nodes in the present disclosure; the thick solid circle represents a second node in the present disclosure; the thick solid rectangle represents a geographical region where a second node is located in the present disclosure; the solid arrow represents one of M first-type distances in the present disclosure; and the thick solid arrow represents a first distance in the present disclosure.

In embodiment 8A, the first zone ID is used to determine a first distance, and the first distance is a geographical distance between a node transmitting the first signaling and the first node; M first-type distances are respectively geographical distances between the M nodes and the first node; whether the first distance is a minimum value in the M first-type distances is used to determine whether the first candidate resource set belongs to the target resource pool.

In one embodiment, the first distance is a geographic distance from a geographic zone where the second node is located to a geographic zone where the first node is located.

In one embodiment, the first distance is a geographic distance from a center point of a geographic zone where the second node is located to a center point of a geographic zone where the first node is located.

In one embodiment, the first distance is a geographic distance between a geographic location where the second node is located and a geographic location where the first node is located.

In one embodiment, both the first longitude distance and the first latitude distance are used together to determine the first distance.

In one embodiment, the first distance is one of M first-type distances.

In one embodiment, the M first-type distances are respectively geographical distances between the M nodes and the first node.

In one embodiment, the M first-type distances are respectively geographic distances between geographic locations where the M nodes are located and a geographic location where the first node is located.

In one embodiment, the M first-type distances are respectively geographic distances between geographic zones where the M nodes are located and a geographic zone where the first node is located.

In one embodiment, the M first-type distances are geographic distances from center points of geographic zones where the M nodes are located to a center point of a geographic zone where the first node is located.

In one embodiment, any of the M first-type distances is measured by km.

In one embodiment, any of the M first-type distances is measured by m.

In one embodiment, any of the M first-type distances is measured by dm.

In one embodiment, any of the M first-type distances is measured by cm.

In one embodiment, a magnitude order of the first distance among the M first-type distances is used to determine whether the first candidate resource set is within the target resource pool.

In one embodiment, the first distance is a minimum value in the M first-type distances, and the first candidate resource set belongs to the target resource pool.

In one embodiment, the first distance is not a minimum value in the M first-type distances, and the first candidate resource set does not belong to the target resource pool.

In one embodiment, the first distance is a maximum value in the M first-type distances, and the first candidate resource set belongs to the target resource pool.

In one embodiment, the first distance is not a maximum value in the M first-type distances, and the first candidate resource set does not belong to the target resource pool.

In one embodiment, the first distance is not a minimum value in the M first-type distances, and at least one time-frequency resource block in the first candidate resource set is different from any of the plurality of time-frequency resource blocks comprised in the target resource pool.

In one embodiment, when the first distance is a minimum value in the M first-type distances, and the first candidate resource set belongs to the target resource pool; when the first distance is not a minimum value in the M first-type distances, and the first candidate resource set does not belong to the target resource pool.

In one embodiment, when the first distance is a minimum value in the M first-type distances, and the first candidate resource set belongs to the target resource pool; when the first distance is not a minimum value in the M first-type distances, and at least one time-frequency resource block in the first candidate resource set and any of the plurality of time-frequency resource blocks comprised in the target resource pool are different.

Embodiment 8B

Figure 8B:
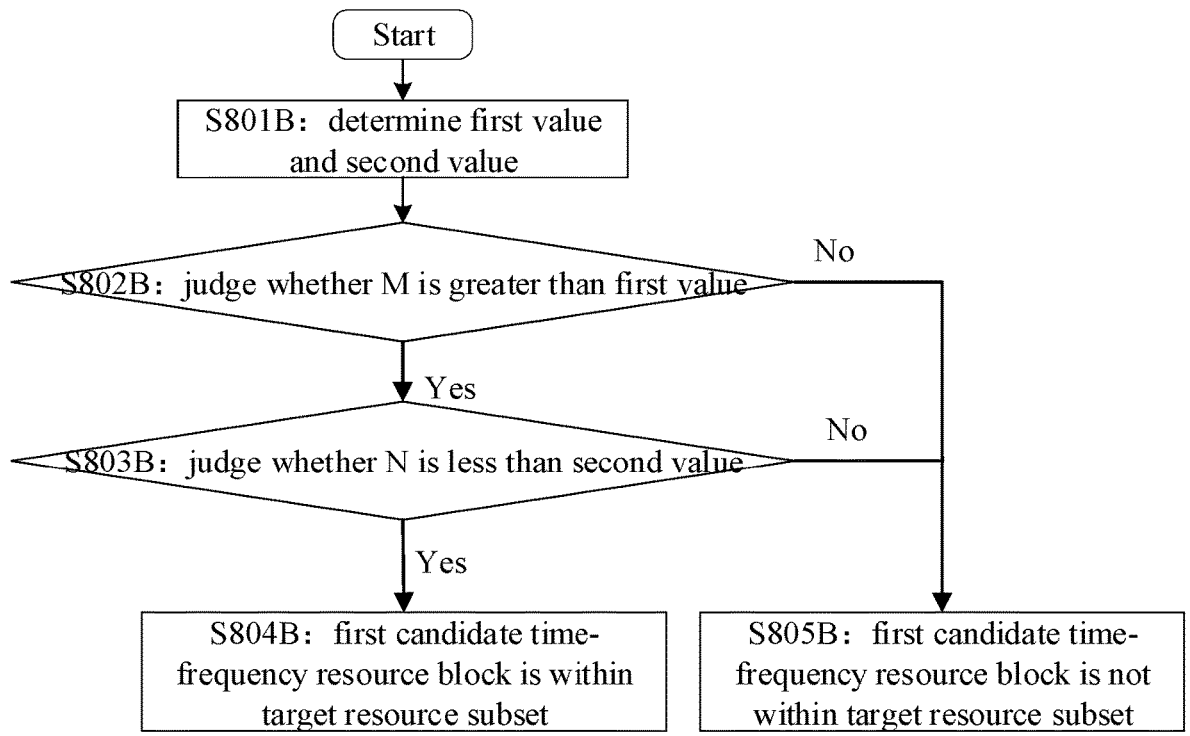
FIG. 8B illustrates a flowchart of determining whether a first candidate time-frequency resource block belongs to a target resource subset according to one embodiment of the present disclosure.

Embodiment 8B illustrates a flowchart of determining whether a first candidate time-frequency resource block belongs to a target resource subset according to one embodiment of the present disclosure, as shown in FIG. 8B. In FIG. 8B, determine a first value and a second value in step S801B; judge whether M is greater than a first value in step S802B;

judge whether N is less than a second value in step S803B; when M is greater than the first value, executes step S803B; when M is less than or equal to the first value, execute step S805B, a first candidate time-frequency resource block does not belong to a target resource subset; when N is less than the second value, execute step S804B, a first candidate time-frequency resource block belongs to a target resource subset; when N is greater than or equal to the second value, execute step S805B, and a first candidate time-frequency resource block does not belong to a target resource subset.

In embodiment 8B, both a magnitude order between M and the first value and a magnitude order between N and the second value are used together to determine whether the first candidate time-frequency resource block is within the target resource subset.

In one embodiment, the first value is predefined.
In one embodiment, the first value is configurable.
In one embodiment, the first value is a positive integer.
In one embodiment, the first value is a non-negative integer.
In one embodiment, the first value is a positive integer greater than 1.
In one embodiment, the second value is predefined.
In one embodiment, the second value is configurable.
In one embodiment, the second value is a non-negative integer.
In one embodiment, the second value is a positive integer greater than 1.
In one embodiment, the second value is equal to 1.
In one embodiment, the first value is a positive integer not less than the second value.
In one embodiment, the first value is a positive integer greater than the second value.
In one embodiment, M is greater than the first value, N is less than the second value, and the first candidate time-frequency resource block belongs to the target resource subset.
In one embodiment, M is greater than the first value, N is greater than the second value, and the first candidate time-frequency resource block does not belong to the target resource subset.
In one embodiment, M is greater than the first value, N is equal to the second value, and the first candidate time-frequency resource block does not belong to the target resource subset.
In one embodiment, M is less than the first value, and the first candidate time-frequency resource block does not belong to the target resource subset.
In one embodiment, M is less than the first value, N is less than the second value, and the first candidate time-frequency resource block does not belong to the target resource subset.
In one embodiment, M is less than the first value, N is greater than the second value, and the first candidate time-frequency resource block does not belong to the target resource subset.
In one embodiment, M is less than the first value, N is equal to the second value, and the first candidate time-frequency resource block does not belong to the target resource subset.
In one embodiment, M is equal to the first value, and the first candidate time-frequency resource block does not belong to the target resource subset.
In one embodiment, M is equal to the first value, N is less than the second value, and the first candidate time-frequency resource block does not belong to the target resource subset.
In one embodiment, M is equal to the first value, N is greater than the second value, and the first candidate time-frequency resource block does not belong to the target resource subset.
In one embodiment, M is equal to the first value, N is equal to the second value, and the first candidate time-frequency resource block does not belong to the target resource subset.
In one embodiment, the first candidate time-frequency resource block belonging to the target resource subset refers to: the first candidate time-frequency resource block is one of the at least one time-frequency resource block comprised in the target resource subset.
In one embodiment, the first candidate time-frequency resource block not belonging to the target resource subset refers to: the first candidate time-frequency resource block and any of the at least one time-frequency resource block comprised in the target resource subset are different.

Embodiment 9A

Figure 9A:
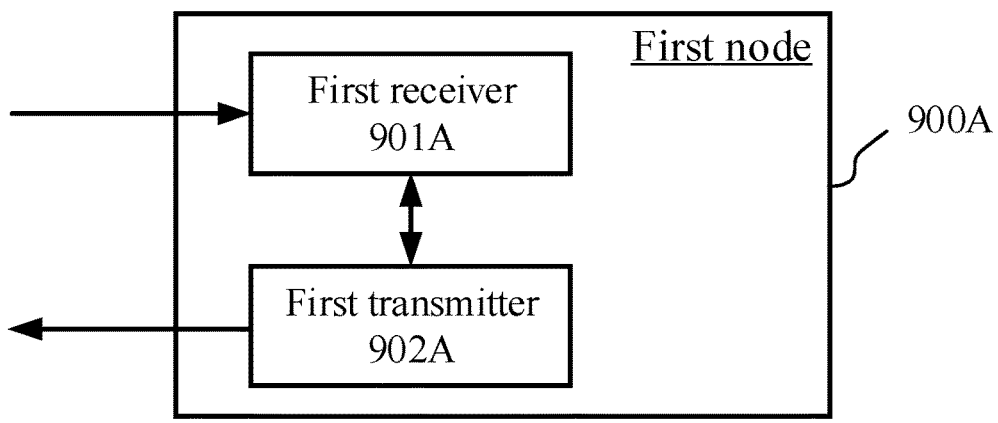
FIG. 9A illustrates a structure block diagram of a processing device in a first node according to one embodiment of the present disclosure.

Embodiment 9A illustrates a structure block diagram of a processing device in first node according to one embodiment of the present disclosure, as shown in FIG. 9A. In Embodiment 9A, a processing device 900A of a first node mainly consists of a first receiver 901A and a first transmitter 902A.

In one embodiment, the first receiver 901A comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In one embodiment, the first transmitter 902A comprises at least one of the antenna 452, the transmitter/receiver 454, the multi-antenna transmitting processor 457, the transmitting processor 468, the controller/processor 459, the memory 460, or the data source 467 in FIG. 4 of the present disclosure.

In embodiment 9A, the first receiver 901A receives M first-type signalings, M being a positive integer greater than 1; the first transmitter 902A transmits a first signal on a target time-frequency resource block; the M first-type signalings respectively carry M source IDs, the M source IDs are respectively used to identify M nodes, and any two of the M source IDs are different; the M first-type signalings respectively indicate M candidate resource sets, and any of the M candidate resource sets comprises at least one time-frequency resource block; one of the M candidate resource sets is within a target resource pool; the target resource pool comprises a plurality of time-frequency resource blocks, and the target time-frequency resource block is a time-frequency resource block in the target resource pool; a first signaling is one of the M first-type signalings, the first signaling indicates at least a latter of a first zone ID and a first candidate resource set, and the first candidate resource set is one of the M candidate resource sets; at least one of the first zone ID or a measurement corresponding to the first candidate resource set is used to determine whether the first candidate resource set is within the target resource pool.

In one embodiment, the first signaling indicates a first candidate resource set; a measurement corresponding to the first candidate resource set is used to determine whether the first candidate resource set is within the target resource pool.

In one embodiment, the first signaling indicates a first zone ID and a first candidate resource set; and the first zone ID is used to determine whether the first candidate resource set is within the target resource pool.

In one embodiment, the first signaling indicates a first zone ID and a first candidate resource set; both the first zone ID and a measurement corresponding to the first candidate resource set are used together to determine whether the first candidate resource set is within the target resource pool.

In one embodiment, the first transmitter 902A determines the target time-frequency resource block from the target resource pool; the target time-frequency resource block is indicated, or, the target time-frequency resource block is randomly selected from the target resource pool.

In one embodiment, the first receiver 901A receives first configuration information; the first configuration information indicates a second resource pool, the second resource pool comprises the M candidate resource sets, and the second resource pool is used to determine the first resource pool.

In one embodiment, the first receiver 901A respectively measures M reference resource sets out of a first resource pool; the M candidate resource sets are respectively associated with the M reference resource sets, and the M reference resource sets are within the first resource pool; the first candidate resource set is associated with a first reference resource set, and the first reference resource set is one of the M reference resource sets; a magnitude order of a measurement performed on the first reference resource set among M measurements performed on the M reference resource sets is used to determine whether the first candidate resource set is within the target resource pool.

In one embodiment, the first receiver 901A respectively measures the M reference signals; the M first-type signalings respectively indicate the M reference signals; a first signaling indicates a first reference signal, and the first reference signal is one of the M reference signals; a second signaling is any of the M first-type signalings other than the first signaling, the second signaling indicates a second reference signal, and the second reference signal is any of the M reference signals other than the first reference signal; a magnitude order between a measurement performed on the first reference signal and a measurement performed on the second reference signal is used to determine whether the first candidate resource set is within the target resource pool.

In one embodiment, the first zone ID is used to determine a first distance, and the first distance is a geographical distance between a node transmitting the first signaling and the first node; M first-type distances are respectively geographical distances between the M nodes and the first node; a magnitude order of the first distance among the M first-type distances is used to determine whether the first candidate resource set is within the target resource pool.

In one embodiment, the first node 900A is a UE.
In one embodiment, the first node 900A is a relay node.
In one embodiment, the first node 900A is a base station.

Embodiment 9B

Figure 9B:
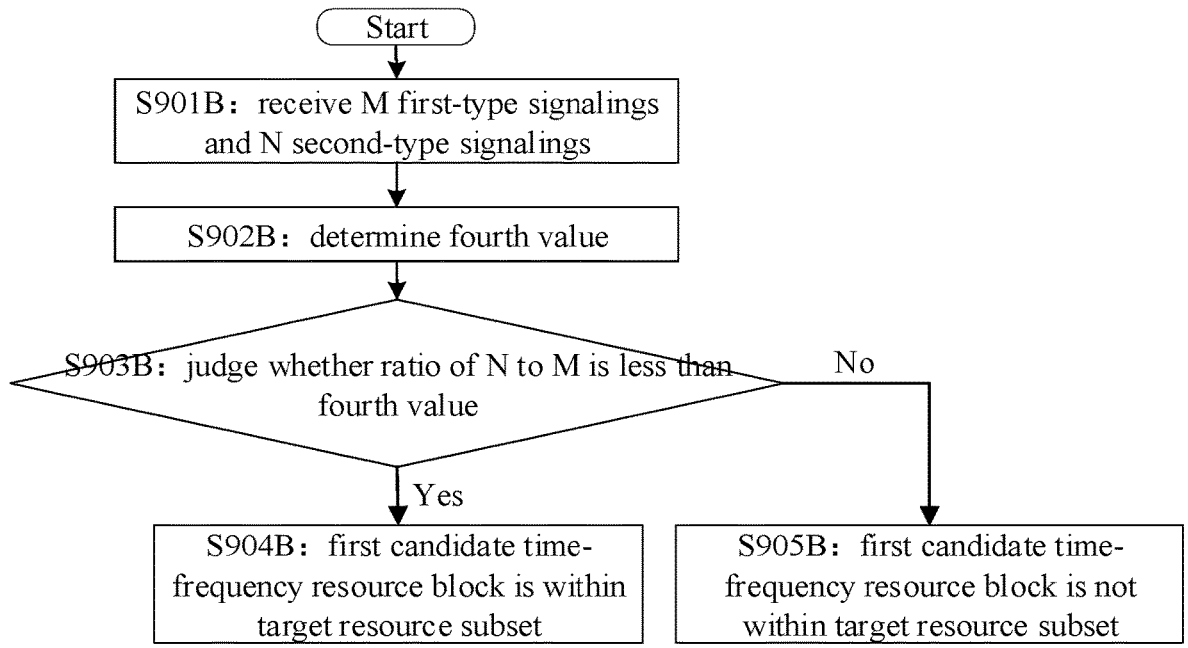
FIG. 9B illustrates a flowchart of determining whether a first candidate time-frequency resource block belongs to a target resource subset according to one embodiment of the present disclosure.

Embodiment 9B illustrates a flowchart of determining whether a first candidate time-frequency resource block belongs to a target resource subset according to one embodiment of the present disclosure, as shown in FIG. 9B. In FIG. 9B, receive M first-type signalings and N second-type signalings in step S901B; determine a fourth value in step S902B; judge whether a ratio of N to M is less than a fourth value in step S903B; when a ratio of N to M is less than the fourth value, execute step S904B, a first candidate time-frequency resource block belongs to a target resource subset; when a ratio of N to M is greater than or equal to a fourth value, execute step S905B, a first candidate time-frequency resource block does not belong to a target resource subset.

In embodiment 9B, a magnitude order between M and N is used to determine whether the first candidate time-frequency resource block is within the target resource subset.

In one embodiment, when a difference value of M and N is greater than a third value, the first candidate time-frequency resource block belongs to the target resource subset; when a difference value of M and N is less than a third value, the first candidate time-frequency resource block does not belong to the target resource subset.

In one embodiment, when a ratio of N to M is less than a fourth value, the first candidate time-frequency resource block belongs to the target resource subset; when a ratio of N to M is greater than a fourth value, the first candidate time-frequency resource block does not belong to the target resource subset.

In one embodiment, M is a positive integer not less than N.

In one embodiment, M is a positive integer greater than N.
In one embodiment, the third value is a real number greater than 0.
In one embodiment, the third value is equal to 0.
In one embodiment, the third value is predefined.
In one embodiment, the third value is configurable.
In one embodiment, the fourth value is a real number greater than 0 and less than 1.
In one embodiment, the fourth value is equal to 1.
In one embodiment, the fourth value is predefined.
In one embodiment, the fourth value is configurable.

Embodiment 10

Figure 10:
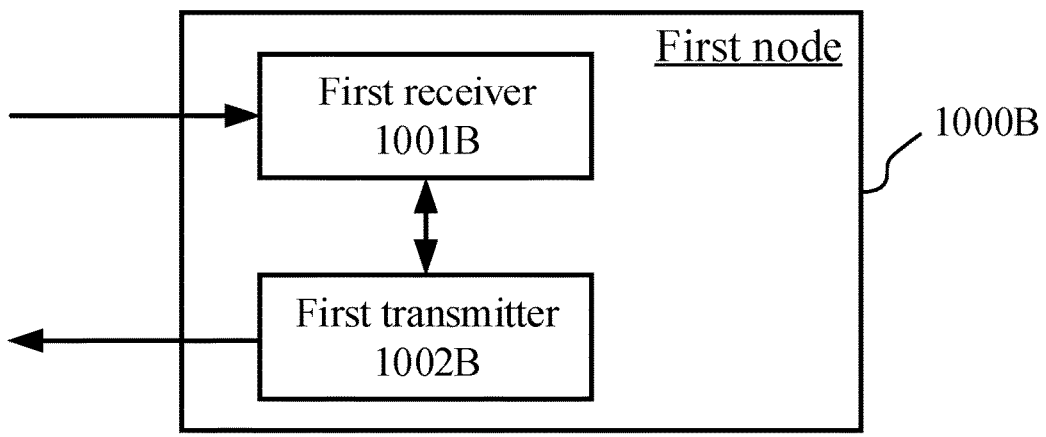
FIG. 10 illustrates a structure block diagram of a processing device in a first node according to one embodiment of the present disclosure.

Embodiment 10 illustrates a structure block diagram of a processing device in a first node, as shown in FIG. 10. In embodiment 10, a processing device 1000B of a first node mainly consists of a first receiver 1001B and a first transmitter 1002B.

In one embodiment, the first receiver 1001B comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In one embodiment, the first transmitter 1002B comprises at least one of the antenna 452, the transmitter/receiver 454, the multi-antenna transmitting processor 457, the transmitting processor 468, the controller/processor 459, the memory 460, or the data source 467 in FIG. 4 of the present disclosure.

In Embodiment 10B, the first receiver 1001B executes a first channel sensing; the first receiver 1001B receives M first-type signalings and N second-type signalings, M and N are both positive integers; the first transmitter 1002B transmits a first signal on a target time-frequency resource block; the first channel sensing is used to determine a target resource pool, and the target resource pool comprises a plurality of time-frequency resource blocks; a first candidate time-frequency resource block is one of a plurality of time-frequency resource blocks comprised in the target resource pool; the target time-frequency resource block belongs to a target resource subset, the target resource subset comprises at least one time-frequency resource block, and any time-frequency resource block comprised in the target resource subset belongs to the target resource pool; any of the M first-type signalings indicates the first candidate time-frequency resource block; any of the N second-type signalings indicates the first candidate time-frequency resource block, and any of the M first-type signalings and any of the N second-type signalings are different; both M and N are used together to determine whether the first candidate time-frequency resource block is within the target resource subset.

In one embodiment, a first signaling is any of the M first-type signalings; a second signaling is any of the N second-type signalings; and the first signaling is different from the second signaling.

In one embodiment, transmitters of any two of the M first-type signaligs are non-co-located; and transmitters of any two of the N second-type signaligs are non-co-located.

In one embodiment, both a magnitude order between M and a first value and a magnitude order between N and a second value are used together to determine whether the first candidate time-frequency resource block is within the target resource subset; the first value is predefined, or the first value is configurable; and the second value is predefined, or the second value is configurable.

In one embodiment, a relation between M and N is used to determine whether the first candidate time-frequency resource block belongs to the target resource subset.

In one embodiment, the first transmitter 1002B transmits a first target signaling on the target time-frequency resource block; the first channel sensing is executed in a first resource pool, and the first resource pool comprises a plurality of time-frequency resource blocks; any of the plurality of time-frequency resource blocks comprised in the target resource pool is associated with a time-frequency resource block in the first resource pool; the first candidate time-frequency resource block is associated with a first time-frequency resource block, and the first time-frequency resource is one of the plurality of time-frequency resource blocks comprised in the first resource pool; a measurement value for the first time-frequency resource block is not higher than a first threshold; the first target signaling is used to indicate the target time-frequency resource block; the first target signaling comprises a first priority, and the first priority is used to determine the first threshold.

In one embodiment, the first node 1000B is a UE.

In one embodiment, the first node 1000B is a relay node.

In one embodiment, the first node 1000B is a base station.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present disclosure includes but is not limited to mobile phones, tablet computers, notebooks, network cards, low-consumption equipment, eMTC terminals, NB-IOT terminals, vehicle-mounted communication equipment, aircrafts, diminutive airplanes, unmanned aerial vehicles, telecontrolled aircrafts and other wireless communication devices. The UE or terminal in the present disclosure includes but is not limited to mobile phones, tablet computers, notebooks, network cards, low-consumption equipment, eMTC terminals, NB-IOT terminals, vehicle-mounted communication equipment, aircrafts, diminutive airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
   a first receiver, receiving M first-type signalings, M being a positive integer greater than 1, and respectively measuring M reference resource sets in a first resource pool; and
   a first transmitter determining a target time-frequency resource block from a target resource pool and transmitting a first signal on the target time-frequency resource block, wherein the target time-frequency resource block is indicated, or the target time-frequency resource block is randomly selected from the target resource pool;
   wherein:
   the M first-type signalings respectively carry M source identities (IDs), the M source IDs are respectively used to identify M nodes, and any two of the M source IDs are different;
   the M first-type signalings respectively indicate M candidate resource sets, the M candidate resource sets being respectively associated with the M reference resource sets within the first resource pool, and any of the M candidate resource sets comprises at least one time-frequency resource block;
   one of the M candidate resource sets is within the target resource pool;
   the target resource pool comprises a plurality of time-frequency resource blocks, and the target time-frequency resource block is a time-frequency resource block in the target resource pool;
   a first signaling is one of the M first-type signalings, the first signaling indicates at least a latter of a first zone ID and a first candidate resource set, the first candidate resource set being associated with a first reference resource set that is one of the M reference resource sets, and the first candidate resource set is one of the M candidate resource sets; and
   a magnitude order of a measurement performed on the first reference resource set among M measurements performed on the M reference resource sets is used to determine whether the first candidate resource set is within the target resource pool.

2. The first node according to claim 1, wherein the first signaling indicates the first candidate resource set.

3. The first node according to claim 1, wherein the first signaling indicates the first zone ID and the first candidate resource set.

4. The first node according to claim 1, wherein the first signaling indicates the first zone ID.

5. The first node according to claim 1, wherein the M first-type signalings respectively further indicate M reference signals, the first receiver respectively measuring the M reference signals; the first signaling indicates a first reference signal, and the first reference signal is one of the M reference signals; and a magnitude order of a measurement performed on the first reference signal among M measurements performed on the M reference signals is used to determine whether the first candidate resource set is within the target resource pool.

6. A first node for wireless communications, comprising:
a first receiver receiving M first-type signalings, M being a positive integer greater than 1, respectively measuring M reference resource sets in a first resource pool, and receiving first configuration information, wherein the first configuration information indicates a second resource pool that comprises M candidate resource sets, the second resource pool being used to determine the first resource pool;
a first transmitter determining a target time-frequency resource block from a target resource pool and transmitting a first signal on the target time-frequency resource block, wherein the target time-frequency resource block is indicated, or the target time-frequency resource block is randomly selected from the target resource pool;
wherein:
the M first-type signalings respectively carry M source identities (IDs), the M source IDs are respectively used to identify M nodes, and any two of the M source IDs are different;
the M first-type signalings respectively indicate the M candidate resource sets, and any of the M candidate resource sets comprises at least one time-frequency resource block;
one of the M candidate resource sets is within the target resource pool;
the target resource pool comprises a plurality of time-frequency resource blocks, and the target time-frequency resource block is a time-frequency resource block in the target resource pool;
a first signaling is one of the M first-type signalings, the first signaling indicates at least a latter of a first zone ID and a first candidate resource set, and the first candidate resource set is one of the M candidate resource sets;
the M candidate resource sets are respectively associated with the M reference resource sets, and the M reference resource sets are within the first resource pool;
the first candidate resource set is associated with a first reference resource set, and the first reference resource set is one of the M reference resource sets; and
a magnitude order of a measurement performed on the first reference resource set among M measurements performed on the M reference resource sets is used to determine whether the first candidate resource set is within the target resource pool.

7. The first node according to claim 6, wherein the M first-type signalings respectively further indicate M reference signals, the first receiver respectively measuring the M reference signals; the first signaling indicates a first reference signal, and the first reference signal is one of the M reference signals; and a magnitude order of a measurement performed on the first reference signal among M measurements performed on the M reference signals is used to determine whether the first candidate resource set is within the target resource pool.

8. A first node for wireless communications, comprising:
a first receiver, receiving M first-type signalings, M being a positive integer greater than 1; and
a first transmitter determining a target time-frequency resource block from a target resource pool, and transmitting a first signal on the target time-frequency resource block, wherein the target time-frequency resource block is indicated, or the target time-frequency resource block is randomly selected from the target resource pool;
wherein:
the M first-type signalings respectively carry M source identities (IDs), the M source IDs are respectively used to identify M nodes, and any two of the M source IDs are different;
the M first-type signalings respectively indicate M candidate resource sets, and any of the M candidate resource sets comprises at least one time-frequency resource block;
one of the M candidate resource sets is within the target resource pool;
the target resource pool comprises a plurality of time-frequency resource blocks, and the target time-frequency resource block is a time-frequency resource block in the target resource pool;
a first signaling is one of the M first-type signalings, the first signaling indicates at least a latter of a first zone ID and a first candidate resource set, and the first candidate resource set is one of the M candidate resource sets;
at least one of the first zone ID or a measurement corresponding to the first candidate resource set is used to determine whether the first candidate resource set is within the target resource pool;
the first zone ID is used to determine a first distance that is a geographical distance between a node transmitting the first signaling and the first node;
M first-type distances are respectively geographical distances between the M nodes and the first node; and
a magnitude order of the first distance among the M first-type distances is used to determine whether the first candidate resource set is within the target resource pool.

9. A method in a first node for wireless communications, comprising:
receiving M first-type signalings, M being a positive integer greater than 1; and
transmitting a first signal on a target time-frequency resource block;
wherein:
the M first-type signalings respectively carry M source IDs, the M source IDs are respectively used to identify M nodes, and any two of the M source IDs are different;
the M first-type signalings respectively indicate M candidate resource sets, and any of the M candidate resource sets comprises at least one time-frequency resource block;
one of the M candidate resource sets is within a target resource pool;
the target resource pool comprises a plurality of time-frequency resource blocks, and the target time-frequency resource block is a time-frequency resource block in the target resource pool;

a first signaling is one of the M first-type signalings, the first signaling indicates at least a latter of a first zone ID and a first candidate resource set, and the first candidate resource set is one of the M candidate resource sets;

at least one of the first zone ID or a measurement corresponding to the first candidate resource set is used to determine whether the first candidate resource set is within the target resource pool;

the first zone ID is used to determine a first distance that is a geographical distance between a node transmitting the first signaling and the first node;

M first-type distances are respectively geographical distances between the M nodes and the first node; and a magnitude order of the first distance among the M first-type distances is used to determine whether the first candidate resource set is within the target resource pool.

* * * * *